United States Patent
Song et al.

(10) Patent No.: US 8,627,364 B2
(45) Date of Patent: Jan. 7, 2014

(54) DIGITAL SYSTEM AND METHOD OF PROCESSING SERVICE DATA THEREOF

(71) Applicant: LG Electronics Inc., Seoul (KR)

(72) Inventors: Hojin Song, Pyeongtaek-si (KR); Iigeun Kwon, Pyeongtaek-si (KR); Rosa Andre, São Paulo (BR); Heejung Jeoung, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/622,902

(22) Filed: Sep. 19, 2012

(65) Prior Publication Data

US 2013/0074117 A1    Mar. 21, 2013

(30) Foreign Application Priority Data

Sep. 20, 2011  (KR) .................. 10-2011-0094570
Nov. 28, 2011  (KR) .................. 10-2011-0125287

(51) Int. Cl.
| | | |
|---|---|---|
| G06F 3/00 | (2006.01) | |
| G06F 13/00 | (2006.01) | |
| H04N 5/445 | (2011.01) | |
| H04N 7/18 | (2006.01) | |
| H04N 7/16 | (2011.01) | |
| H04N 7/173 | (2011.01) | |

(52) U.S. Cl.
USPC .................. 725/39; 725/51; 725/81; 725/62; 725/109

(58) Field of Classification Search
None
See application file for complete search history.

(56) References Cited

U.S. PATENT DOCUMENTS

| | | | |
|---|---|---|---|
| 8,291,453 B2 * | 10/2012 | Boortz | 725/42 |
| 2002/0049972 A1 * | 4/2002 | Kimoto | 725/39 |
| 2003/0066085 A1 * | 4/2003 | Boyer et al. | 725/104 |
| 2004/0203630 A1 | 10/2004 | Wang | |
| 2010/0124939 A1 | 5/2010 | Osborne et al. | |

FOREIGN PATENT DOCUMENTS

WO    WO 2007/140834 A1    12/2007

* cited by examiner

*Primary Examiner* — Mark D Featherstone
(74) *Attorney, Agent, or Firm* — Birch, Stewart, Kolasch & Birch, LLP

(57) ABSTRACT

A digital system and a method of processing service data thereof are disclosed. The digital system includes a first device configured to transmit at least one of device information and device location information of a first device to a second device which is connected to the first device, receive service data from the second device, the service data being extracted based upon at least one of the device information and the device location information of the first device, process and output the service data on a screen, transmit a command signal which is selected from the outputted service data to the second device and receive respond data corresponding to the command signal from the second device and outputting the respond data on the screen.

18 Claims, 46 Drawing Sheets

FIG. 16

| Service Network ID | DTV Country Setting | Physical Channel | Virtual Channel | Program Title from EPG | Description from EPG | Program Screenshot |
|---|---|---|---|---|---|---|
| 1 | BR | 11 | 1 | Xuxa | Ipsi lum | |
| 12 | KR | 22 | 2 | KBS | lorem | |
| 133 | US | 33 | 3 | CSI | ipson | |
| ... | ... | ... | ... | ... | ... | ... |

16020

16010

FIG. 35
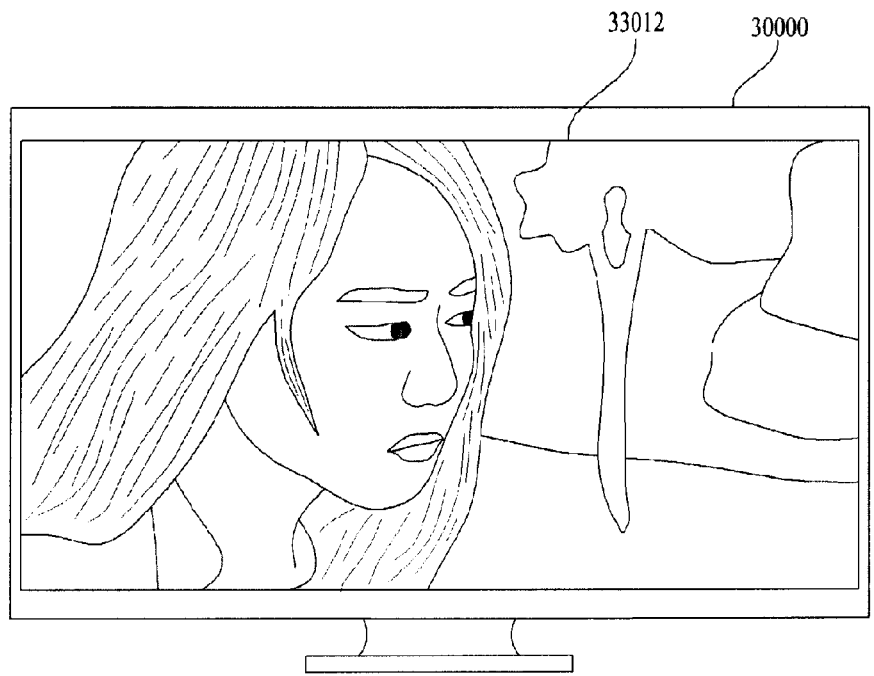
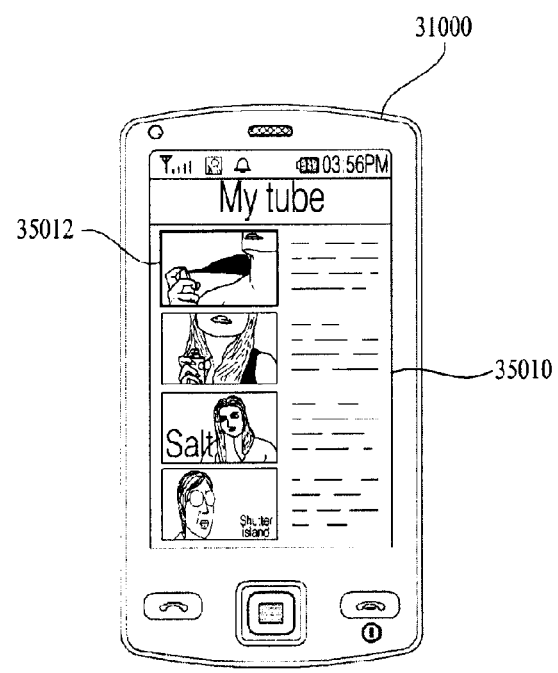

FIG. 37
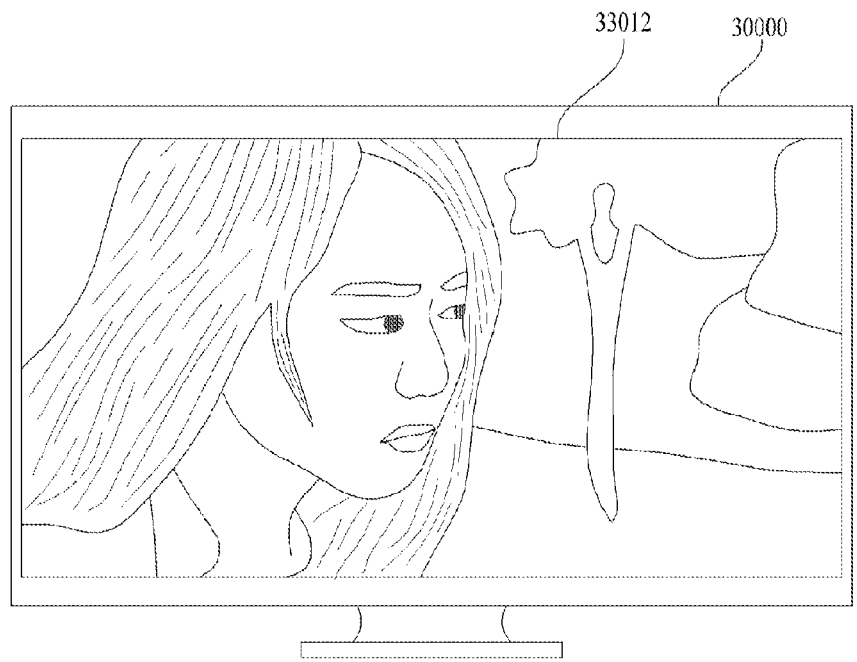
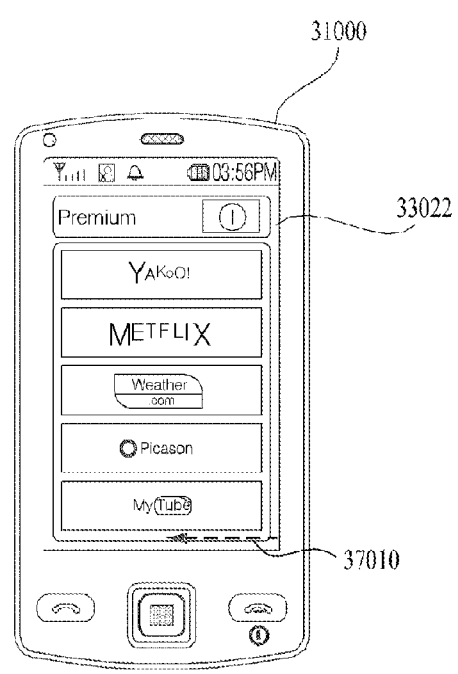

FIG. 38
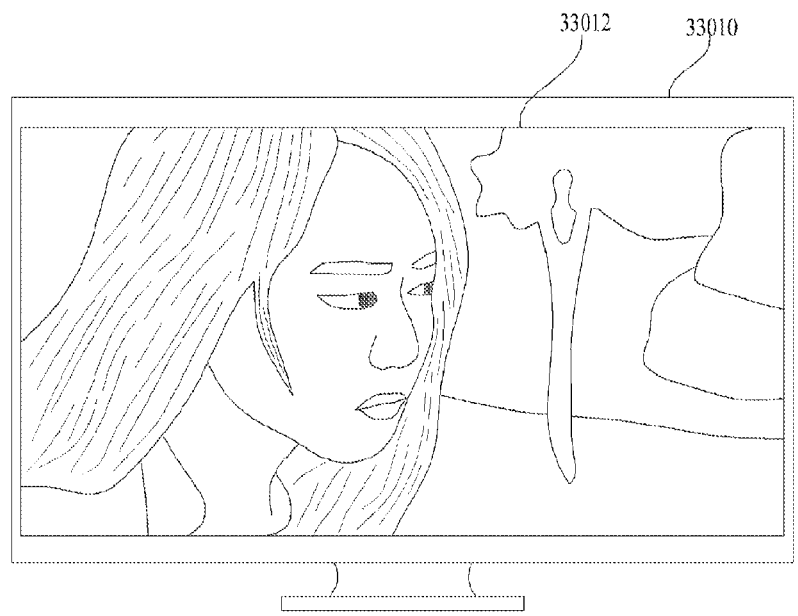
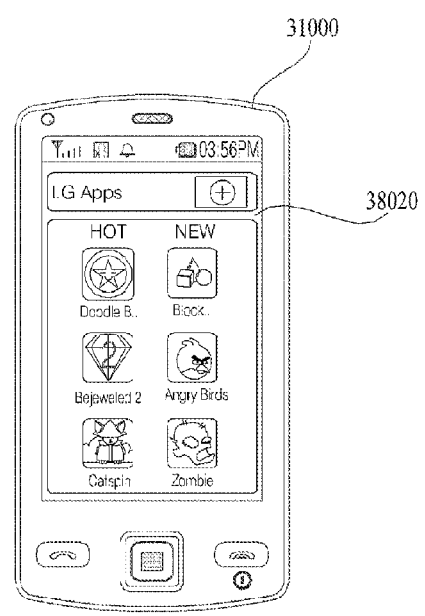

FIG. 40
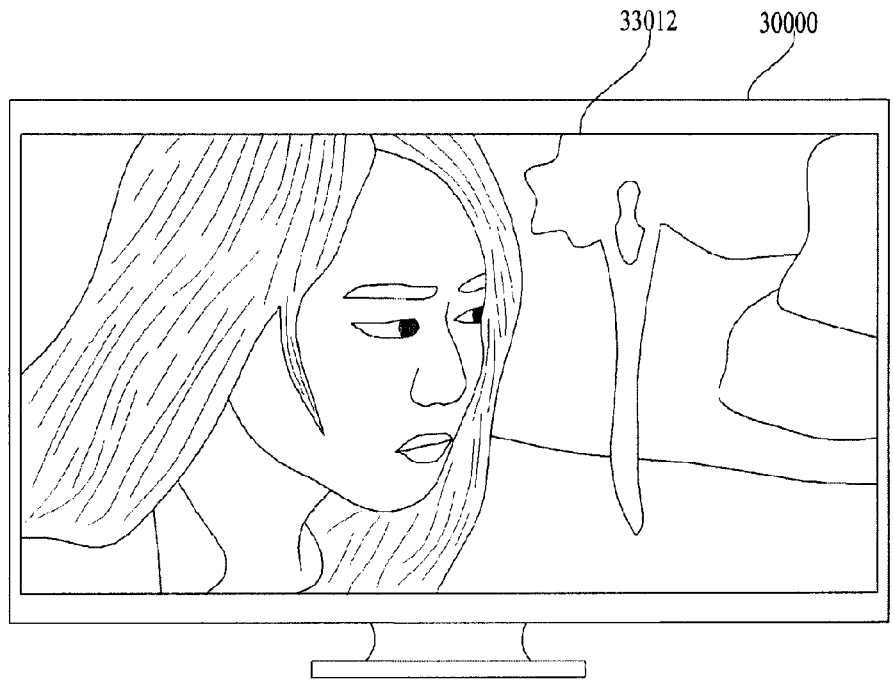
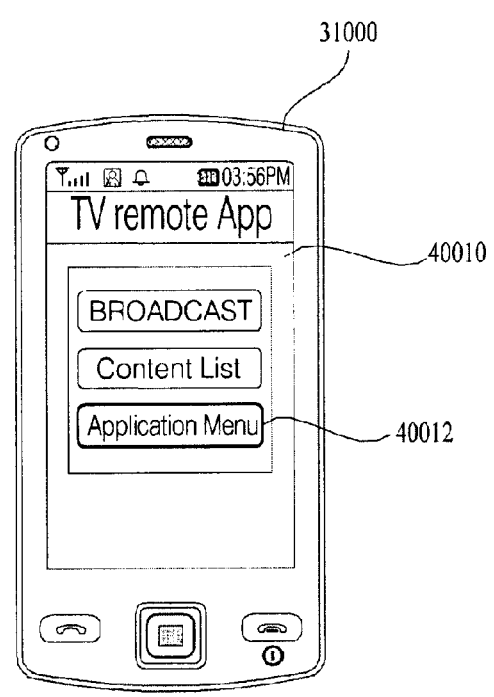

FIG. 41
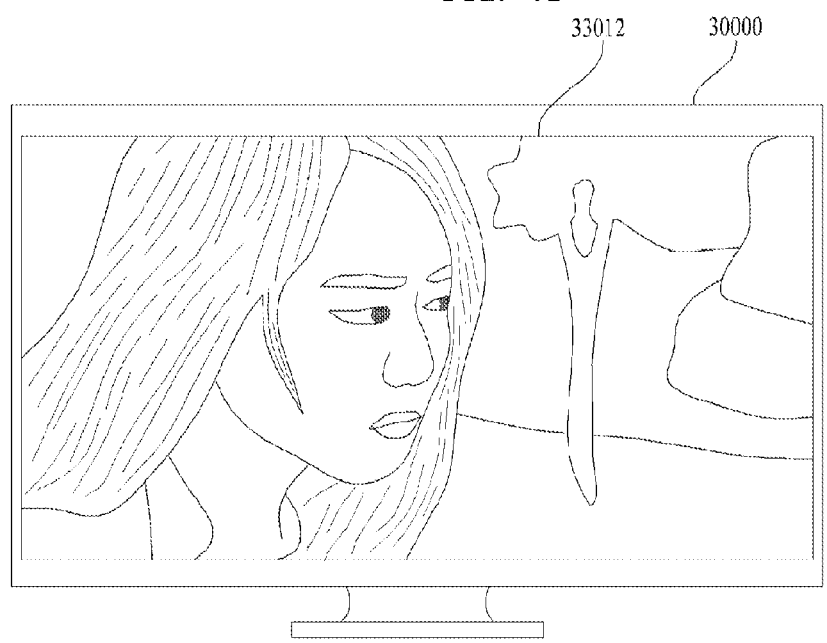
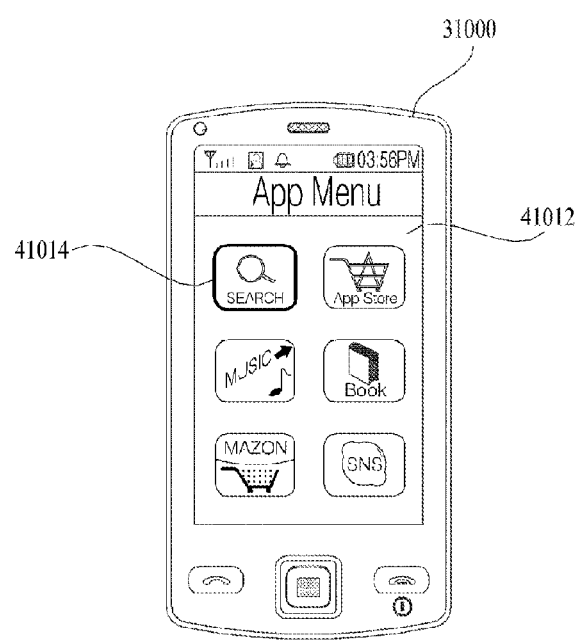

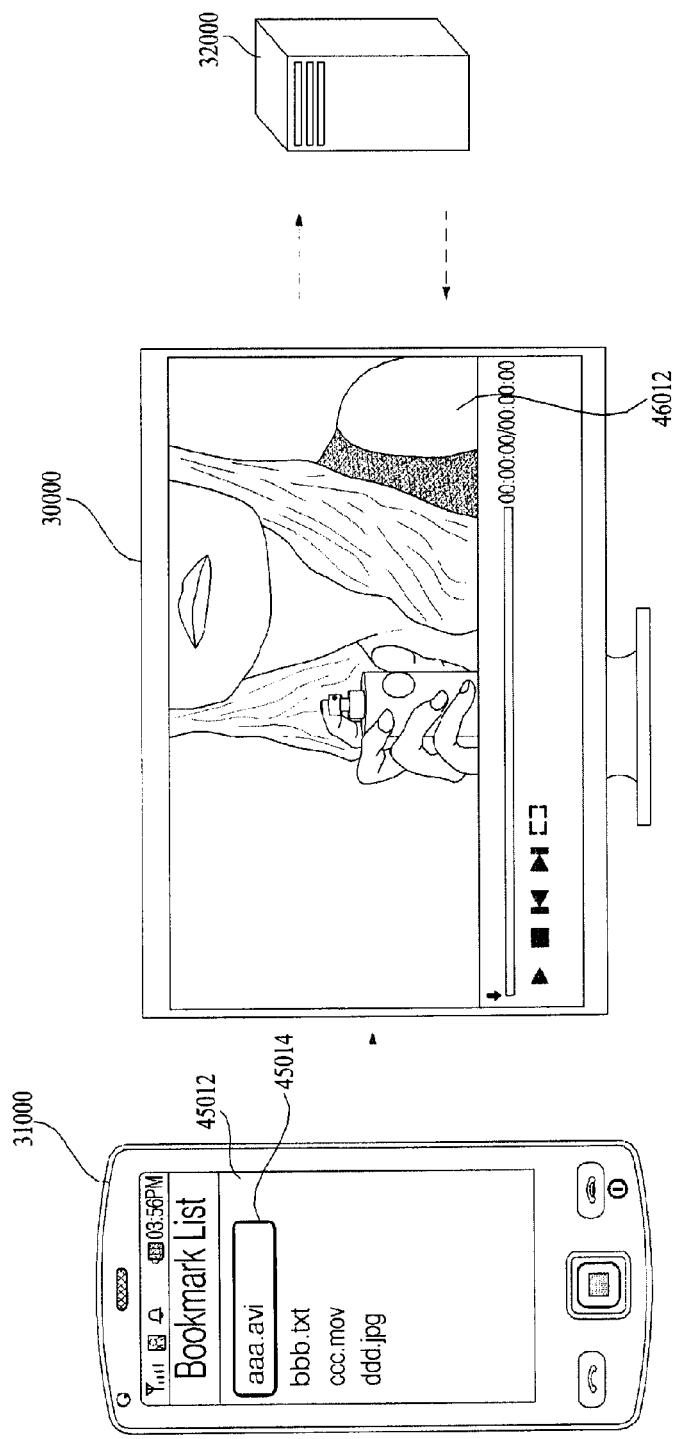

DIGITAL SYSTEM AND METHOD OF PROCESSING SERVICE DATA THEREOF

This application claims the benefit of the Korean Patent Application Nos. 10-2011-0094570, filed on, Sep. 20, 2011, and 10-2011-0125287, filed on, Nov. 28, 2011, which are hereby incorporated by reference as if fully set forth herein.

BACKGROUND OF THE INVENTION

1. Field of the Invention

The present invention relates to a digital system including digital devices, and more particularly to a method of providing an enhanced service in terms of quality and quantity via inter-authentication and data transmission/reception between a server and a digital device and between digital devices included in a digital system.

2. Discussion of the Related Art

Broadcasting is rapidly converting from analog to digital all over the world.

As compared to traditional analog broadcasting, digital broadcasting has lower data loss owing to high resistance to noise, is advantageous for error correction, and provides higher resolution, and consequently more vivid imagery. Moreover, provision of a bidirectional service is possible under digital broadcasting unlike in analog broadcasting.

Although digital broadcasting has been realized via terrestrial, satellite, and cable media, in recent years, an Internet Protocol Television (IPTV) broadcasting service related to digital content, such as real time broadcasting and Content on Demand (CoD), for example, has also been implemented via an IP network connected to individual homes.

SUMMARY OF THE INVENTION

Accordingly, the present invention is directed to a digital system and a method of processing service data thereof that substantially obviate one or more problems due to limitations and disadvantages of the related art.

One object of the present invention is to provide a digital system including at least one server and a plurality of digital devices, which can expand a channel or service coverage originally included in each digital device.

Another object of the present invention is to provide a digital system, which can ensure exchange of related service data between digital devices as well as between a server and each digital device included in the digital system.

A further object of the present invention is to provide a digital device, which can acquire more abundant service data than in the related art, thereby providing an improved service guide in terms of quantity and/or quality.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the above objectives according to an embodiment of the present invention to a digital system of processing service data includes a first device configured to transmit at least one of device information and device location information of a first device to a second device which is connected to the first device, receive service data from the second device, the service data being extracted based upon at least one of the device information and the device location information of the first device, process and output the service data on a screen, transmit a command signal which is selected from the outputted service data to the second device and receive respond data corresponding to the command signal from the second device and outputting the respond data on the screen.

The digital system further comprises: the second device configured to determine a group of the first device based upon the device location information, transmit an identifier of the determined group of the first device, store Uniform Resource Locator (URL) information to be downloaded the thumbnail image in the service data and transmit the stored URL information corresponding to the determined group to the first device.

The device location information includes at least one an original network identifier, a Zone Improvement Plan (ZIP) code and a Global Positioning System (GPS) information, wherein the device information of the first device includes at least one of a nation, a language, a receiver type, a device model, a service list and a user identifier, wherein the service data includes at least one of program data, thumbnail image data, channel browse data and guide data, and wherein the service list includes a 3-id which comprises an original network identifier, a transport stream identifier, a service identifier and a service or channel name.

The first device is further configured to transmit a request of both transferring a device identifier according to a HTTP protocol and a key for data encryption to the second device, receive a response code and the key from the second device and encrypt a service list which is currently displayed on the screen using the key and transmitting the encrypted service list to the second device.

The first device is further configured to reproduce a service if the transmitted service list is valid, transmit a security authentication code to be coupled to the second device, and couple to the second device according to a response of the second device.

If the transmitted service list is not valid, the first device is further configured to at least one of return a response code indicating a service to be not reproduced to the first device, transmit the service list and request the service to be reproduced.

The first device is further configured to extract the URL information received from the second device, download the thumbnail image based on the URL information, and output the downloaded thumbnail image.

A method of processing service data in a digital system includes receiving service data and device information from a first device, transmitting a identifier of a group from a second device to the first device based upon the device information, the group including the first device, processing the service data and storing the processed service data based upon the identifier of the group, and transmitting the stored service data to the first device based upon the identifier of the group.

The service data includes at least one of program data, thumbnail image data, channel browse data and guide data, and wherein the device information of the first device includes at least one of a nation, a language, a receiver type, a device model, a service list and a user identifier.

The service list includes a 3-id which comprises an original network identifier, a transport stream identifier, a service identifier and a service or channel name.

The step of processing the service data comprises combining the service of the first device and service data received from a third device.

The second device controls the stored service to be transmitted periodically to the first device, and wherein the second device controls a changed transmission period of the stored service to be changed if the service data of the first device is duplicated to the service data which is previously stored in the second device.

A method of processing service data in a digital system includes transmitting device location information of a first device to a second device which is connected to the first device, receiving service data from the second device, the service data being extracted based upon the device location information of the first device, processing and outputting the service data on a screen, transmitting a command signal which is selected from the outputted service data to the second device, and receiving respond data corresponding to the command signal from the second device and outputting the respond data on the screen.

The device location information includes at least one of an original network identifier, a ZIP code and Global Positioning System (GPS) information, wherein the service data includes at least one of program data, thumbnail image data, channel browse data and guide data, and wherein the device information of the first device includes at least one of a nation, a language, a receiver type, a device model, a service list and a user identifier.

The service list includes a 3-id which comprises an original network identifier, a transport stream identifier and a service identifier, and wherein the service list further includes a service or channel name.

The step of transmitting a command signal comprises transmitting a request of both transferring a device identifier according to a HTTP protocol and a key for data encryption to the second device, receiving a response code and the key from the second device, and encrypting a service list which is currently displayed on the screen using the key and transmitting the encrypted service list to the second device.

The method further comprises reproducing a service if the transmitted service list is valid.

The method further comprises at least one of returning a response code indicating a service to be not reproduced to the first device, and transmitting the service list and requesting the service to be reproduced.

The step of transmitting a command signal further comprises transmitting a security authentication code to be coupled to the second device, and coupling to the second device according to a response of the second device.

The second device stores Uniform Resource Locator (URL) information to be downloaded the thumbnail image in the service data, and wherein the first device extracts the URL information received from the second device, downloads the thumbnail image based on the URL information and outputs the downloaded thumbnail image.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 16 is a diagram showing an example of EPG and/or thumbnail image service data according to the present invention;

FIGS. 30 to 46 are reference diagrams of the operating methods of FIGS. 25 to 27.

DETAILED DESCRIPTION OF THE INVENTION

Figure 1:
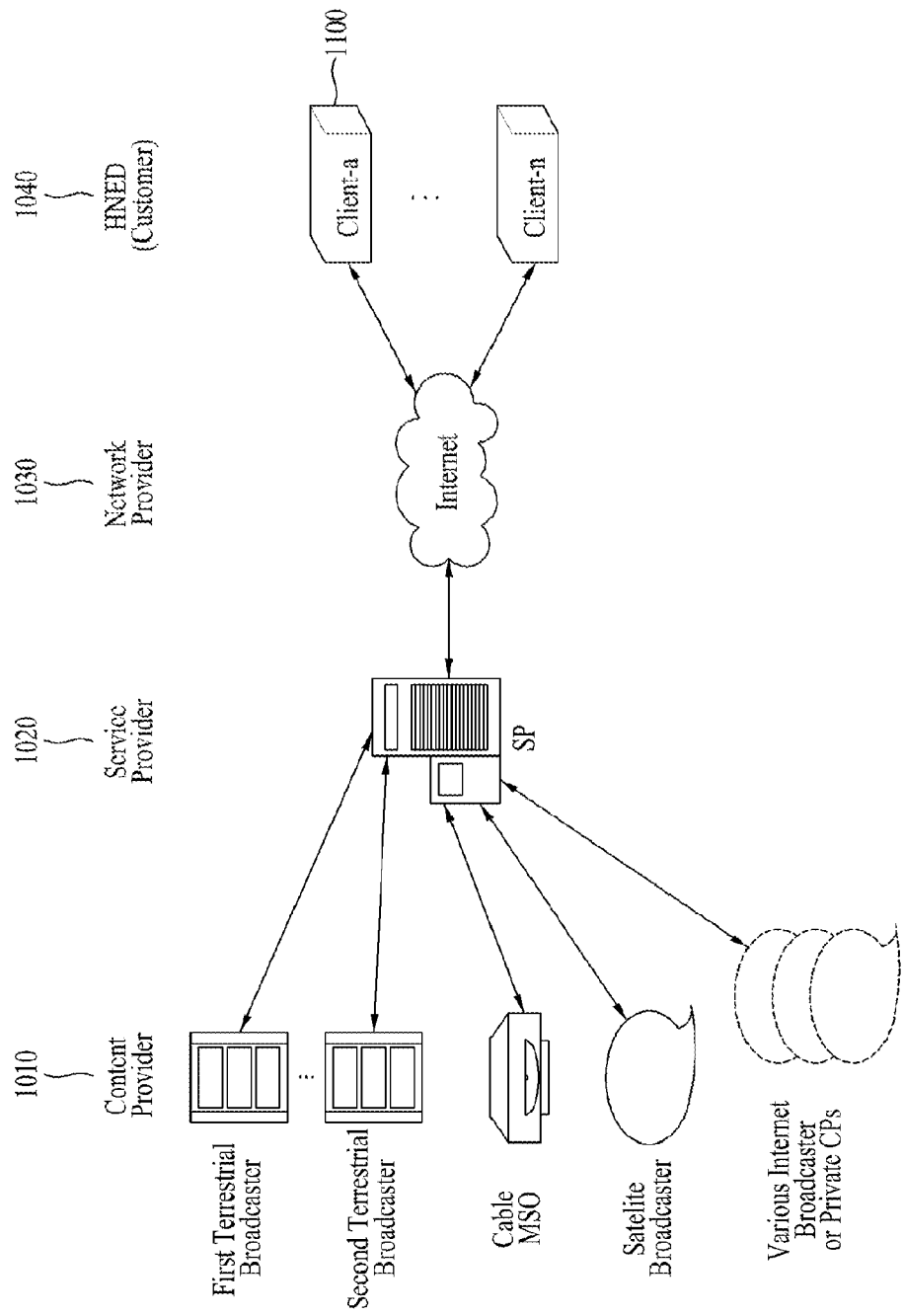
FIG. 1 is a diagram schematically showing a digital system including digital devices according to an exemplary embodiment of the present invention.

Reference will now be made in detail to the embodiments of the present invention, examples of which are illustrated in the accompanying drawings.

With respect to constituent elements used in the following description, suffixes "module" and "unit" are simply given in consideration of ease in the preparation of the specification, and may be mingled with each other.

A digital device according to the present invention as set forth herein may be an intelligent device that additionally provides a computer support function in addition to a broadcasting reception function, for example. As a result of adding an Internet function to the broadcasting reception function, the digital device may be provided with a more convenient interface, such as a handwriting input device, a touch-screen, or a spatial remote controller. Also, the digital device enables, for example, e-mailing, Web browsing, banking, and game playing functions by accessing the Internet or a computer because the digital device supports a wired or wireless Internet function. To implement these various functions, a standardized general-purpose Operating System (OS) may be used. In addition, since the digital device allows various applications to be freely added to or deleted from, for example, a general-purpose OS kernel, it may perform various user friendly functions. Examples of the digital device include a network TV, a Hybrid Broadcast Broadband TV (HBBTV), and a smart TV, and as occasion demands may further include a Personal Digital Assistant (PDA) or a smart phone. In the following description, the digital device may correspond to any one of a mobile terminal and an image display device. However, for convenience of description, in this specification, the terms "digital device", "mobile terminal" and "image display device" may be used interchangeably, and may respectively represent a particular device name in the corresponding drawing.

The embodiments of the present invention will now be described in detail with reference to the accompanying drawings and the disclosure illustrated in the accompanying drawings. However, it is to be understood that the invention is not limited to or restricted by the following embodiments.

Although the terms used in the following description are selected, as much as possible, from general terms that are widely used at present while taking into consideration of the functions obtained in accordance with the present invention, these terms may be replaced by other terms based on intensions of those skilled in the art, customs, emergence of new technologies, or the like. Also, in a particular case, terms that are arbitrarily selected by the applicant of the present invention may be used. In this case, the meanings of these terms may be described in corresponding description parts of the invention. Accordingly, it should be noted that the terms used herein should be construed based on practical meanings thereof and the whole content of this specification, rather than being simply construed based on names of the terms.

FIG. 1 is a diagram schematically showing a digital system including digital devices according to an exemplary embodiment of the present invention.

As shown in FIG. 1, according to the embodiment of the present invention, the digital system includes a Content Provider (CP) 1010, a Service Provider (SP) 1020, a Network Provider (NP) 1030, and a Home Network End User (HNED) 1040. For example, the FINED 1040 may correspond to a client 1100, i.e. a digital device according to the present invention. As described above, the digital device may include a network TV, a smart TV, and an IPTV, for example.

The CP 1010 may produce and provide a variety of content. The CP 1010, as shown in FIG. 1, may include a terrestrial broadcaster, a System Operator (SO), a Multiple System Operator (MSO), a satellite broadcaster, an Internet broadcaster, and a private CP. The CP 1010 may provide, for example, a variety of applications as well as broadcast content. This will be described hereinafter in more detail.

The SP 1020 may service-package the content provided by the CP 1010, and transmit the service-packaged content. For example, the SP 1020 shown in FIG. 1 may package a first terrestrial broadcast, a second terrestrial broadcast, a cable MSO, a satellite broadcast, various Internet broadcasts, and applications, and provide the packaged broadcasts to a user.

The SP 1020 may provide the service to a client 1100 using a uni-cast or multi-cast method, or using a push or pull method. The uni-cast method transmits data between a single transmitter and a single receiver in a one to one ratio. For example, if a receiver requests data to a server in the uni-cast method, the server transmits the data to the corresponding receiver in response to the request. On the other hand, the multi-cast method transmits data to a plurality of receivers within a particular group. For example, a server transmits data to a plurality of pre-registered receivers simultaneously. An Internet Group Management Protocol (IGMP) may be used for the multicast registration.

The CP 1010 and the SP 1020 may be the same entity. For example, the CP 1010 may produce content, service-package the content, and provide the packaged service. Thus, the CP 1010 may perform the function of the SP 1020. The converse case is also possible.

The NP 1030 may provide a network for data exchange between a server and the client 1100.

The client 1100 may build a home network to enable transmission/reception of data.

Meanwhile, to protect content transmitted in the digital system, the server may utilize certain means, such as conditional access, content protection or the like. In this case, the client 1100 may utilize certain means to correspond to the conditional access or content protection, such as a Cable-CARD, a Downloadable Conditional Access System (DCAS) or the like.

In addition, the client 1100 may adopt a bi-directional service via a network. In this case, the client 1100 may also function as a CP, and the SP 1020 may receive content from the client 1100, and in turn transmit the content to another client.

Figure 2:
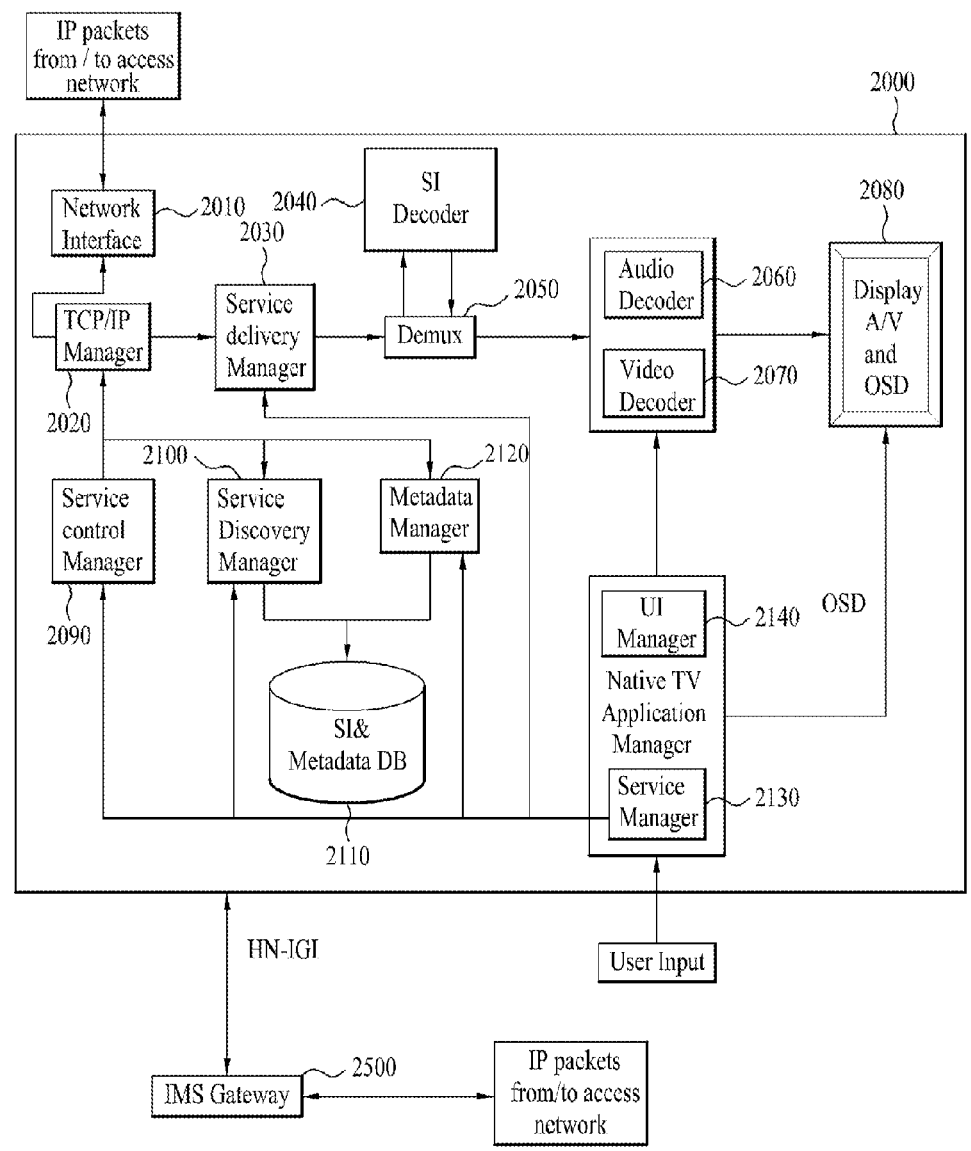
FIG. 2 is a block diagram showing a digital device according to an exemplary embodiment of the present invention.

FIG. 2 is a block diagram showing a digital device according to an exemplary embodiment of the present invention. The digital device shown in FIG. 2 may correspond to the client 1100 shown in FIG. 1, and may be a digital television receiver, for example.

The digital device 2000 includes a network interface 2010, a Transmission Control Protocol/Internet Protocol (TCP/IP) manager 2020, a service delivery manager 2030, a Service or System Information (SI) decoder 2040, a demultiplexer (DEMUX) 2050, an audio decoder 2060, a video decoder 2070, a display Audio/Video (A/V) and On Screen Display (OSD) module 2080, a service control manager 2090, a service discovery manager 2100, an SI & metadata database (DB) 2110, a metadata manager 2120, a service manager 2130, and an User Interface (UI) manager 2140, for example.

The network interface 2010 may receive or transmit IP packets via a network. That is, the network interface 2010 may receive, for example a service and content from the SP 1020 via a network.

The TCP/IP manager 2020 has a role in transmission of the IP packets to and from the digital device 2000, i.e. in packet transmission between a source and a destination. The TCP/IP manager 2020 may sort the received packets to correspond to appropriate protocols, and output the sorted packets to the service delivery manager 2030, the service the service control manager 2090, discovery manager 2100, and the metadata manager 2120, for example.

The service delivery manager 2030 serves to control received service data. For example, the service delivery manager 2030 may use a Real time Transport Protocol (RTP)/RT Control Protocol (RTCP) in the case of controlling real time streaming data. When transmitting the real time streaming data using the RTP, the service delivery manager 2030 may parse the received data packets based on the RTP and transmit the parsed data packets to the DEMUX 2050, or may store the receive data packets in the SI & metadata DB 2110 based on control of the service manager 2130. The service delivery manager 2030 may feedback information received via the network to a service providing server using the RTCP.

The DEMUX 2050 demultiplexes the received packets to audio, video and System Information (SI) data, and transmits the demultiplexed data to the audio and video decoders 2060 and 2070 and the SI decoder 2040.

The SI decoder 2040 decodes service information, such as, for example, Program Specific Information (PSI), Program and System Information protocol (PSIP), and Digital Video Broadcasting-SI (DVB-SI).

The SI decoder 2040 stores the decoded service information in, for example, the SI & metadata DB 2110. The stored service information, for example, may be read and used by a corresponding component in response to a user request. In the present invention, service information, related to an Electronic Program Guide (EPG) service depending on a user request, a channel browser service, or the like, may also be read from the SI & metadata DB 2110. This will be described later in more detail.

The audio and video decoders 2060 and 2070 respectively decode audio data and video data demultiplexed in the DEMUX 2050. The decoded audio and video data are provided to the user via the display A/V and OSD module 2080.

An application manager may consist of the UT manager 2140 and the service manager 2130, for example. The application manager may manage overall states of the digital device 2000, provide a user interface, and manage other managers.

The UI manager 2140 provides a Graphic User Interface (GUI) for the user using an OSD, and the like, and performs an operation of the device upon receiving a key input from the user. For example, when receiving a key input signal for channel selection from the user, the UI manager 2140 transmits the key input signal to the service manager 2130.

The service manager 2130 controls a service associated manager, such as the service delivery manager 2030, the service discovery manager 2100, the service control manager 2090, and the metadata manager 2120, for example.

The service manager 2130 makes a channel map, and selects a channel using the channel map based on the key input received from the UT manager 2140. Additionally, the service manager 2130 receives service information on the channel from the SI decoder 2040, and sets an audio/video Packet Identifier (PID) of the selected channel to the DEMUX 2050. The set PID is used for the above-described demultiplexing. Thus, the DEMUX 2050 filters audio and video data, and SI data using the PID.

The service discovery manager 2100 provides information required to select an SP that provides a service. When receiving a signal for channel selection from the service manager 2130, the service discovery manager 2100 searches a service using the information.

The service control manager 2090 takes charge of selection and control of a service. For example, the service control manager 2090 may perform selection and control of a service using the IGMP or the Real Time Streaming Protocol (RTSP) if the user selects a live broadcasting service of the same type as a traditional broadcasting service, or using the RTSP if the user selects a Video on Demand (VOD) service. The RTSP may provide a trick mode with respect to real time streaming The service control manager 2090 may initialize and manage a session through an IMS gateway 2500 using an IP Multimedia Subsystem (IMS) and a Session Initiation Protocol (SIP). The aforementioned protocols are given by way of example, and other protocols may be used according to embodiments.

The metadata manager 2120 manages service associated metadata, and stores the metadata in the SI & metadata DB 2110.

The SI & metadata DB 2110 stores the service information decoded by the SI decoder 2040, the metadata managed by the metadata manager 2120, and information required to select the SP provided by the service discovery manager 2100. Additionally, the SI & metadata DB 2110 may store, for example, system setup data.

The SI & metadata DB 2110 may be realized using a Non-Volatile RAM (NVRAM), or a flash memory, for example.

The IMS gateway 2500 may be a gateway in which functions required to access an IMS-based IPTV service are collected.

Figure 3:
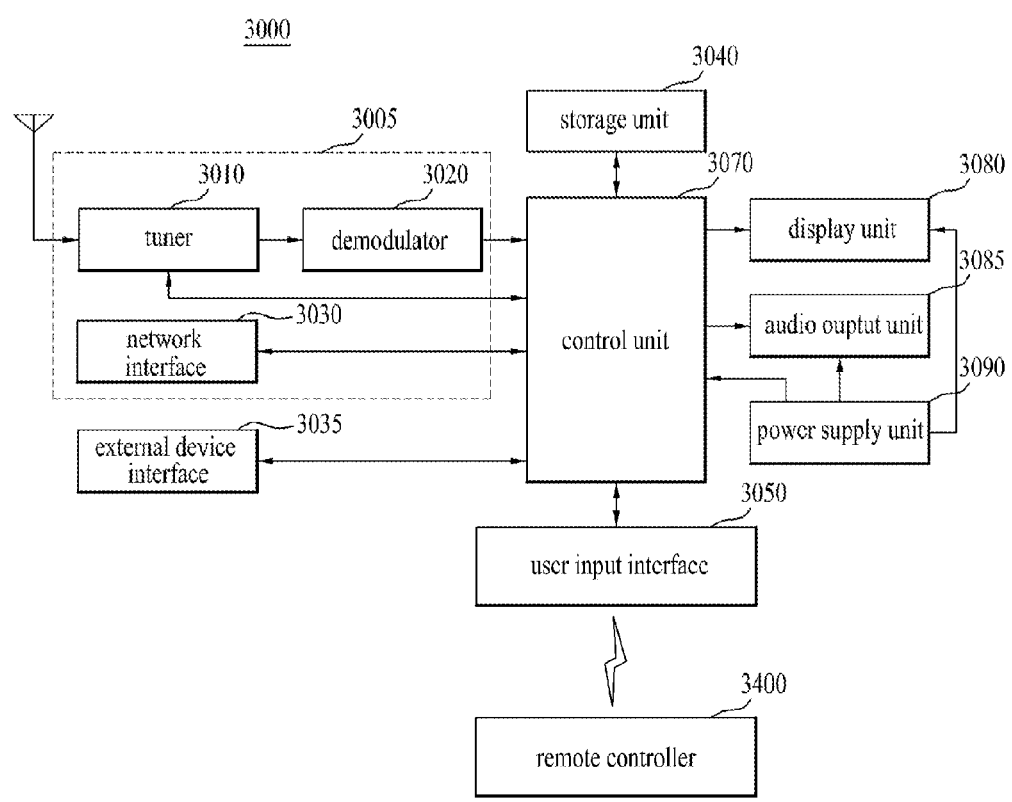
FIG. 3 is a block diagram showing a digital device according to another exemplary embodiment of the present invention.

FIG. 3 is a block diagram showing a digital device according to another exemplary embodiment of the present invention.

Referring to FIG. 3, the digital device 3000 according to another exemplary embodiment of the present invention may include a broadcast receiving unit 3005, an external device interface 3035, a storage unit 3040, a user input interface 3050, a control unit 3070, a display unit 3080, an audio output unit 3085, a power supply unit 3090, and an image capturing unit (not shown). The broadcast receiving unit 3005 may include at least one tuner 3010, a demodulator 3020, and a network interface 3030. As necessary, the broadcast receiving unit 3005 may be designed to include the tuner 3010 and the demodulator 3020 without the network interface 3030, or may be designed to include only the network interface 3030 without the tuner 3010 and the demodulator 3020. Although not shown, the broadcast receiving unit 3005 may further include a multiplexer to multiplex a signal that has passed through the tuner 3010 and demodulated by the demodulator 3020 and a signal that has been received through the network interface 3030. Additionally, although not shown, the broadcast receiving unit 3005 may further include a demultiplexer to demultiplex the multiplexed signal or the demodulated signal, or to demultiplex the signal that has passed through the network interface 3030.

The tuner 3010 receives one of Radio Frequency (RF) broadcast signals received through an antenna by tuning a user-selected channel or all pre-stored channels. Then, the tuner 3010 converts the received RF broadcast signal into an Intermediate Frequency (IF) signal or a baseband signal.

For example, the tuner 3010 may convert the received RF broadcast signal into a digital IF (DIF) signal if the RF broadcast signal is a digital broadcast signal, or may convert the received RF broadcast signal into an analog baseband audio or video signal (Composite Video Banking Sync/Sound Intercarrier Frequency (CVBS/SIF) signal) if the RF broadcast signal is an analog broadcast signal. That is, the tuner 3010 is capable of processing both digital and analog broadcast signals. The analog baseband audio or video signal (CVBS/SIF signal) output from the tuner 3010 may be directly input to the control unit 3070.

The tuner 3010 may receive an RF broadcast signal of a single carrier based on an Advanced Television System Committee (ATSC) mode or an RF broadcast signal of multiple carriers based on a Digital Video Broadcasting (DVB) mode.

Additionally, the tuner 3010 may convert one of the RF broadcast signals received through the antenna into the IF signal or the baseband signal by sequentially tuning and receiving the RF broadcast signals of all broadcast channels stored via a channel memory function.

The demodulator 3020 receives and demodulates the DIF signal converted in the tuner 3010.

For example, if the DIF signal output from the tuner 3010 is based on the ATSC mode, the demodulator 3020 performs, for example, 8-Vestigal Side Band (8-VSB) demodulation. Also, the demodulator 3020 may perform channel decoding. To this end, the demodulator 3020 may include a trellis decoder, a de-interleaver, and a Reed Solomon (RS) decoder, and may perform trellis decoding, de-interleaving, and RS decoding.

For example, if the DIF signal output from the tuner 3010 is based on the DVB mode, the demodulator 3020 performs, for example, Coded Orthogonal Frequency Division Multiple Access (COFDMA) demodulation. Also, the demodulator 3020 may perform channel decoding. To this end, the demodulator 3020 may include a convolution decoder, a de-interleaver, and an RS decoder, and may perform convolution decoding, de-interleaving, and RS decoding.

The demodulator 3020 may output a stream signal after performing the demodulation and the channel decoding.

The stream signal may be obtained by multiplexing a video signal, an audio signal or a data signal. For example, the stream signal may be MPEG-2 Transport Stream (TS) obtained by multiplexing an MPEG-2 video signal or a Dolby AC-3 audio signal. More specifically, the MPEG-2 TS may contain a 4-byte header and a 184-byte payload.

The demodulator 3020 as described above may be provided separately for the ATSC mode and the DVB mode. That is, the broadcast receiving unit 3005 may include an ATSC demodulator and a DVB demodulator.

The stream signal output from the demodulator 3020 may be input to the control unit 3070. For example, the control unit 3070 may control demultiplexing and video/audio signal processing, and may also control video output through the display unit 3080 and audio output through the audio output unit 3085.

The external device interface 3035 enables interface between the digital device 3000 and various external devices. To this end, the external device interface 3035 may include an A/V input/output unit (not shown) or a wireless communication unit (not shown).

The external device interface 3035 may be connected to an external device, such as a Digital Versatile Disk (DVD), a blu-ray, a game device, a camera, a camcorder, a computer (e.g., a laptop computer or a tablet PC), a smart phone, a Bluetooth device, a Cloud, or the like, in a wire/wireless manner The external device interface 3035 transmits a video, audio, or data (containing an image) signal externally input through the external device connected thereto, to the control unit 3070 of the digital device 3000. Also, the external device interface 3035 may output the video, audio or data signal processed by the control unit 3070 to the external device. To this end, the external device interface 3035 may further include an A/V input/output unit or a wireless communication unit (not shown).

The A/V input/output unit may include a Universal Serial Bus (USB) terminal, a CVBS terminal, a component terminal, an S-video terminal (analog), a Digital Visual Interface (DVI) terminal, a High Definition Multimedia Interface (HDMI) terminal, an RGB terminal, and a D-SUB terminal, for example, to input video and audio signals of the external device to the digital device 3000.

The wireless communication unit may perform a short range wireless communication with other electronic devices. For example, network connection between the digital device 3000 and other electronic devices may be realized via a communication protocol, such as Bluetooth, Radio Frequency Identification (RFID), infrared Data Association (IrDA), Ultra Wideband (UWB), ZigBee, Digital Living Network Alliance (DLNA), and the like.

In addition, the external device interface 3035 may be connected to various set-top boxes through at least one of the above mentioned various terminals, and may perform an input/output operation with the set-top boxes.

The external device interface 3035 may receive an application or an application list from an adjacent external device, and may transmit the same to the control unit 3070 or the storage unit 3040.

The network interface 3030 provides an interface for connecting the digital device 3000 to a wire/wireless network including an Internet network. The network interface 3030 may include an Ethernet terminal, for example, for wire network connection, or may use a communication standard, such as Wireless Local Area Network (WLAN) (Wi-Fi), Wireless broadband (Wibro), World Interoperability for Microwave Access (Wimax), and High Speed Downlink Packet Access, for example, for wireless network connection.

The network interface 3030 may transmit or receive data to and from other users or other digital devices through a network connected thereto or another network linked on the connected network. In particular, the network interface 3030 may transmit a part of content data stored in the digital device 3000 to a selected one of other users previously registered in the digital device 3000 or a selected one of other digital devices previously registered in the digital device 3000.

The network interface 3030 may access a predetermined Web page through a network connected thereto or another network linked on the connected network. That is, the network interface 3030 may transmit or receive data to or from a corresponding server by accessing the predetermined Web page through the network. Additionally, the network interface 3030 may receive content or data provided by a CP or a network manager. More specifically, the network interface 3030 may receive content, such as movies, advertisements, games, VOD, and broadcast signals, for example, and associated information provided by a CP or a network manager through a network. In addition, the network interface 3030 may receive update information and update files of firmware provided by a network manager, and may transmit data to the Internet, a CP or a network manager.

The network interface 3030 may select and receive a desired application among multiple applications that are open to the public through a network.

The storage unit 3040 may store a program for processing and controlling each signal of the control unit 3070, or may store the processed video, audio or data signal.

Also, the storage unit 3040 may temporarily store the video, audio or data signal input from the external device interface 3035 or the network interface 3030. The storage unit 3040 may store information on a predetermined broadcast channel through a channel memory function.

The storage unit 3040 may store an application or an application list input from the external device interface 3035 or the network interface 3030.

Additionally, the storage unit 3040 may store various platforms that will be described hereinafter.

For example, the storage unit 3040 may include a storage medium of at least one type of a flash memory type, a hard disk type, a multimedia card micro type, a card type memory (for example, SD or XD memory), RAM and ROM (for example, EEPROM). The digital device 3000 may play a content file (for example, a moving picture file, a still image file, a music file, a text file, and an application file) stored in the storage unit 3040 to provide the played content file to the user.

Although FIG. 3 shows the embodiment in which the storage unit 3040 and the control unit 3070 are provided separately, the scope of the invention is not limited to the embodiment of FIG. 3. The storage unit 3040 may be included in the control unit 3070.

The user input interface 3050 may transmit a signal input by the user to the control unit 3070, or may transmit a signal input from the control unit 3070 to the user.

For example, the user input interface 3050 may receive and process a control signal, such as power on/off, channel selection, and screen setup, for example, from a remote controller 3400 in accordance with various communication modes, such as an RF communication mode and IR communication mode, for example. Alternatively, the user input interface 3050 may transmit a control signal from the control unit 3070 to the remote controller 3400.

Also, the user input interface 3050 may transmit a control signal input by a local key, such as a power key, a channel key, a volume key, and a setup key, to the control unit 3070.

The user input interface 3050 may transmit a control signal input by a sensing unit (not shown), which senses gesture of the user, to the control unit 3070, or may transmit the signal from the control unit 3070 to the sensing unit. In this case, the sensing unit (not shown) may include a touch sensor, an audio sensor, a position sensor, and an action sensor, for example.

The control unit 3070 may demultiplex a stream input through the tuner 3010, the demodulator 3020 or the external device interface 3035, or may process the demultiplexed signal to generate and output a signal for a video and audio output.

The video signal processed by the control unit 3070 may be input to the display unit 3080 and be displayed as a corresponding image. Also, the video signal processed by the control unit 3070 may be input to the external output device through the external device interface 3035.

The audio signal processed by the control unit 3070 may be output to the audio output unit 3085. Also, the audio signal processed by the control unit 3070 may be input to an external output device through the external device interface 3035.

Although not shown in FIG. 3, the control unit 3070 may include a demultiplexer and a video processor, for example.

The control unit 3070 may control the overall operations of the digital device 3000. For example, the control unit 3070 may control the tuner 3010, so as to tune an RF broadcast signal corresponding to a user-selected channel or a pre-stored channel.

The control unit 3070 may control the digital device 3000 in response to a user command input through the user input interface 3050, or using a program stored therein. In particular, the control unit 3070 may access a network and download an application or an application list selected by the user to the digital device 3000 over the network.

In one example, the control unit 3070 controls the tuner 3010 so as to receive a signal of a channel selected in response to a specific channel selection command received through the user input interface 3050. Then, the control unit 3070 processes an audio, video or data signal of the selected channel. The control unit 3070 may also output, for example, information on the user-selected channel as well as the processed video or audio signal to the display unit 3080 or the audio output unit 3085.

In another example, the control unit 3070 may output a video or audio signal input from an external device, such as, for example, a camera or a camcorder through the external device interface 3035 to the display unit 3080 or the audio output unit 3085 in response to an external device video playback command received through the user input interface 3050.

The control unit 3070 may control the display device 3080 to display an image. For example, the control unit 3070 may control the display unit 3080 so as to display a broadcast image received from the tuner 3010, an externally input image received through the external device interface 3035, an image received through the network interface 3030, or an image stored in the storage unit 3040. In this case, the image displayed on the display unit 3080 may be a 2-Dimensional (2D) or 3-Dimensional (3D) still image or moving image.

Additionally, the control unit 3070 may control content playback. Here, the content may be content stored in the digital device 3000, received broadcasting content, or externally input content. The content may include at least one of a broadcast image, an externally input image, an audio file, a still image, an accessed Web page, and a text file.

In the case of entering an application view item, the control unit 3070 may control display of an application or an application list that is stored in the digital device 3000 or is downloadable from an external network.

The control unit 3070 may control installation and driving of an application downloaded from an external network in addition to various user interfaces. Also, the control unit 3070 may control the display unit 3080 to display an image associated with an application that is executed by user selection.

Although not shown in the drawings, a channel browsing processor to produce a thumbnail image corresponding to a channel signal or an externally input signal may be further provided.

The channel browsing processor may receive, for example, a stream signal output from the demodulator 3020 or a stream signal output from the external device interface 3035, extract an image from the received stream signal, and produce a thumbnail image. The produced thumbnail image may be directly input to the control unit 3070, or may be input after being encoded. Also, the produced thumbnail image may be encoded into a stream and input to the control unit 3070. The control unit 3070 may control the display unit 3080 to display a thumbnail list consisting of a plurality of input thumbnail images. The thumbnail images within the thumbnail list may be updated sequentially or simultaneously. Therefore, the user can readily identify content of a plurality of broadcasting channels.

The display unit 3080 converts the video, data and OSD signals processed by the controller 3070 or the video and data signals received from the external device interface 3035 to R, G, B signals, respectively, to generate driving signals.

The display unit 3080 may be selected from among a Plasma Display Panel (PDP), a Liquid Crystal Display (LCD), an Organic Light Emitting Diode (OLED), a flexible display, and a 3D display, for example.

The display unit 3080 may take the form of a touch-screen. In this case, the display unit 3080 may serve not only an output device, but also an input device.

The audio output unit 3085 receives a signal audio-processed by the control unit 3070, for example, a stereo signal, a 3.1 channel signal or a 5.1 channel signal, and outputs the received signal as sound. Various types of speakers may be used as the audio output unit 3085.

To sense gesture of the user, as described above, the digital device 3000 may further include a sensing unit (not shown) that includes at least one of a touch sensor, an audio sensor, a position sensor, and an action sensor. The signal sensed by the sensing unit (not shown) may be transmitted to the control unit 3070 through the user input interface 3050.

The digital device 3000 may further include an image capturing unit (not shown) to capture an image of the user. Image information taken by the image capturing unit (not shown) may be input to the control unit 3070.

The control module 3070 may sense gesture of the user by using the image captured by the image capturing unit (not shown) and the signal sensed from the sensing unit (not shown), respectively or in combination.

The power supply unit 3090 supplies corresponding power to the entire digital device 3000.

In particular, the power supply unit 3090 may supply power to the control unit 3070 that may be realized in a System on Chip (SoC) form, the display unit 3080 for image display, and the audio output unit 3085 for audio output.

To this end, the power supply unit 3090 may include a converter (not shown) that converts AC power to DC power. For example, if the display unit 3080 takes the form of a liquid crystal panel having a plurality of backlight lamps, it may further include an inverter (not shown) that is operable in a Pulse Width Modulation (PWM) manner for brightness change or dimming driving.

The remote controller 3400 transmits a user input to the user input interface 3050. To this end, the remote controller 3400 may use Bluetooth, RF communication, infrared (IR) communication, UWB, ZigBee, and the like.

Also, the remote controller 3400 may receive the video, audio or data signal output from the user input interface 3050 to display the received signal or output sound or vibration.

The above-described digital device 3000 may be a fixed type or mobile type digital broadcast receiver that can process ATSC mode or DVB mode digital broadcast signals.

The digital devices shown in FIGS. 2 and 3 are provided according to the exemplary embodiments of the present invention, and the respective components thereof may be incorporated, added or omitted depending on options of the digital device which is actually implemented. In other words, two or more components may be incorporated into one component, or one component may be divided into two or more components, as occasion demands. Also, the function performed by each block is intended for description of the embodiment of the invention, and its detailed action or device does not limit the scope of the invention.

In addition, the digital device according to the present invention may further include some components not illustrated in FIG. 2 or may omit some components illustrated in FIG. 2 as occasion demands. Unlike the embodiments illustrated in FIGS. 2 and 3, the digital device may receive and play content through the network interface or the external device interface without the tuner and the demodulator.

The digital device is an example of an image signal processor that performs signal processing of an image stored therein or an input image. Other examples of the image signal processor include a set-top box that excludes the display unit 3080 and the audio output unit 3085, the aforementioned DVD player, a blu-ray player, a game device, and a computer, as well as others.

Figure 4:
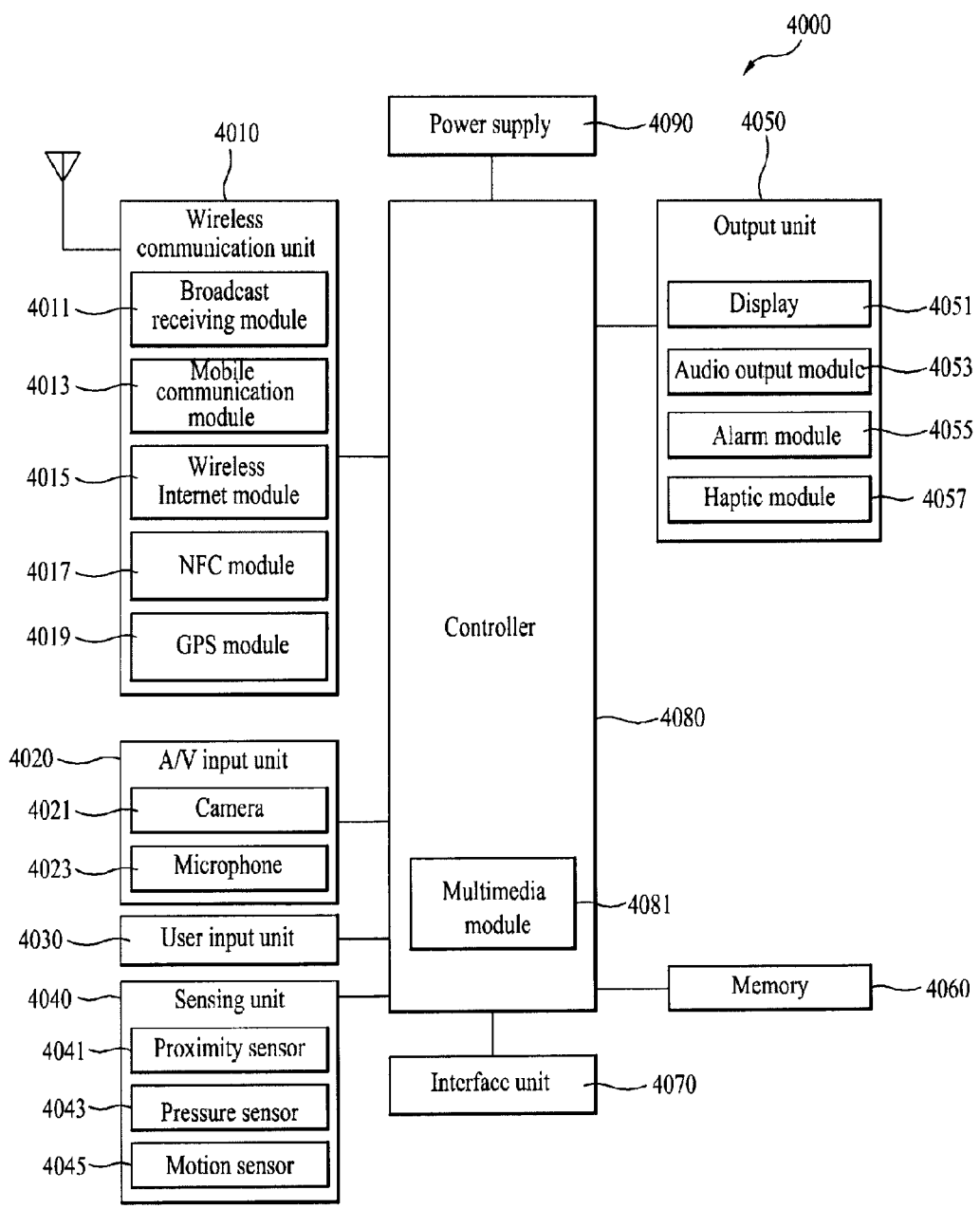
FIG. 4 is a block diagram showing a digital device according to a further exemplary embodiment of the present invention.

FIG. 4 is a block diagram showing a digital device according to a further exemplary embodiment of the present invention. In FIG. 4, a mobile terminal 4000 is given by way of one example of the digital device 1100.

Referring to FIG. 4, the mobile terminal 4000 may include a wireless communication unit 4010, an A/V input unit 4020, a user input unit 4030, a sensing unit 4040, an output unit 4050, a memory 4060, an interface 4070, a control unit 4080, and a power supply unit 4090, The wireless communication unit 4010 may include a broadcast receiving module 4011, a mobile communication module 4013, a wireless Internet module 4015, a Near Field Communication (NFC) module 4017, a Global Positioning System (GPS) module 4019, for example.

The broadcast receiving module 4011 may receive at least one of broadcast signals and broadcast associated information from an external broadcast management server through a broadcast channel. In this case, the broadcast channel may include a satellite channel and a terrestrial channel, for example.

The broadcast signals and/or broadcast associated information received through the broadcast receiving module 4011 may be stored in the memory 4060.

The mobile communication module 4013 transmits and receives a radio signal to and from at least one of a base station, an external terminal and a server over a mobile communication network. Here, the radio signal may include an audio call signal, a video call signal, or various types of data according to text and/or multimedia message transmission and/or reception.

The wireless Internet module 4015 may be a module for supporting wireless Internet access. The wireless Internet module 4015 may be built-in or externally installed to the mobile terminal 4000.

The NFC module 4017 may perform a near field magnetic induction communication. The NFC module 4017 may receive information associated with content from a media card when it accesses the media card within a predetermined distance, i.e. when tagging the media card.

Here, it may be used a near filed communication technology including Bluetooth, RFID, IrDA, UWB, ZigBee, and the like.

The GPS module 4019 may receive position information from a plurality of GPS satellites.

The A/V input unit 4020 receives an audio or video signal, and may include a camera 4021 and a microphone 4023, for example.

The user input unit 4030 may generate key input data input by the user to control an operation of the terminal. To this end, the user input unit 4030 may include a keypad, a dome switch, and a touch pad (pressure/capacitance), for example. In particular, in the case in which a touch pad and the display unit 4051 which will be described later form an interlayer structure, it may be referred to as a touch screen.

The sensing unit 4040 may sense a current state of the mobile terminal 4000, such as an open or closed state of the mobile terminal 4000, a position of the mobile terminal 4000, or whether or not the user touches the mobile terminal 4000, for example. The sensing unit 4040 may generate a sensing signal to control an operation of the mobile terminal 4000.

The sensing unit 4040 may include a proximity sensor 4041, a pressure sensor 4043, and a motion sensor 4045, for example. The motion sensor 4045 may sense, for example, a motion or position of the mobile terminal 4000 using an acceleration sensor, a gyro sensor, a gravity sensor, and the like. In particular, the gyro sensor is a sensor to measure angular velocity and may sense orientation (rotating angle) on the basis of a reference direction.

The output unit 4050 may include a display unit 4051, an audio output module 4053, an alarm module 4055, and a haptic module 4057, for example.

The display unit 4051 displays information processed in the mobile terminal 4000.

As described above, in the case in which the display unit 4051 and the touch pad form an interlayer structure that will be referred to as a touch-screen, the display unit 4051 may also serve as not only an output device, but also an input device that allows the user to touch input information.

The audio output module 4053 may output audio data received from the wireless communication unit 4010 or stored in the memory 4060. The audio output module 4053 may include a speaker, a buzzer, and the like.

The alarm module 4055 outputs a signal to indicate generation of an event of the mobile terminal 4000. For example, the alarm module 4055 may output a signal in the form of vibration.

The haptic module 4057 generates various tactile effects that the user can perceive. A representative example of a tactile effect generated by the haptic module 4057 is vibration.

The memory 4060 may store a program for the processing and control of the control unit 4080, and may perform functions for temporarily storage of input/output data (for example, a phonebook, messages, moving images, and still images).

The interface unit 4070 may perform a role of interfacing to all external devices connected to the mobile terminal 4000. The interface unit 4070 may allow a data reception from an external device, a power delivery to each component in the mobile terminal 4000, or a data transmission from the mobile terminal 4000 to an external device.

The control unit 4080 typically controls the overall operations of the mobile terminal 4000 by controlling operations of the respective units. For example, the control unit 4080 may perform control and processing associated with an audio call, a video call, data communication, and the like. The control unit 4080 may include a multimedia playback module 4081 for playing a multimedia. The multimedia playback module 4081 may be hardware within the control unit 4080, or may be software separate from the control unit 4080.

The power supply unit 4090 receives external and internal power and provides power required by various components under the control of the control unit 4080.

The mobile terminal 4000 having the above-described configuration may include a wire/wireless communication system and a satellite based communication system, and may be operable in a communication system capable of transmitting data through a frame or a packet.

Figure 5:
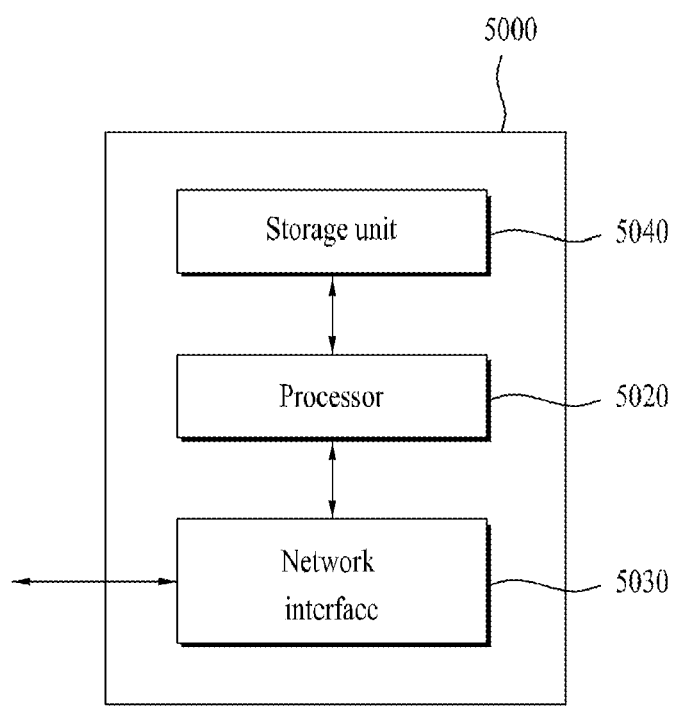
FIG. 5 is a block diagram showing an exemplary configuration of a service provider shown in FIG. 1.

FIG. 5 is a block diagram showing an exemplary configuration of the SP 1020 shown in FIG. 1. In the following description with reference to FIG. 5, the SP 1020 will be referred to as a server 5000.

Referring to FIG. 5, the server 5000 may include a network interface 5030, a storage unit 5040, and a processor 5020.

The network interface 5030 may receive a request for a content list, associated with a home screen of the image display device 2000, from the image display device 2000, and correspondingly may transmit the content list associated with the home screen to the image display device 2000.

Alternatively, the network interface 5030 may receive a request for a content list, associated with the home screen of the image display device 2000, from the mobile terminal 4000, and correspondingly may transmit the content list associated with the home screen to the image display device 2000.

Also, the network interface 5030 may receive a request for transmission of content, corresponding to a selected item, from the image display device 2000, and correspondingly may transmit the content corresponding to the selected item to the image display device 2000.

The storage unit 5040 may store authentication information for authentication with the image display device 2000, and may store device information on the image display device 2000. In this case, the authentication information or the device information may be sorted and stored on a per user basis of the image display device.

The storage unit 5040 may store authentication information for authentication with the mobile terminal 4000, and may store device information on the mobile terminal 4000. In this case, the authentication information or the device information may be sorted and stored on a per user basis of the mobile terminal 4000.

The authentication information and device information on the image display device 2000 and the authentication information and device information on the mobile terminal 4000 may be linked with each other. For example, the authentication information of the image display device 2000 and the authentication information of the mobile terminal 4000 may be identical on a per user basis.

The storage unit 5040 may store a content list associated with the home screen of the image display device 2000 on a per image display device basis or on a per user basis. Also, the storage unit 5040 may store content within the corresponding content list.

In the case in which the image display device 2000 requests a content list associated with the home screen, or in the case in which the image display device 2000 requests transmission of content corresponding a selected item within the content list, the processor 5020 may control transmission of the content list or the corresponding content to the image display device 2000 in response to the corresponding request.

Figure 6:
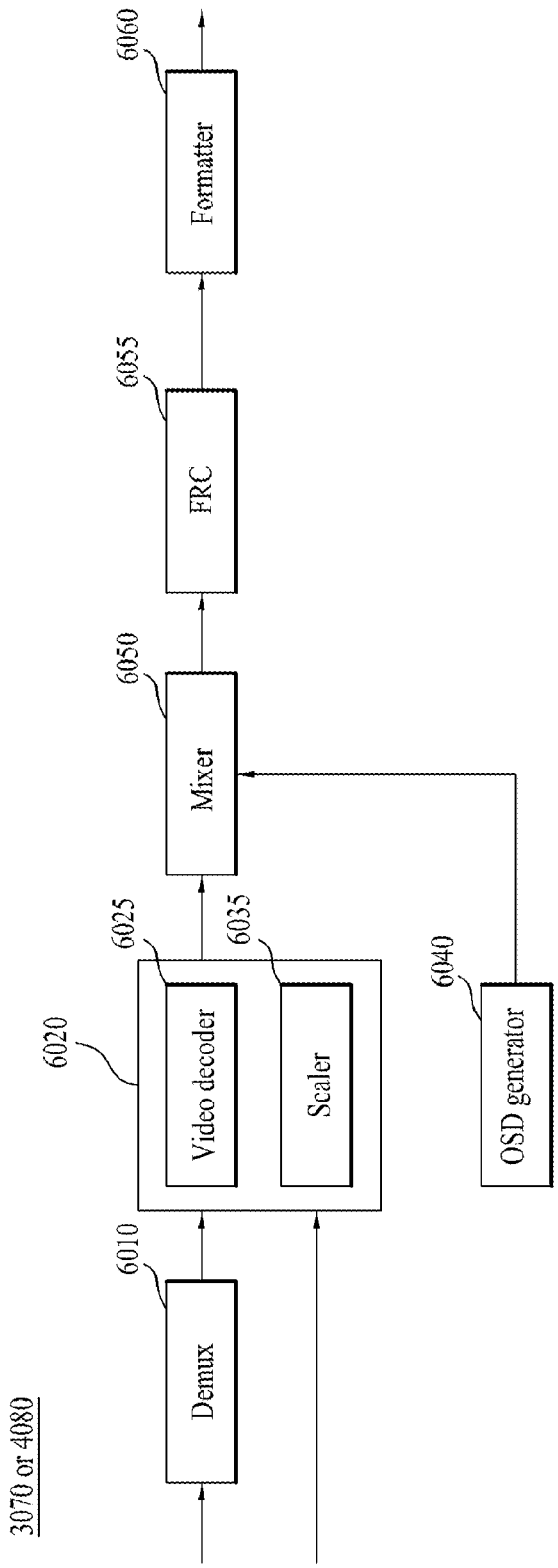
FIG. 6 is a block diagram showing an exemplary configuration of a control unit shown in FIG. 3.

FIG. 6 is a block diagram showing an exemplary configuration of the control unit shown in FIG. 3 or 4 or of the processor shown in FIG. 5. A control unit 3070 or 4080 will be described hereinafter in more detail with reference to FIGS. 2 to 5.

According to an exemplary embodiment of the present invention, the control unit 3070 or 4080 may include a DEMUX 6010, a video processor 6020, an On Screen Display generator 6040, a mixer 6050, a Frame Rate Converter (FRC) 6055, and a formatter 6060. Additionally, although not shown, the control unit 3070 or 4080 may further include an audio processor and a data processor.

The DEMUX 6010 demultiplexes an input stream. For example, the DEMUX 6010 may demultiplex an input MPEG-2 TS into a video signal, an audio signal, and a data signal. Here, the stream signal input to the DEMUX 6010 may be a stream signal output from the tuner 3010, the demodulator 3020, or the external device interface 3035.

The video processor 6020 may process the demultiplexed video signal. For video signal processing, the video processor 6020 may include a video decoder 6025 and a scaler 6035.

The video decoder 6025 decodes the demultiplexed video signal, and the scaler 6035 scales the decoded video signal so that the video signal can be displayed on the display unit 3080 or 4051.

The video decoder 6025 may operate based on various standards. For example, the video decoder 6025 may function as an MPEG-2 decoder in the case in which the video signal is an MPEG-2 encoded video signal. Also, the video decoder 6025 may function as an H.264 decoder in the case in which the video signal is a Digital Multimedia Broadcasting (DMB) or H.264 encoded signal.

The video signal decoded by the video processor 6020 is input to the mixer 6050.

The OSD generator 6040 generates OSD data autonomously or in response to a user input. For example, the OSD generator 6040 generates data, by which a variety of data is displayed as graphics or text on a screen of the display unit, based on a control signal of the user input interface. The generated OSD data includes various data, such as a UI screen of the digital device, a variety of menu screens, widgets, icons, and information on an audience rating, for example.

The OSD generator 6040 may generate data, by which subtitles are displayed for a broadcast image or EPG-based broadcasting information.

The mixer 6050 may mix the decoded video signal processed by the video processor 6020 with the OSD data generated by the OSD generator 6040, and output the mixed signal to the formatter 6060. As the decoded video signal is mixed with the OSD data, an OSD may be overlaid on the broadcast image or the externally input image.

The FRC 6055 may change the frame rate of an input image. For example, the FRC 6055 may change a frame rate of 60 Hz of an input image into a frame rate of 120 or 240 Hz according to an output frequency of the display unit. As described above, a variety of methods to change the frame range may be used. In one example, in the case in which the frame rate is to be changed from 60 Hz to 120 Hz, the FRC 6055 may insert a first frame between the first frame and a second frame, or a predicted third frame between the first and second frames. In another example, in the case in which the frame rate is to be changed from 60 Hz to 240 Hz, the FRC 6055 may insert three identical frames or three predicted frames between the first and second frames. It is also possible to bypass the FRC 6055 when frame rate conversion is not performed.

The formatter 6060 changes the output of the FRC 6055 to suit the output format of the display unit. For example, the formatter 6060 may convert a received signal into an RGB data signal. The RGB signal may be output in the form of a Low Voltage Differential Signal (LVDS) or mini-LVDS. Also, in the case in which the FRC 6055 outputs a 3D video signal, the formatter 6060 converts the 3D video signal into a 3D signal to suit the output format of the display unit, thereby assisting a 3D service via the display unit.

The audio processor (not shown) of the control unit 3070 or 4080 may process the demultiplexed audio signal. For audio signal processing, the audio processor (not shown) may be configured to process a variety of formats. For example, in the case in which the audio signal is encoded into an MPEG-2, MPEG-4, MPEG-Surround, AAC, HE-AAC, AC-3, and BSAC format, the audio processor (not shown) may include corresponding decoders to process the respective encoded signals.

The audio processor (not shown) within the control unit 3070 or 4080 may also adjust the base, treble, and volume of the audio signal.

The data processor (not shown) within the control unit 3070 or 4080 may process the demultiplexed data signal. For example, in the case in which the demultiplexed data signal is an encoded data signal, the data processor may decode the encoded data signal. Here, the encoded data signal may include EPG information, which includes broadcast information specifying the start time, end time, etc. of scheduled broadcast programs of each channel.

The control unit 3070 or 4080 shown in FIG. 6 is given by way of example, and other components may be added or some of the illustrated components may be omitted according to the needs of those skilled in the art.

Figure 7:
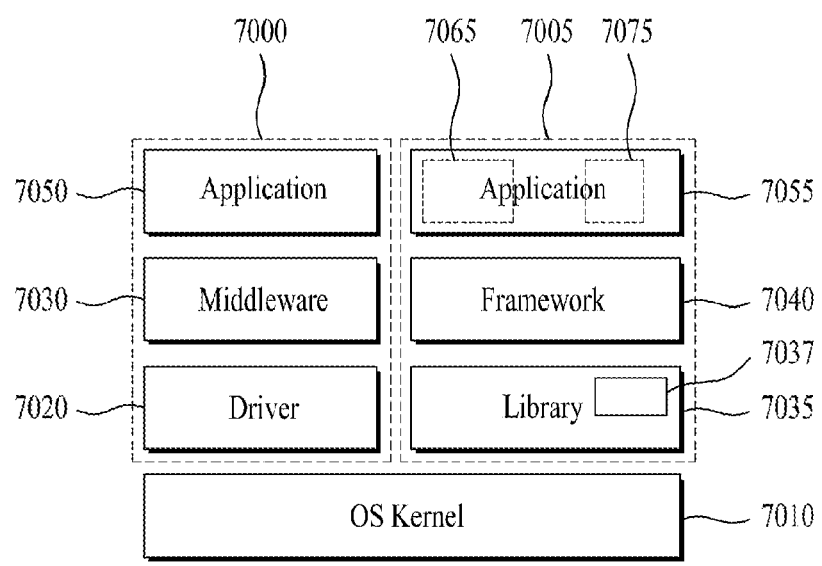
FIGS. 7 and 8 are block diagrams showing various exemplary configurations of a smart system platform provided in an image display device of FIG. 2.
Figure 8:
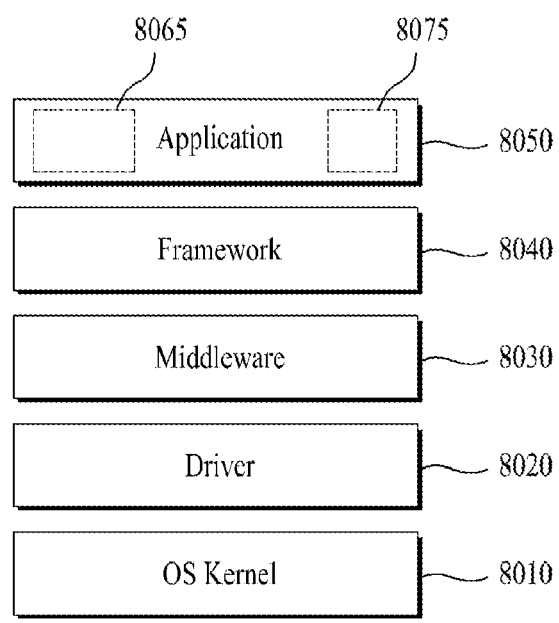

FIGS. 7 and 8 are block diagrams showing various exemplary configurations of a platform provided in the image display device.

A platform for the image display device 2000 according to the embodiment of the present invention may have OS-based software to implement the above-described various operations.

Referring first to FIG. 7, the platform for the image display device 2000 according to the embodiment of the present invention is of a separate-type. The platform may be designed separately from a legacy system platform 7000 and a smart system platform 7005. An OS kernel 7010 may be shared between the legacy system platform 7000 and the smart system platform 7005.

The legacy system platform 7000 may include a stack of a driver 7020, middleware 7030, and an application layer 7050 on the OS kernel 7010. The smart system platform 7005 may include a stack of a library 7035, a framework 7040, and an application layer 7055 on the OS kernel 7010.

The OS kernel 7010 is the core of an operating system. When the image display device 2000 is driven, the OS kernel 7010 may be responsible for operation of at least one of control of hardware drivers, security protection for hardware and processors in the image display device 2000, efficient management of system resources, memory management, hardware interfacing by hardware abstraction, multi-processing, and scheduling associated with multi-processing. Meanwhile, the OS kernel 7010 may further perform power management.

The hardware drivers within the OS kernel 7010 may include, for example, at least one of a display driver, a Wi-Fi driver, a Bluetooth driver, a USB driver, an audio driver, a power manager, a binder driver, and a memory driver.

The hardware drivers within the OS kernel 7010 may be a driver for hardware devices within the OS kernel 7010. The hardware drivers may include a character device driver, a block device driver, and a network device driver. The block device driver may need a buffer for buffering data on a per block basis, because data is transmitted on a per block basis. The character device driver may not require a buffer since data is transmitted on a per basic data unit basis, that is, on a per character basis.

The OS kernel 7010 may be implemented based on any of various Oss, such as Unix (Linux), Windows, etc. The OS kernel 7010 may be a general-purpose open kernel which can be implemented in other electronic devices.

The driver 7020 is interposed between the OS kernel 7010 and the middleware 7030. Along with the middleware 7030, the driver 7020 drives devices for operation of the application layer 7050. For example, the driver 7020 may include a driver (s) for a microcomputer, a display module, a Graphics Processing Unit (GPU), an FRC, a General-Purpose Input/Output (GPIO) pin, a HDMI, a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 7010.

In addition, the driver 7020 may further include a driver for the remote controller, especially a 3D pointing device that will be described below. The driver for the 3D pointing device may be located in the OS kernel 7010 or the middleware 7030, instead of the driver 7020.

The middleware 7030 may be located between the OS kernel 7010 and the application layer 7050. The middleware 7030 may mediate between different hardware devices or different software programs, for data transmission and reception between the hardware devices or the software programs. Therefore, the middleware 7030 can provide standard interfaces, support various environments, and enable interaction between tasks conforming to heterogeneous communication protocols.

Examples of the middleware 7030 in the legacy system platform 7000 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 7050 on the middleware 7030, i.e. the application layer 7050 in the legacy system platform 7000 may include, for example, UI applications associated with various menus in the image display device. The application layer 7050 on top of the middleware 7030 may allow editing and updating over a network by user selection. Through use of the application layer 7050, the user may enter a desired menu among various user interfaces by manipulating the remote controller while viewing a broadcast program.

The application layer 7050 in the legacy system platform 7000 may further include at least one of a TV guide application, a Bluetooth application, a reservation application, a Digital Video Recorder (DVR) application, and a hotkey application.

In the smart system platform 7005, the library 7035 is positioned between the OS kernel 7010 and the framework 7040, forming the basis of the framework 7040. For example, the library 7035 may include Secure Socket Layer (SSL) (a security-related library), WebKit (a Web engine-related library), c library (libc), and Media Framework (a media-related library) specifying, for example, a video format and an audio format. The library 7035 may be written in C or C++. Also, the library 7035 may be exposed to a developer through the framework 7040.

The library 7035 may include a runtime 7037 with a core Java library and a Virtual Machine (VM). The runtime 7037 and the library 7035 form the basis of the framework 7040.

The VM may be a virtual machine that enables concurrent execution of a plurality of instances, that is, multi-tasking. For each application of the application layer 7055, a VM may be allocated and executed. In this case, for scheduling or interconnection between the plurality of instances, the binder driver (not shown) of the OS kernel 7010 may be operated.

The binder driver and the runtime 7037 may connect Java-based applications to C-based libraries.

The library 7035 and the runtime 7037 may correspond to the middleware 7030 of the legacy system platform 7000.

In the smart system platform 7005, the framework 7040 includes programs on which applications of the application layer 7055 are based. The framework 7040 is compatible with any application and may allow component reuse, movement or exchange. The framework 7040 may include supporting programs and programs for interconnecting different software components. For example, the framework 7040 may include a resource manager, an activity manager related to activities of applications, a notification manager, and a CP for abstracting common information between applications. This framework 7040 may be written in Java.

The application layer 7055 on top of the framework 7040 includes a variety of programs that can be executed and displayed in the image display device. The application layer 7055 may include, for example, a core application that provides at least one of e-mail, a Short Message Service (SMS), calendar, map, or browser functions. The application layer 7055 may be written in Java.

In the application layer 7055, applications may be categorized into user-undeletable applications 7065 stored in the image display device or user-deletable applications 7075 that are downloaded from an external device or a network and stored in the image display device so as to be freely installed or omitted by the user.

Using the applications of the application layer 7055, a variety of functions, such as an Internet telephony service, a VOD service, a Web album service, a Social-Networking Service (SNS), a Location-Based Service (LBS), a map service, a Web browsing service, and an application search service may be performed through network access. In addition, other functions, such as gaming and schedule management, may be performed by the applications.

Referring next to FIG. 8, a platform for the image display device 2000 according to another embodiment of the present invention is of an integrated type. The integrated-type platform may include an OS kernel 8010, a driver 8020, middleware 8030, a framework 8040, and an application layer 8050.

The integrated-type platform shown in FIG. 8 is different from the separate-type platform shown in FIG. 7 in that the library 7035 shown in FIG. 7 is deleted and the application layer 8050 is included as an integrated layer. The driver 8020 and the framework 8040 correspond to the driver 7020 and the framework 7040 of FIG. 7, respectively.

The library 7035 of FIG. 7 may be incorporated into the middleware 8030 of FIG. 8. That is, the middleware 8030 may include both the legacy system middleware and the image display device system middleware. As described above, the legacy system middleware includes MHEG or ACAP as data broadcasting-related middleware, PSIP or SI middleware as broadcasting information-related middleware, and DLNA middleware as peripheral device communication-related middleware, and the image display system middleware includes SSL as a security-related library, WebKit as a Web engine-related library, libc, and Media Framework as a media-related library. The middleware 8030 may further include the above-described runtime.

The application layer 8050 may include a menu-related application, a TV guide application, and reservation application, for example, as legacy system applications, and e-mail, SMS, a calendar, a map, and a browser, for example, as image display system applications.

In the application layer 8050, applications may be categorized into user-undeletable applications 8065 that are stored in the image display device and user-installable or user-deletable applications 8075 that are downloaded from an external device or a network and stored in the image display device.

The above-described platform shown in FIGS. 7 and 8 may be used in a variety of general-purpose electronic devices as well as the image display device 2000.

Also, the platform shown in FIGS. 7 and 8 may be loaded on the above-described storage unit or control unit, or on a separate processor (not shown).

Figure 9:
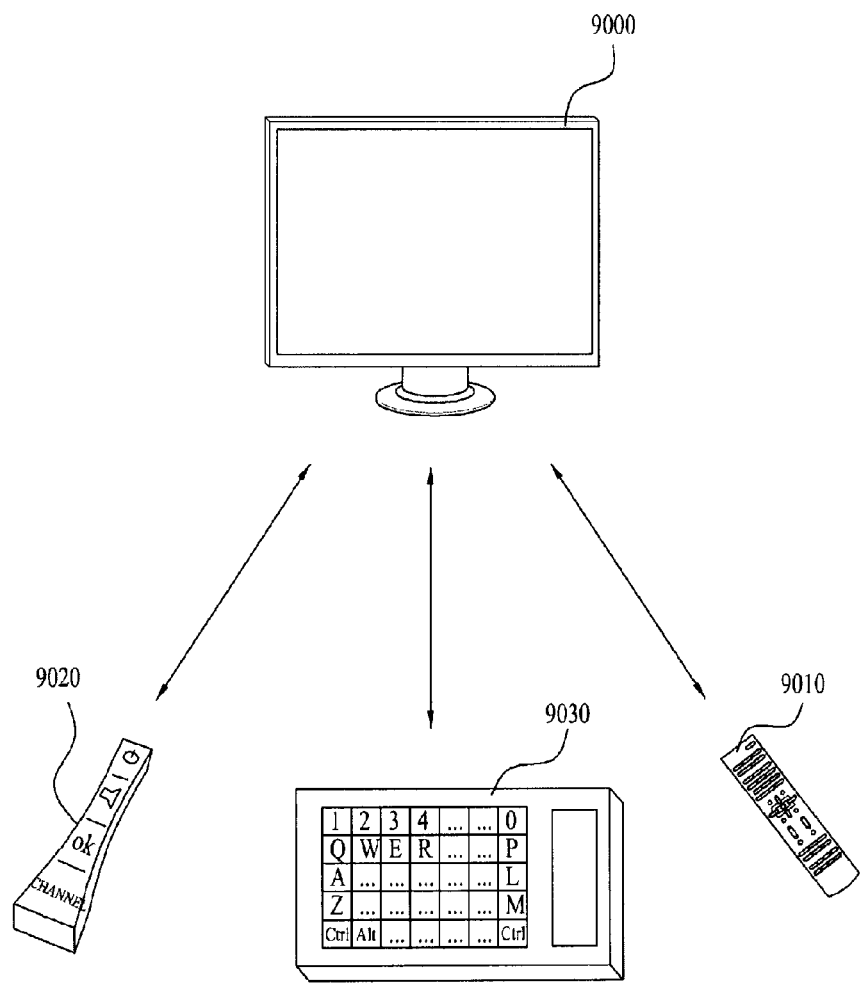
FIG. 9 is a diagram showing remote controllers usable with a digital device according to the present invention.

FIG. 9 is a diagram showing remote controllers usable with a digital device according to the present invention.

To perform a variety of operations according to embodiments of the present invention, a variety of User Interface Devices (UIDs) that enable wire/wireless communication with a digital device 9000 may be used as remote controllers.

Communication means for the remote controllers may be selected from among a variety of communication standards, such as, for example, Bluetooth, RFID, IrDA, UWB, ZigBee, and DLNA.

The UID may include a typical remote controller 9010, a magic remote controller 9020, and a remote controller 9030 consisting of a keyboard and a touch pad, for example.

The magic remote controller 9020 may be equipped with a gyro sensor therein to detect trembling or rotation of the hand. That is, the magic remote controller 9020 may move a pointer as the user moves the magic remote controller 9020 up and down, side to side, and back and forth, which assists the user in easily performing a desired operation, for example, in easily controlling a channel or a menu.

In the remote controller 9030 consisting of a keyboard and a touch pad, the keyboard facilitates easy input of text, and the touch pad facilitates easy movement of the pointer and control in the expansion and reduction of pictures or moving images.

Hereinafter, for example, an EPG/thumbnail image/channel browser service according to the present invention will be described in more detail. To provide the aforementioned service, a digital system or a service system (hereinafter referred to as the digital system), for example, may be constituted of at least one device corresponding to a client, and a server. Meanwhile, in the following description, "service data" refers to data for at least one of an EPG service, a thumbnail image service, and a channel browser service.

In the following description, to assist understanding of the present invention and for convenience of explanation, a service between the device and the server of the digital system will be described as being divided into an operation of transmitting service data from the digital device to the server and storing and processing the transmitted service data in the server, an operation of transmitting the processed service data from the server to the digital device, and an operation of processing the service data transmitted from the server between digital devices.

In particular, examples of the operation of processing service data between the digital devices may include the case in which a mobile terminal controls a digital television receiver using service data, or the case in which service data is shared via a Social Network Service, such as Twitter, and the like.

According to the present invention, the digital device can provide a user-friendly service close to an actual broadcasting environment by acquiring a greater quantity of various data than in the related art in relation to an EPG/thumbnail image/channel browser service in response to a user request. An example of this user-friendly service is an Advanced EPG.

First, the operation of transmitting service data from the digital device to the server and storing and processing the transmitted service data in the server, and the operation of transmitting the processed service data from the server to the digital device will be described as follows.

As set forth herein, the digital device may include, for example, a digital television receiver such as a smart TV, and a mobile terminal, such as a tablet PC or a smart phone. In the following description, the digital device will be referred to as the digital television receiver or the mobile terminal as necessary. However, it will be clearly understood that the present invention is not essentially limited to the above-described digital television receiver or mobile terminal and is applicable based on the same or similar principle to other communicable electronic devices.

For example, an operation of acquiring EPG/thumbnail image/channel browser service data using the digital device is as follows.

Figure 10:
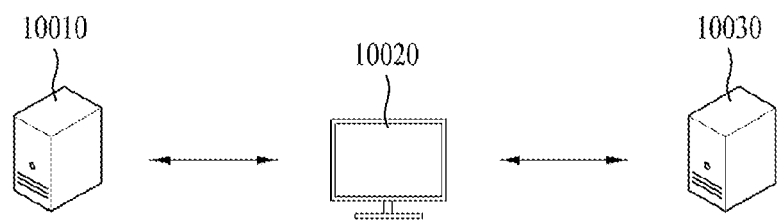
FIG. 10 is an explanatory diagram showing an example of acquiring EPG/thumbnail image/channel browser service data according to the present invention.

FIG. 10 is an explanatory diagram showing an example of acquiring EPG/thumbnail image/channel browser service data according to the present invention.

A digital device 10020 may provide at least one of an EPG service, a thumbnail image service, and a channel browser service, for example, as will be described below.

The digital device 10020 may receive EPG/thumbnail image/channel browser service data from a digital broadcast signal or from service information contained in the digital broadcast signal transmitted from a transmitter (for example, a broadcasting station) 10010, configure a corresponding service based on the received service data, and provide the service to the user.

Alternatively, the digital device 10020 may receive EPG/thumbnail image/channel browser service data from a separate external server 10030 that is provided for provision of a particular service, configure a corresponding service based on the received service data, and provide the service to the user.

In particular, in the case of the EPG service, generally, the digital device 10020 tunes to a particular channel in response to a user request, such that the EPG service is acquired from service information contained in a digital broadcast signal received from the tuned channel. To this end, the format of service information in a transmitter may change according to an ATSC mode or a DVB mode. For example, DVB Terrestrial (DVB-T) service information may contain Program Association Table (PAT), Program Map Table (PMT), Virtual Channel Table/Service Description Table (VCT/SDT) and Event Information Table (EIT), for example. In this case, the digital device 10020 may autonomously configure the EPG service based on the received service data, and provide the EPG service in response to a user request.

On the other hand, in the latter case, the external server 10030 may provide additional data that is not provided by the broadcasting station 10010, or various other service data about a prime time or a prime program.

As described above, the digital device 10020 may receive the service data transmitted from the broadcasting station 10010 and/or the external server 10030, and provide the received service data to the user.

Figure 11:
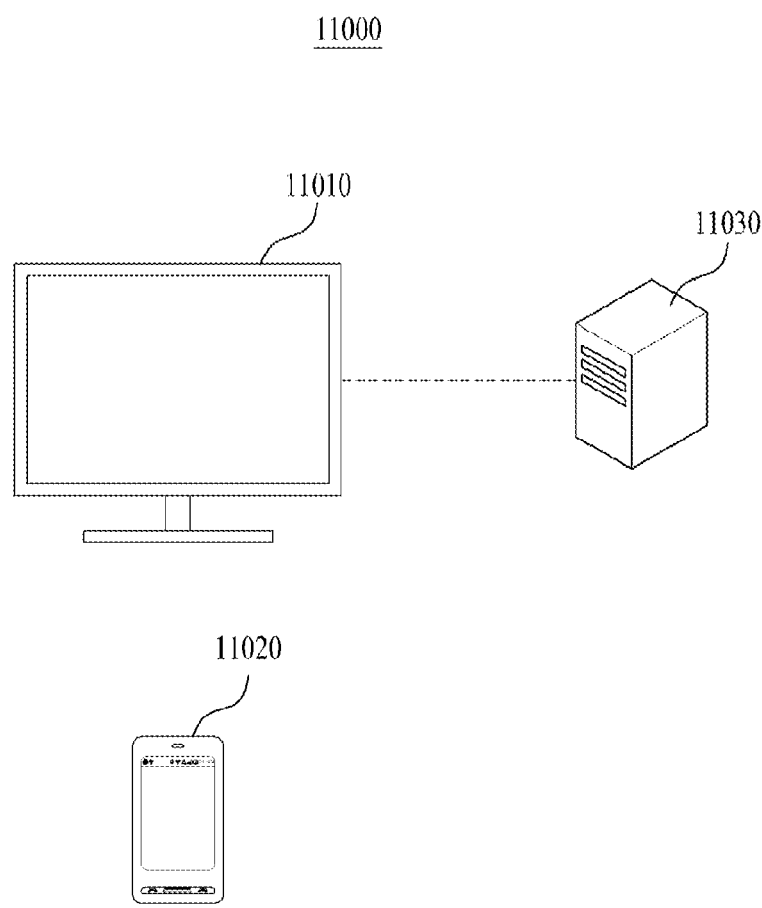
FIG. 11 is a diagram schematically showing an image display system according to an exemplary embodiment of the present invention.

FIG. 11 is a diagram schematically showing an image display system according to an embodiment of the present invention.

Referring to FIG. 11, the image display system 11000 according to the embodiment of the present invention may include an image display device 11010, a mobile terminal 11020, and a server 11030.

The image display device 11010 may display an image, more particularly, a broadcast image. To this end, the image display device 11010 may include a broadcast receiver as will be described below.

A home screen of the image display device 11010 may contain a broadcast image, a content list, and an application menu, for example. The image display device 11010 may display the home screen.

The image display device 11010 may be connected to the mobile terminal 11020 or the server 11030 via a network. For example, the image display device 11010 may receive, for example, a content list or an application program from the server 11030, and may transmit, for example, the received content list or application program to the mobile terminal 11020.

The image display device 11010 may include the above-described legacy system platform shown in FIG. 7 or the above-described smart system platform shown in FIG. 8.

Examples of the image display device 11010 may include a TV, a monitor, and a computer, which can display a broadcast program.

The mobile terminal 11020 may perform wireless communication. To this end, the mobile terminal 11020 may include a wireless communication unit as will be described below.

The mobile terminal 11020 may execute a remote control application capable of controlling the image display device 11010 remotely. That is, the mobile terminal 11020 may execute a remote control mode with respect to the image display device 11010.

The mobile terminal 11020 may be connected to the image display device 11010 or the server 11030 via a network. For example, the mobile terminal 11020 may receive, for example, a content list and an application program from the image display device 11010 or the server 11030. Also, if a specific item within the content list is selected, the mobile terminal 11020 may transmit information on the selected item to the image display device 11010.

Examples of the mobile terminal 11020 include a cellular phone, a smart phone, a tablet PC, a digital camera, a camcorder, and a portable printer.

The server 11030 may provide content. To this end, the server 11030 may include a storage unit for storing content as will be described below.

The server 11030 may be connected to the image display device 11010 or the mobile terminal 11020 via a network. For example, the server 11030 may receive, for example, a content list transmission request, an application program transmission request, and a content transmission request from the image display device 11010 or the mobile terminal 11020. Also, the server 11030 may transmit, for example, content and a content list to the image display device 11010, and transmit, for example, a content list and an application program to the mobile terminal 11020.

The server 11030 may be any one of a content server for providing content, a service server for providing a service, and a network server for providing a network.

Figure 12:
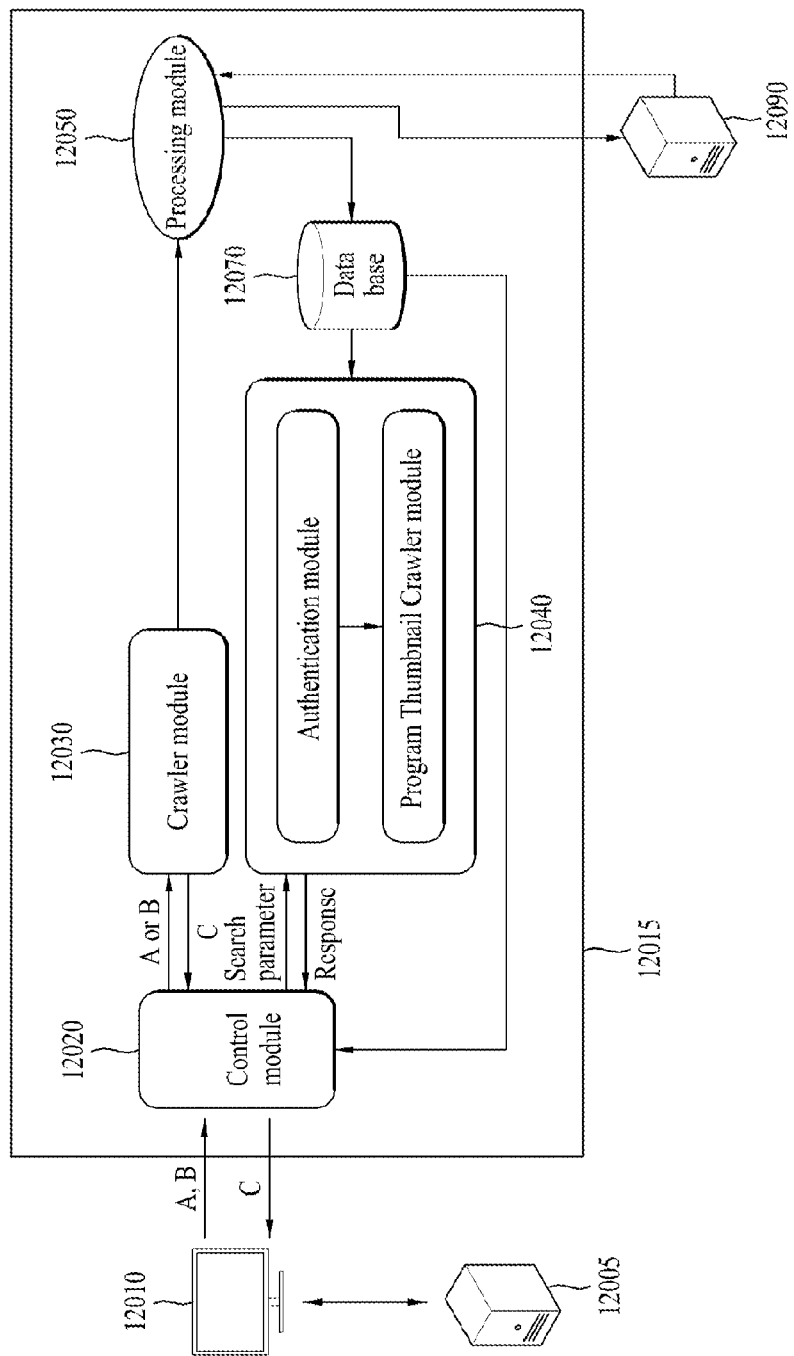
FIG. 12 is a block diagram showing a digital system according to an exemplary embodiment of the present invention.

FIG. 12 is an explanatory diagram showing a digital system according to an exemplary embodiment of the present invention.

Referring to FIG. 12, the digital system according to the embodiment of the present invention includes a digital device 12010, and a data server 12015. The digital system may further include a broadcast station 12005, an external server 12090, and the like, as necessary.

The digital device 12010 may be any one of a mobile terminal and a digital television receiver as an image display device.

The data server 12015 may be a server of a manufacturer of the mobile terminal or the digital television receiver.

As described above, the digital device 12010 may receive EPG/thumbnail image/channel browser service data from a digital broadcast signal and/or from service information contained in the digital broadcast signal transmitted from the broadcasting station 12005 and/or the external server 12090.

However, in the case in which the EPG/thumbnail image/channel browser service data, which can be acquired by the single digital device 12010, is acquired from a digital broadcast signal received by directly tuning to a corresponding channel via a tuner, or is acquired from the external server 12090, generally, service coverage per area is low (less than 50%). Therefore, the digital device 12010 has a difficulty in providing an EPG/thumbnail image/channel browser service that reflects an actual service environment. That is, the single digital device 12010 may frequently fail to provide a user requested data service or a searched data service under the above-described environment.

As will be described hereinafter, according to the present invention, the data server 12015 is built and used to address the problem in that it is actually difficult to appropriately reply to a user request for the EPG/thumbnail image/channel browser service using only the broadcasting station 12005 or the external server 12090.

In the digital system according to the present invention, the data server 12015 may serve to collect EPG/thumbnail image/channel browser service data from respective digital devices and to store, process and manage the service data, thereby ensuring that the digital devices can provide a higher quality of various services to the user.

Unlike digital devices of the related art, according to the present invention, as the data server 12015 can collect EPG/thumbnail image/channel browser service data acquired from a plurality of digital devices that have the same service list, and/or can couple or combine EPG/thumbnail image/channel browser service data acquired from the external server 12090 to transmit the processed service data to the respective digital devices. In this way, an upgraded service can be acquired from an abundance of the latest high-quality service data within a short time.

The collection, processing, storage and management of the service data between the digital device 12010 and the data server 12015 will hereinafter be described in more detail with reference to FIG. 12.

In the embodiment of the present invention, as shown in FIG. 12, the data server 12015 includes a control module 12020, an EPG processor, and a thumbnail processor 12040.

The EPG processor may include an EPG crawler module 12030, a processing module 12050, and a DB 12070.

The digital device 12010, for provision of the EPG service according to the present invention, performs a registration or authentication procedure by communicating with the data server 12015.

For example, the digital device 12010 initially transmits device information thereof to the data server 12015 (A), and receives a setting value from the data server 12015 based on the transmitted device information (C). In the following description, the setting value, for example, will be referred to as a service list set identifier.

The device information includes, for example, at least one of a device model, device country, language, receiver type, channel or service list, and user ID.

The device model is, for example, a device model number or ID, which is important for transmission of accurate information to prevent a possible service error because even products of the same manufacturer may have differences in options or support services according to device model.

The device country may mean Korea (KR), Germany (DE), and England (UK), for example.

The language indicates, for example, language used in the country of the device, and may include language that can be supported via a caption function in the corresponding device.

The receiver type may mean terrestrial, cable, satellite, IPTV, and mobile, for example.

The service list may mean a list of services or channels that can be accessed or used by the digital device through auto-scan, for example. The service list may further include service name or channel name, for example.

The user ID is used to determine, for example, whether or not a corresponding user is a registered user, and whether or not the corresponding user is a proper user via user authentication. The user ID may be an inherent value allotted per device or per manufacturer.

If the digital device 12010 performs auto-scan, as described above, the digital device 12010 collects device information, and transmits the device information to the data server 12015. The device information may further include three identifiers (hereinafter referred to as 3-ID), in addition to the aforementioned information. The 3-ID may be transmitted in particular information, such as the service list among the device information.

The 3-ID may include an original network identifier, a transport stream identifier, and a service identifier, for example.

The 3-ID may serve as a reference that allows any one country to identify a device that can share the same service, for example, service data per receiver type. Alternatively, identification of the service may be accomplished using a service name or channel name acquired from the EPG service data as well as the 3-ID.

For example, the digital device 12010 may configure device information with a device country of UK, a receiver type of MUX (DVB-T), and a service list in a format of dvb://233a.2f.1, and transmit the configured device information to the data server 12015. In this case, "233a" may mean an original network identifier that represents an area, "2f" may mean a transport stream identifier that represents MUX, and "1" may mean a service identifier that represents a service.

Meanwhile, the data server 12015 determines a group to which the corresponding digital device belongs, based on the device information transmitted from the digital device 12010. Here, the 3-ID within the device information may be used for determination of the group. The data server 12015 transmits group identification information, i.e., the aforementioned service list set identifier to the corresponding digital device based on the determined result.

In the following description, the group will be referred to as a super set. The service list set identifier, for example, is information provided as the data server 12015 configures a super set to be managed together based on the country and receiver type information within the device information of each digital device, and determines a super set to which a specific receiver is allocated.

The service list set identifier functions as identification information between the digital device 12010 and the data server 12015.

In other words, so long as there is no special circumstance after a single service list set identifier is allotted for information exchange between the digital device 12010 and the data server 12015, an appropriate process may be possible with only the allotted service list set identifier in the following procedures.

For example, when updating EPG/thumbnail image/channel browser service data from each digital device to the data server 12015 or when transmitting the EPG/thumbnail image/channel browser service data from the data server 12015 to each digital device, collection, processing, and management of all data may be performed using or based on the service list set identifier.

In the present invention, the service list set identifier is a value for identifying a bundle of service lists, i.e., super sets if the data server 12015 manages the EPG/thumbnail image/channel browser service data on a per service list basis. In general, as described above, two types of the device information, i.e., the country and receiver type information may constitute the super set. For example, in the case of Europe, if 3-ID is equally used in one country on a per receiver type basis, the service lists may be regarded as the same service.

Referring to FIG. 12, after the procedure A, each digital device may transmit EPG service data including previously allotted 3-UD to the data server 12015 to update the EPG service data periodically or non-periodically (B).

In this case, initial transmission of the EPG service data may be performed at the aforementioned procedure A, for example.

The transmitted EPG service data may be configured by the digital device 12010 based on service information which includes the EPG/thumbnail image/channel browser service data within a digital broadcast signal transmitted from the broadcasting station 12005.

As described above, the service information, which includes the EPG service data, for example, includes an event and VCT/SDT associated with a service, i.e., an EIT associated with a program, in the case of DVB terrestrial.

In other words, the digital television receiver 12010 extracts data for configuring EPG by parsing VCT/SDT and EIT from the digital broadcast signal, stores the extracted data in a storage unit, reads the stored data in the aforementioned 3-ID format, and transmits the read data and the aforementioned 3-ID, i.e. the service list set identifier to the data server 12015.

The data server 12015 may receive the EPG/thumbnail image/channel browser service data from each digital device, and transmit the received data directly or after processing the received data. The data server 12015 may use the EPG/thumbnail image/channel browser service data transmitted from the external server 12090 when processing the data received from each digital device. However, if the EPG/thumbnail image/channel browser service data from the external server 12090 collide with the EPG/thumbnail image/channel browser service data from each digital receiver during the processing procedure, any one of the data from the external server 12090 and the data from each digital device based on SI information may be used. For example, the data server 12015 may apply a weighted value to service data based on SI information transmitted from the broadcasting station 12005 that provides a program, other than service data from the external server 12090, thereby prioritizing the service data from the broadcasting station 12005 when the aforementioned data collision occurs.

Hereinafter, the procedure of processing the EPG service data in the data server 12015 will be described in more detail.

If the device information of each digital device is received at the aforementioned procedure A or B, the control module 12020 transmits the received device information to the crawler module 12030.

The crawler module 12030 configures a super set based on the device information of each digital device, and returns an identifier of the configured super set, i.e., a service list set identifier to the control module 12020. Here, instead of the crawler module 12030, the control module 12020 may configure a super set, and produce a service list set identifier for the super set.

The control module 12020 returns the service list set identifier transmitted from the crawler module 12030 to each corresponding digital device.

Also, if updated EPG service data is received from each digital device after the service list set identifier has been returned to the digital device, the control module 12020 transmits the updated EPG service data to the crawler module 12030.

The crawler module 12030 transmits the updated EPG service data of each digital device, which has been input through the control module 12020, to the processing module 12050.

In this case, the crawler module 12030 may analyze, for example, an updated parameter from the updated EPG data of each digital device.

Also, the crawler module 12030 may process the analyzed result on a per service list set identifier basis, and transmit the analyzed result to the processing module 12050 together with the service list set identifier.

In this case, although each digital device may transmit the EPG service data to the data server 12015 at the same time, alternatively, each digital device may transmit the EPG service data to the data server 12015 at different times.

In this case, as a result of analyzing the EPG service data received from a specific digital device, for example, if the EPG service data has the same parameter as updated service data or service data received from another digital device at a previous time or of the EPG service data has a version lower than the previously data, the crawler module 12030 may remove the EPG service data without transferring it to the processing module 12050.

The crawler module 12030 may transmit the EPG service data to the processing module 12050 whenever the EPG service data is received from each digital device. However, in this case, since load may occur in the processing module 12050, a parameter updated at a sufficient level may be accumulated or may periodically be transmitted to the processing module 12050, whereby overall load of the server may be reduced.

The processing module 12050 receives the updated EPG service data of each digital device transmitted from the crawler module 12030, and stores the received EPG service data in the database 12070 directly or after processing the received EPG service data.

The processing module 12050 may receive the EPG service data from the external server 12090 periodically or non-periodically. The EPG service data from the external server 12090 may be used to process the updated EPG service data of each digital device, prior to storing the updated EPG service data.

The processing module 12050 sorts the EPG service data received from the crawler module 12030 and the external server 12090 on the basis of, for example, a previously set super set, i.e., a service list set identifier.

The processing module 12050 processes the sorted EPG service data and stores the processed EPG service data in the database 12070 in a unit of the aforementioned super set.

For example, translation and merge may be used for the processing procedure. The service list set identifier for later EPG data search and basic information required for channel change per broadcast standard may be added.

Each digital device has higher service coverage per area than the related art, and thus can provide an EPG service optimal for an actual broadcasting environment in response to an EPG service request from the user. A procedure of providing the EPG service will be described hereinafter.

If an EPG request is received from the user, the digital device 12010 transmits a search parameter to the data server 12015 together with the previously received service list set identifier to request the EPG service data, In this case, the search parameter may include, for example, query information, start index (startIndex) information, maximum result (maxResults) information, category information, and sort information, in addition to the aforementioned device information.

In particular, an EPG service may be set based on the category information for the aforementioned EPG service request. However, if the category is set to 'all', for example, information on CP tap (for example, YouTube tap) as well as real time tap may be received. In the case of the CP tap, only Uniform Resource Locator (URL) may be provided.

The control module 12020 checks the request of the digital device 12010 and determines whether or the corresponding request is a request for the updated EPG service data.

If it is determined that the corresponding input is the EPG service request, the control module 12020 transmits a search request to a search module (not shown) together with the search parameter.

The search module analyzes the search parameter transmitted from the control module 12020.

The search module transmits the result of the analyzed search parameter to a search engine, and the search engine searches for the database 12070 based on the transmitted search parameter. In this case, the database is required to store a great quantity of data for a long time because the EPG service data may generally provide not only information of the day or current information, but also information on the past and/or the future for a predetermined period on the basis of the current time or date. However, as will be described below, in the case of thumbnail image service data that does not essentially need long time or large capacity storage, a buffer or memory for temporary storage may be used.

The search engine receives the searched result from the database 12070 and transmits the received result to the search module. The search module analyzes the search result received from the search engine, configures the analyzed result in a response format corresponding to the request, and returns the response to the control module 12020. In this case, the returned response of the search module may be xml format, for example.

The control module 12020 may transmit the EPG service data returned from the search module to the corresponding digital device alone or together with the service list set identifier.

The corresponding digital device parses the EPG service data received from the data server 12015, and configures an EPG screen from the parsed result to provide the configured EPG screen to the user. In this case, the parsed EPG service data may be stored in the storage unit within the digital device, or a cloud or a mobile terminal connected to the digital device.

Figure 13:
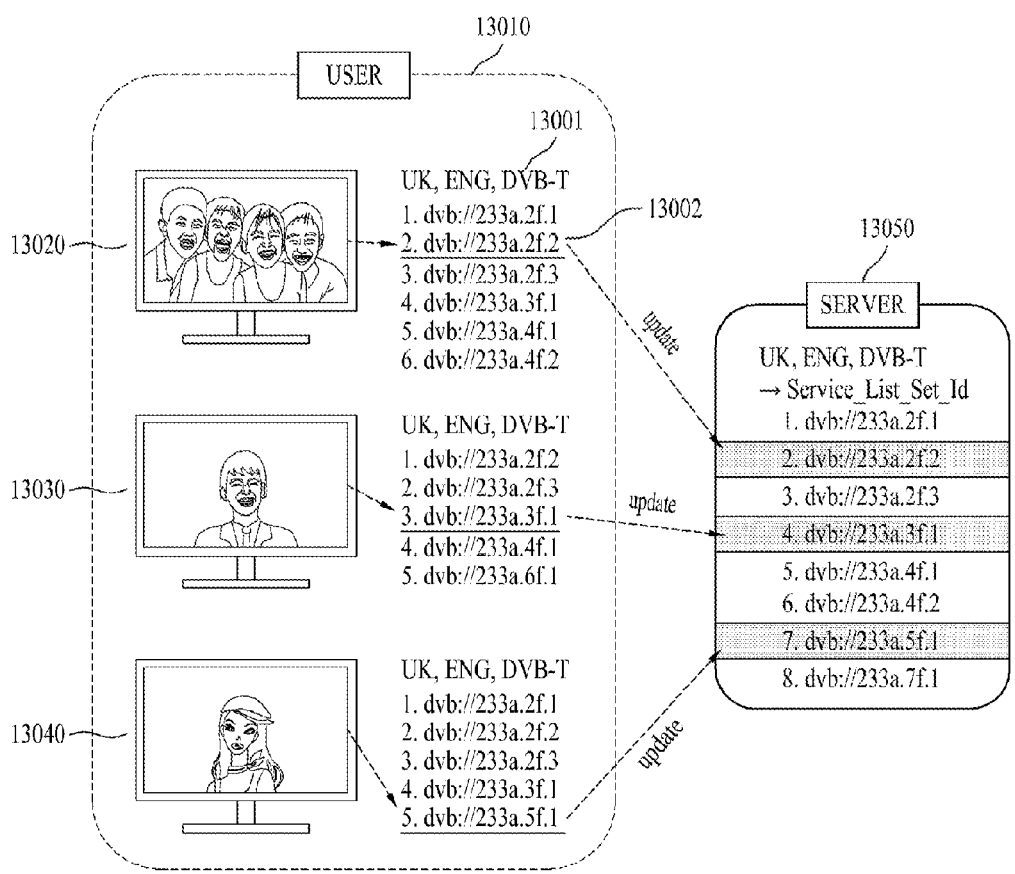
FIG. 13 is an explanatory diagram showing an example of updating EPG data in a data server according to the present invention.

FIG. 13 is an explanatory diagram showing an example of updating EPG service data in a data server according to the present invention.

Referring to FIG. 13, an example illustrated at the left side may mean a digital device 13010, and an example illustrated at the right side may mean a data server 13015.

In FIG. 13, for example, a procedure of updating EPG service data according to the present invention will hereinafter be described by exemplifying three digital devices with respect to the same service UK, ENG, DVB-T.

The first digital device 13020 is associated with the service UK, ENG, DVB-T, and a service list to which the corresponding digital device is accessible, i.e. an EPG service list may include, for example, six services of No. 1 dvb://233a.2f.1, No. 2 dvb://233a.2f.2, No. 3 dvb://233a.2f.3, No. 4 dvb://233a.3f.1, No. 5 dvb://233a.4f.1, and No. 6 dvb://233a.4f.2.

The second digital device 13030 is associated with the service UK, ENG, DVB-T, and a service list to which the corresponding digital device is accessible, i.e. an EPG service list may include, for example, five services of No. 1 dvb://233a.2f.2, No. 2 dvb://233a.2f.3, No. 3 dvb://233a.3f.1, No. 4 dvb://233a.4f.1, and No. 5 dvb://233a.6f.1.

The third digital device 13040 is associated with the service UK, ENG, DVB-T, and a service list to which the corresponding digital device is accessible, i.e. an EPG service list may include, for example, five services of No. 1 dvb://233a.2f.1, No. 2 dvb://233a.2f.2, No. 3 dvb://233a.2f.3, No. 4 dvb://233a.3f.1, and No. 5 dvb://233a.5f.1.

In FIG. 13, in particular, an update service of the first digital device 13020 is No. 2 service, an update service of the second digital device 13030 is No. 3 service, and an update service of the third digital device 13040 is No. 5 service.

The three digital devices 13020, 13030 and 13040 have the same service list set identifier. That is, EPG service data of the three digital devices 13020, 13030 and 13040 belongs to a single super set.

The super set contains, for example, data of a total of eight EPG services. That is, EPG service data may include eight services of No. 1 dvb://233a.2f.1, No. 2 dvb://233a.2f.2, No. 3 dvb://233a.2f.3, No. 4 dvb://233a.3f.1, No. 5 dvb://233a.4f.1, No. 6 dvb://233a.4f.2, No. 7 dvb://233a.5f.1, and No. 8 dvb://233a.7f.1.

The above description is one example of EPG service data that is received and updated from the respective digital devices belonging to the super set. In other words, the respective digital devices belonging to the same super set, for example, may equally receive the EPG service data list within the super set from the data server 13050.

For example, the first digital device 13020 can access a total of six services. However, if the first digital device 13020 requests EPG service data from the data server 13050, the data server 13050 responds and transmits data of eight EPG services within the super set to which the corresponding digital device belongs.

In this case, the first digital device 13020 parses the response of the data server 13015, and configures an EPG from the parsed EPG service data to provide the EPG to the user.

However, the first digital device 13020 may not include EPG service data with respect to an inaccessible service by filtering the EPG service data, and may configure EPG service data with respect to only an accessible service to provide the EPG service data to the user via a screen.

For example, the first digital device 13020 cannot access the services of No. 7 dvb://233a.5f.1 and No. 8 dvb://233a.7f.1 among the EPG service data within the response received from the data server 13050, and therefore filtering the inaccessible services prior to providing the EPG service data may increase user convenience. However, even the filtered service, for example, may be used by the corresponding digital device to configure an EPG service if it is a service or content associated with other accessible services.

Even in the case of the second digital device 13030 and the third digital device 13040, an EPG service may be provided in the same manner as the above-described processing procedure of the first digital device 13020.

The super set is exemplified herein only for convenience of explanation, and may correspond to an example obtained by updating EPG service data processed through the control module 12020, the crawler module 12030 and the processing module 12050 within the above-described data server 12015, and thereafter searching the updated EPG service through the search module and the search engine.

In addition, in the course of transmitting the updated EPG service data to the server 13015, or separately from this course, the digital device may periodically or non-periodically transmit or receive information on a viewer rating associated with a channel or program that the corresponding digital device currently shows, together with the 3-ID.

In this way, the data server 13050 may additionally receive information on a viewer rating with respect to EPG service data, together with the EPG service data of each digital device, and provide the additional information together or separately from provision of the EPG service, which results in a differentiated service as compared to the related art.

The above description generally exemplifies and explains a DVB mode. However, the present invention is not limited to the above-described DVB mode, and for example may be equally applied to an ATSC mode. In the case of the ATSC mode, a channel name and/or a program name may be additionally necessary due to differences in a broadcasting mode. Here, the channel name, for example, may have the same function as the aforementioned 3-ID.

Accordingly, the server configures a super set on the basis of a channel name of each digital device, adds service list set identifier information on the configured super set, maps the super set with the digital device based on the added information, and transmits the mapped result to the corresponding digital device. The procedure of updating the EPG service data or the procedure of searching EPG service data in response to the EPG service request from the digital device are completely the same as the above description, and a detailed description thereof will be omitted hereinafter. However, in the case of North America, if collision of EPG data provided by a variety of sources occurs under the condition of a channel name reference, any one EPG data may be selected, or all collided EPG data may be transmitted to the digital device so that the corresponding digital device filters the EPG data based on information on a local area.

Hereinafter, channel browser service data will be described in the same manner as the service EPG service data. Since a basic processing concept of channel browser service is similar to that of the EPG service data, a detailed description thereof is replaced by the above description, and the following description is centered only on context corresponding to a channel browser.

In the case of the channel browser, data required to configure the channel browser may be extracted from service information contained in a digital broadcast signal transmitted from a broadcasting station, or may be received from a channel browser server, such as an EPG server.

However, respective digital devices have different various channel coverages, and realistically the channel browser server has difficulty in providing proper channel browsers for all channels which a corresponding digital device can access due to limited channel coverage. Thus, although some channels may provide thumbnail images if the user requests for a channel browser, some channels may show only a black screen. This may cause dissatisfaction with the digital device and the broadcast service.

In consideration of the above-described circumstance, the above-described broadcasting system as shown in FIG. 12 may also be used to process the channel browser in a method similar to the above-described EPG service providing method.

More specifically, the digital device serves as a channel browser for a currently tuned channel, and captures a current screen as a back channel to thereby store a thumbnail image even if no user request is present.

The captured thumbnail image for the particular channel may be configured, for example, into a 3-ID format, and be transmitted to the data server together with or separately from the above-described updated EPG service data.

The thumbnail image of a screen with respect to the channel may be captured in various ways. For example, when channel change occurs, a corresponding screen may be immediately captured, and a current screen may be periodically captured. In this case, the digital device may select only the latest stored thumbnail image among captured images of respective channels provided therein, and treats the selected thumbnail image as a representative thumbnail image for the corresponding channel to transmit the thumbnail image as channel browser update data to the data server.

The control module 12020 within the data server 12015 may transmit the updated channel browser data to the crawler module 12030, and in turn the crawler module 12030 may analyze the channel browser data to transmit the analyzed result to the processing module.

The processing module processes the updated channel browser data for the respective channels on the basis of each service list set identifier by combining the updated channel browser data with, for example, additional channel browser data provided by the channel browser server. The processed channel browser data is stored in the database 12070, for example, separately from the EPG service data.

In this case, the channel browser service data includes, for example, thumbnail images, and therefore URL addresses required to access the corresponding thumbnail images are stored in the database 12070, together with the thumbnail images.

In the case of the stored channel browser service data, if a user request for a channel browser occurs in the future, similar to the case of processing the EPG service data as described above, a search parameter for search of the channel browser is transmitted to the data server, and in turn the control module 12020 within the data server 12015 transmits the search parameter to the search module so that the search module analyzes the search parameter and drives the search engine based on the analyzed result.

The search engine, for example, searches the database based on the search parameter transmitted from the search module, collects data associated with the corresponding channel browser, and transmits the collected data to the search module.

In response to a user request, the search module configures a response including an URL to access the thumbnail image of each channel from the collected channel browser data, and transmits the response to the corresponding digital device through the control module.

The digital device reads each channel and the URL of the corresponding channel by parsing the aforementioned response. Then, the digital device extracts the thumbnail image for the corresponding channel by accessing the read URL, and provides a channel browser to the user.

According to the present invention, channel coverage of each digital device may be increased, and advanced EPG with an abundance of metadata per program and a channel browser may be provided.

The thumbnail processor 12040 includes an authentication module and a program thumbnail crawler module.

The authentication module determines whether or not the digital device 12010 has uploading authority, generates an authentication signal depending on the determined result, and transmits the signal to the control module 12020 and/or the program thumbnail crawler module. In this case, if it is determined based on the authentication signal transmitted from the authentication module that the digital device 12010 has no uploading authority, the control module 12020 may generate a control signal for controlling access of the corresponding device, and transmit the control signal to the corresponding digital device. On the contrary, if it is determined based on the authentication signal transmitted from the authentication module that the digital device 12010 has uploading authority, the control module 12020 may transmit a control signal that allows access of the corresponding device and contains a message indicating authentication success to the corresponding digital device.

The program thumbnail crawler module may be activated according to the authentication signal transmitted from the authentication module, and may perform the same crawling function as the above-described EPG crawler module 12030 with respect to the thumbnail image transmitted from each digital device.

In this case, like the above-described EPG processor, the thumbnail processor 12040 may build the database 12070 to store the thumbnail image processed by the program thumbnail crawler module. Alternatively, unlike the above-described EPG processor, the thumbnail processor 12040 may temporarily store the thumbnail image processed by the program thumbnail crawler module in a buffer or memory without building the database 12070. The buffer or memory, for example, may be located inside or outside of the thumbnail processor.

The processing module 12050, for example, may process EPG service data processed by the EPG crawler module 12030, and/or may combine and process the EPG service data with EPG service data collected by the external server 12090. Also, the processing module 12050 may process even the program thumbnail image service data in the same manner as the EPG service data to transmit the program thumbnail image service data to the thumbnail processor or to store the program thumbnail image service data in the database 12070. The processing module 12050 may process input data on the basis of various references (e.g., may add identification information), and store the data in the database 12070 or transmit the data to the corresponding processor.

Referring to FIG. 12, in the digital system according to the present invention, for example, EPG service data, channel browser data, and thumbnail images may be processed in different modules.

Figure 14:
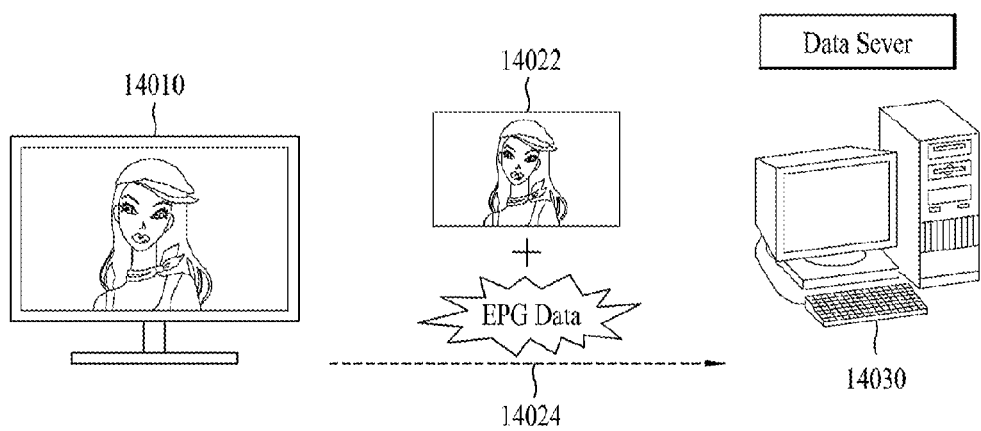
FIG. 14 is an explanatory diagram showing an example of transmitting service data from a digital device to a data server according to the present invention.

Transmission of data from the digital device 12010 to the data server 12015 may be performed on a per service data basis. As shown in FIG. 14, if the respective categories of service data are previously collected and transmitted to the data server 12015, the control module 12020 within the data server 12015 may sort the service data into respective categories and transmit each category of the service data to the corresponding module.

FIG. 14 shows the case in which a digital device 14010 transmits, for example, both EPG service data 14024 and thumbnail image service data 14022 to a data server 14030.

In the present invention, each digital device transmits service data stored therein to the data server, and in turn the data server processes the service data transmitted from each digital device as well as service data separately collected via an external server, and thereafter transmits the processed data upon receiving a request from each digital device, whereby a greater quantity of higher quality service data may be provided.

In this case, it is unnecessary to provide an infinite number of digital devices that are connected to the data server of the digital system and transmit service data to the data server, for example. This is because if an infinite number of digital devices respectively transmit service data stored therein to the data server, data traffic may occur and cause deterioration in service quality, and the data server has needs for high performance and high capacity, which results in cost burden. In addition, this is because data transmitted from the respective digital devices that communicate with the data server are not completely different from one another and may overlap to some extent. In this case, the digital system may be understood transmission of service data from the digital devices to the data server and transmission of the processed service data from the data server to the respective digital devices from different viewpoints. In other words, it is assumed that there are 100 digital devices and at least one data server connected to one another via a digital system. In this case, the digital devices may be controlled such that only 50 digital devices transmit service data to the data server, but the 100 digital devices receive processed service data from the data server so as to provide a corresponding service. This control mode may be appropriately determined to provide a differentiated service in terms of data traffic, cost, and the like.

In addition, the data server within the digital system may transmit a control signal to each digital device, to assist the digital device in setting authority to transmit service data to the data server, a transmission cycle, and the like. This control mode, as described above, may be appropriately determined in terms of data traffic, the capacity of the server, and the like.

For example, it is assumed that a digital device A transmits EPG/thumbnail image/channel browser service data to the data server by a cycle of 10 seconds.

In this case, the data server may process the data as follows.

Basically, the data server determines whether or not the corresponding digital device A has transmission authority. If the digital device A has transmission authority, the data server determines a service list set identifier of the corresponding digital device A, and then determines whether or not another digital device having the same service list set identifier has already transmitted the same service data as that transmitted from the digital device A to the data server.

If it is determined that the service data received from the digital device A overlaps with the previously received service data from another digital device having the same service list set identifier, the data server may fix a service data transmission cycle to the corresponding digital device A, but may control a data transmission cycle of another digital device. For example, if the data is transmitted from the digital device A at an interval of 10 seconds from a predetermined time, the data server may control the transmission cycle of another digital device to transmit the data at an interval of 10 seconds from a time delayed by ∝ from the predetermined time. Alternatively, the data server may transmit a control signal to change a service data transmission cycle. For example, if the previous transmission cycle is 10 seconds, the data server may change the transmission cycle to 11 seconds. Here, ∝ may be, for example, 1 to 3 seconds.

In the above-described case, the data server may transmit a rejection message as well as the control signal, to allow the corresponding control signal to be identified and processed in the digital device. Thus, if the rejection message is received, the digital device may extract the control signal transmitted from the data server, decode the extracted control signal, and transmit the service data to the data server in the same manner after resetting a transmission time or transmission cycle.

Figure 15:
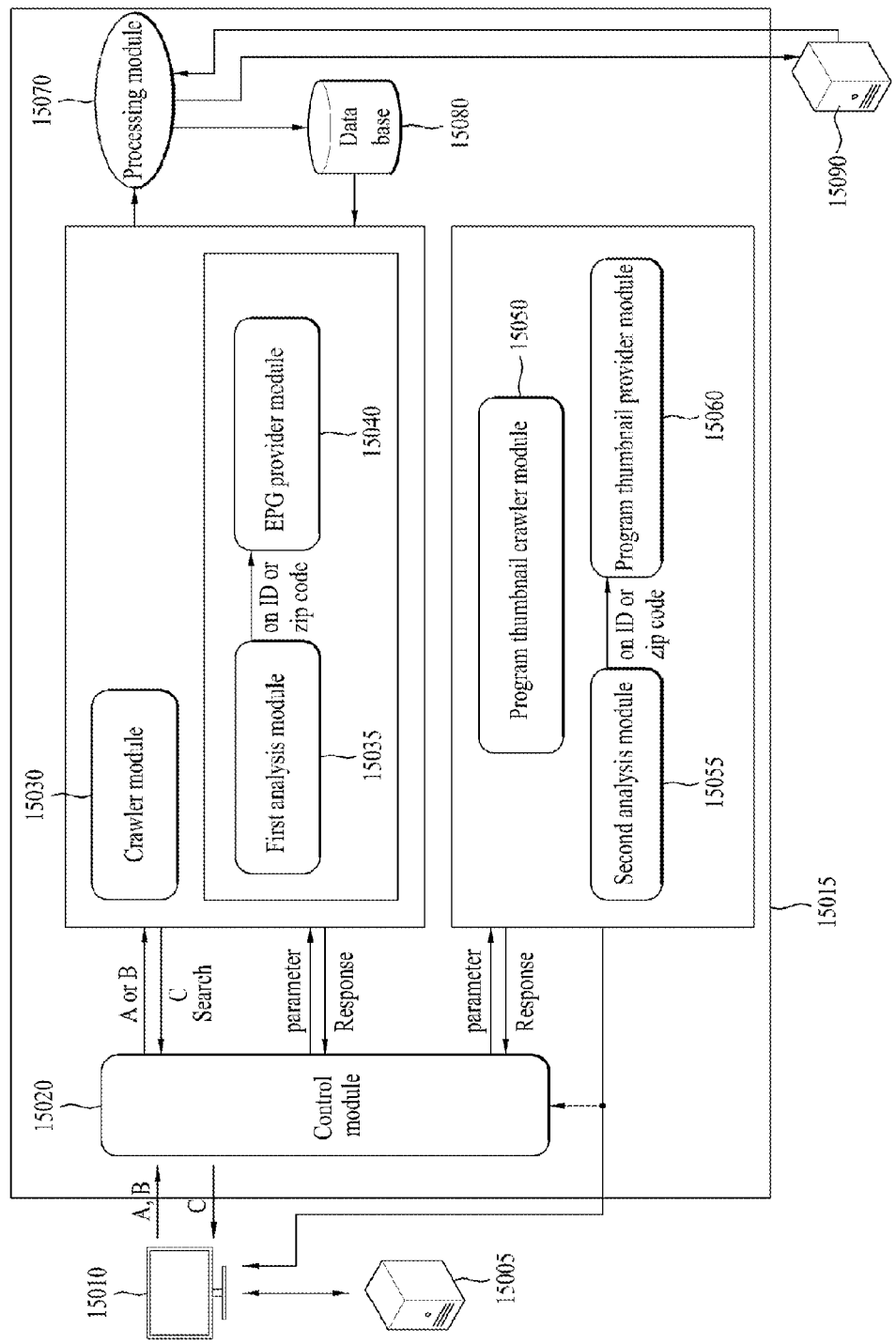
FIG. 15 is a block diagram showing a digital system according to a further exemplary embodiment of the present invention.

FIG. 15 is a block diagram showing a digital system according to a further exemplary embodiment of the present invention.

Referring to FIG. 15, the digital system may include a digital device 15010 and a data server 15015. The data server 15015 may receive service data associated with the present invention by individually communicating with an external server 15090.

Hereinafter, a detailed description of the same configurations as those in FIGS. 12 to 14 will be omitted, and only differences will be described.

In particular, the digital system shown in FIG. 15 has a slight difference in terms of configuration of the data server from the above-described digital system shown in FIG. 12.

More specifically, basically, the data server 15015 shown in FIG. 15 includes an EPG service data processor and a thumbnail image service data processor in the same manner as that shown in FIG. 12, but has differences in the configurations of the respective processors.

For example, the EPG service data processor shown in FIG. 15 may further include a first analysis module 15035 and an EPG provider module 15040, in addition to the above-described crawler module 12030.

If the digital device 15010 transmits device information or updated service data together with or separately from area information or position information on the digital device 15010, for example, the first analysis module 15035 receives the transmitted data from a control module 15020 provided in the data server 15015. Here, the position information, for example, may be at least one of GPS information, an identifier of the area to which the corresponding digital device 15010 belongs (e.g., an original network identifier) and a Zone Improvement Plan (ZIP) code of the area to which the corresponding digital device 15010 belongs. The first analysis module 15035 analyzes the received position information on the digital device 15010. The analyzed data, for example, may be the identifier of the area to which the corresponding digital device 15010 belongs, GPS information, or the ZIP code. That is, the first analysis module 15035 extracts at least one of the GPS information, then original network identifier, and the ZIP code as the position information on the corresponding digital device 15010, and transmits the extracted position information to the EPG provider module 15040.

The EPG provider module 15040 may extract EPG service data based on the position information on the digital device 15010 received from the first analysis module 15035 by accessing a database 15080 in which the EPG service data is stored, and may again transmit the EPG service data to the digital device 15010 through the control module 15020. When extracting the service data, the EPG provider module 15040 may determine proper service data by analytically comparing the received position information on the digital device 15010 with device information that is received through another digital device and is used for grouping. This is applicable in the same principle even to the case of a program thumbnail image that will be described hereinafter. For example, if the position information is the original network identifier, coincident groups may be searched by comparing original network identifiers of respective groups with one another. On the other hand, if the position information is the ZIP code, an original network identifier of the area corresponding to the ZIP code is extracted, and a group corresponding to the ZIP code may be searched. In the case of GPS information, similarly, a group corresponding to the GPS information may be searched from the original network identifier of the area corresponding to the GPS information.

The aforementioned position information, for example, may be continuously changed rather than providing information on a fixed position if the digital device is a mobile terminal. This is because EPG service data may be changed on a per position basis.

Similarly, in the case of a thumbnail image, the thumbnail processor receives the position information on the digital device 15010 from the corresponding digital device. A second analysis module 15055 analyzes the received device position information, and thereafter transmits at least one of the original network identifier and the ZIP code to a program thumbnail provider module 15060.

The program thumbnail provider module 15060 accesses a database 15080 or a buffer or memory incorporated therein based on the original network identifier and/or the ZIP code, extracts service data having a service list set identifier coincident with the original network identifier and/or the ZIP code, and transmits the extracted service data to the corresponding digital device 15010.

In the case in which the digital device 15010 is a mobile terminal, for example, as shown in FIG. 12, if the mobile terminal transmits area information thereof to the server to receive service data, such as previously stored EPG data, the data server may transmit the EPG service data to the corresponding mobile terminal based on the received area information. In this case, the data server may select an optimal super set based on the received area information, extract service data of the selected super set, and transmit the extracted service data to the mobile terminal. However, since the mobile terminal may have change in the position information thereof, the super set may be again determined and selected if the area information differs from previous area information.

FIG. 16 is a diagram showing an example of EPG and/or thumbnail image service data according to the present invention.

Referring to FIG. 16, for example, a data server 16010 may be equal to the data server described with reference to FIG. 12 or FIG. 15.

However, FIG. 16 shows transmission of service data from the data server to each digital device, other than data transmission from the digital device to the data server.

In particular, FIG. 16 shows the case 16020 of transmitting thumbnail image service data included in the format of EPG service data.

Alternatively, as described above, EPG service data and thumbnail image service data may be respectively configured into single service data and be transmitted separately.

Figure 17:
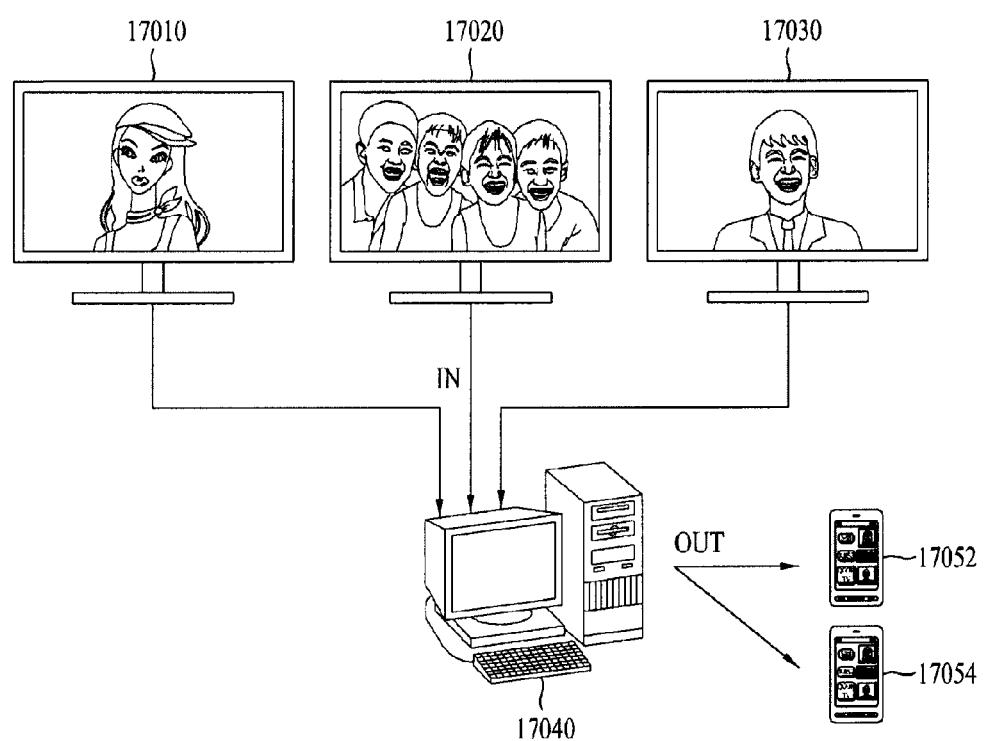
FIG. 17 is an explanatory diagram showing an example of processing service data in a digital system according to the present invention.

FIG. 17 is an explanatory diagram showing an example of processing service data in a digital system according to the present invention.

Referring to FIG. 17, in the digital system, three digital devices 17010, 17020 and 17030 transmit EPG/thumbnail image/channel browser service data to a data server 17040.

The data server 17040 collects, processes, and stores the service data. Then, if the digital device requests the service data, the data server 17040 transmits the stored service data to the corresponding digital device. In this case, for example, the digital device may be at least one of three digital television receivers 17010, 17020 and 17030 and two mobile terminals 17052 and 17054 as shown in FIG. 17.

Although the above description exemplifies the case in which the digital device periodically or non-periodically transmits service data stored therein to the data server, and receives processed service data from the data server, FIG. 17 exemplifies the case in which a device that transmits service data may differ from a device that receives the service data. In other words, as shown in FIG. 17, service data transmitted from the aforementioned three digital television receivers 17010, 17020 and 17030 to the data server 17040 may be transmitted from the data server 17040 to the mobile terminals 17052 and 17054.

Figure 18:
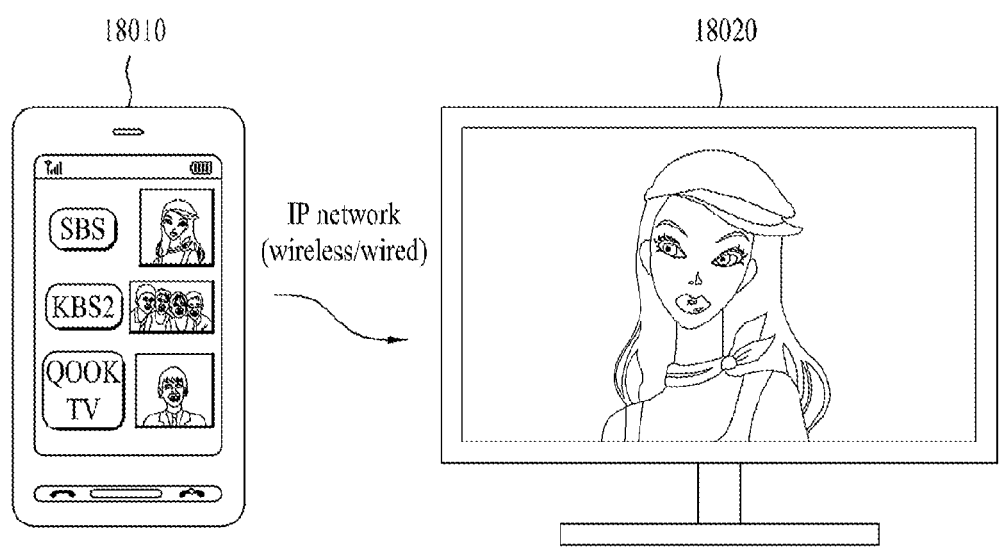
FIG. 18 is an explanatory diagram showing an example of transmission/reception of service data between digital devices according to the present invention.

FIG. 18 is an explanatory diagram showing an example of transmission/reception of service data between digital devices according to the present invention.

Assuming the case in which one digital device receives latest processed service data from a data server as described above with reference to FIGS. 10 to 17, FIG. 18 exemplifies the concept of expanding service from the corresponding digital device to another digital device that is not registered in or connected to the data server and thus has no authority.

Referring to FIG. 18, it is assumed that a mobile terminal 18010 receives latest processed EPG/thumbnail image/channel browser service data from a data server.

The mobile terminal 18010 may transmit the received service data to a digital device 18020, to which the mobile terminal 18010 is connectable via a wired/wireless network, to which the mobile terminal 18010 belongs or is connectable.

A variety of wired/wireless communication means, such as various wired/wireless communication networks, and an N-screen, for example, may be constructed for transmission/reception of data between the mobile terminal 18010 and the digital television receiver 18020.

In this case, the mobile terminal 18010 or the digital television receiver 18020 may be connected to the broadcasting station 10010 and/or the external server 10030 as shown in FIG. 10, thereby being capable of receiving service data.

Figure 19:
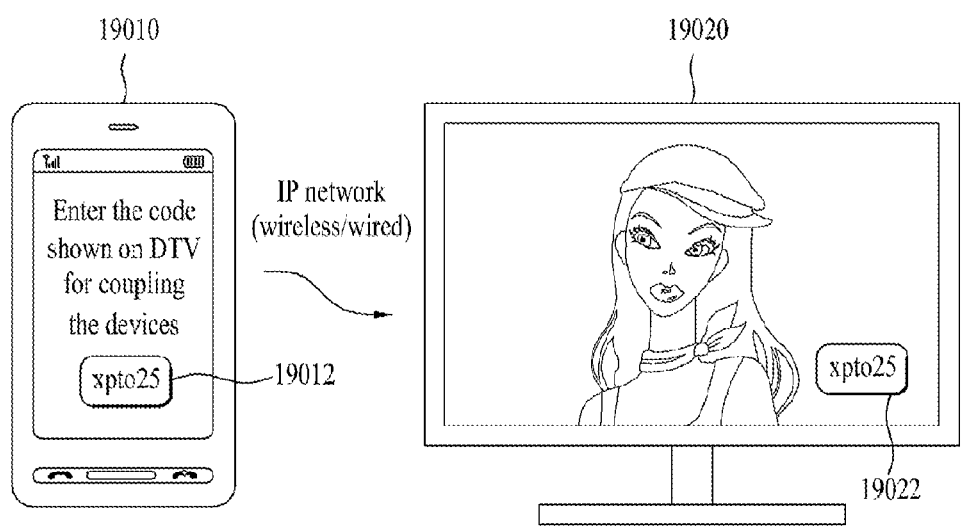
FIG. 19 is an explanatory diagram showing another example of transmission/reception of service data between digital devices according to the present invention.

FIG. 19 is an explanatory diagram showing another example of transmission/reception of service data between digital devices according to the present invention.

FIG. 19 exemplifies the concept of controlling authority to prevent improper transmission of service data between digital devices connected to a wired/wireless network.

For example, the situation in which a digital television receiver 19020 is present at home and a passerby who is present within a home network range accesses the network using a portable terminal 19010 thereof and attempts to control the digital television receiver 19020 is problematic.

Accordingly, to prevent occurrence of the aforementioned situation, it can be contemplated that inter-authentication between digital devices is performed such that only a digital device that has proper authority is connectable to the other digital device and can perform transmission and reception of service data after being coupled with the other digital device.

As shown in FIG. 19, if the mobile terminal 19010 having service data transmits security authentication information 19012, represented as xpto25, to the digital television receiver 19020 that belongs to a network, the digital television receiver 19020 decodes the authentication information 19012, and transmits a message for access permission to the corresponding mobile terminal 19010 if an owner of the mobile terminal 19010 has proper authority, or displaying the message 19 022 on a screen of the digital television receiver 19020.

The security authentication information 19012, for example, may be generated and transmitted from the data server that transmits the processed service data, and may be generated from the mobile terminal 19010.

A variety of authentication algorithms may be used in relation to generation of the security authentication information 19012.

Referring again to FIG. 18, there is illustrated a screen of the digital television receiver 18020 that is controlled based on service data (for example, EPG service data) received from the mobile terminal 18010 that is connected to the digital television receiver 18020.

Figure 20:
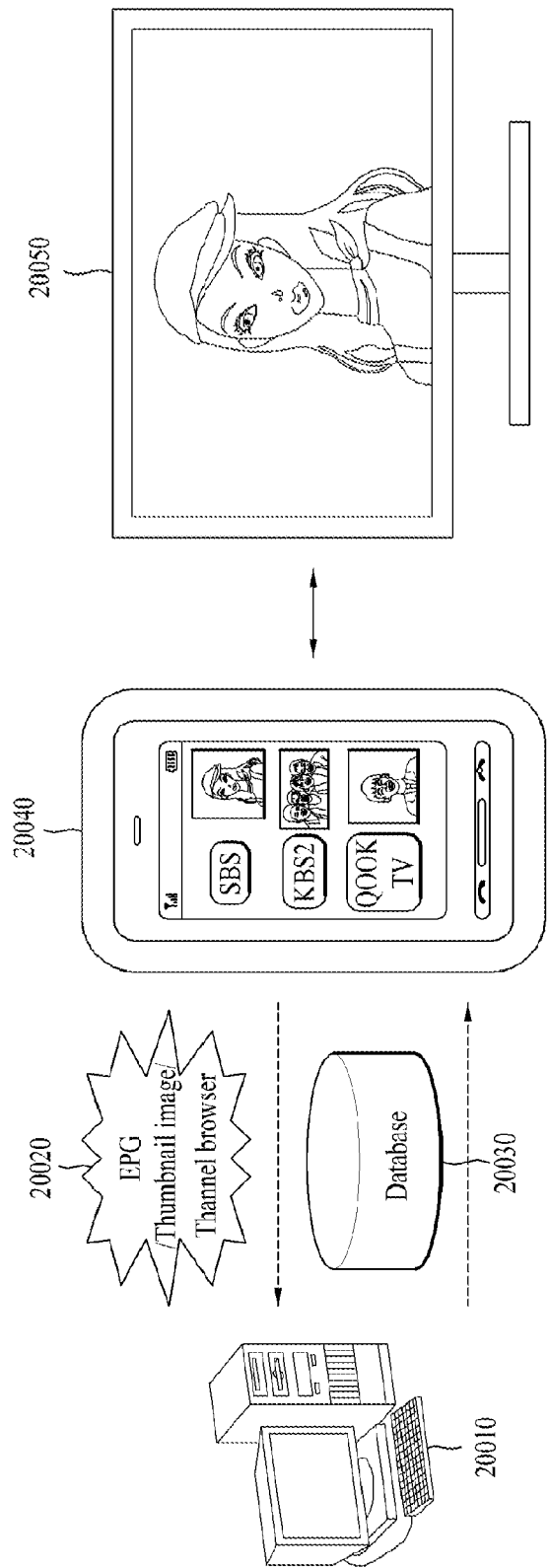
FIG. 20 is an explanatory diagram showing transmission/reception of service data between a data server and digital devices according to the present invention.

A digital system prepared based on the expanded concept of the above description will be configured as shown in FIG. 20.

Referring to FIG. 20, a first digital device (mobile terminal) 20040 transmits service data stored therein to a data server 20010, and receives latest processed service data stored in a database 20030 from the data server 20010.

The first digital device 20040 may transmit the latest processed service data received from the data server 20010 to a second digital device (digital television receiver) 20050 via communication with the first digital device 20040.

Figure 21:
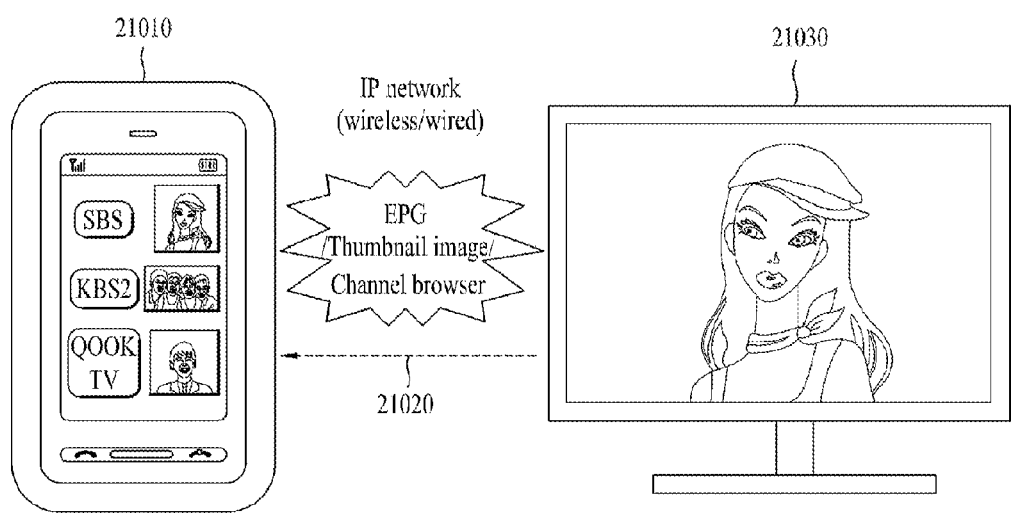
FIG. 21 is an explanatory diagram showing transmission of service data between digital devices according to the present invention.

Referring to FIGS. 20 and 21, for example, the first digital device 20040 may receive service data from the second digital device 20050, and may transmit the received service data to the data server 20010 to enable processing of the service data.

Figure 22:
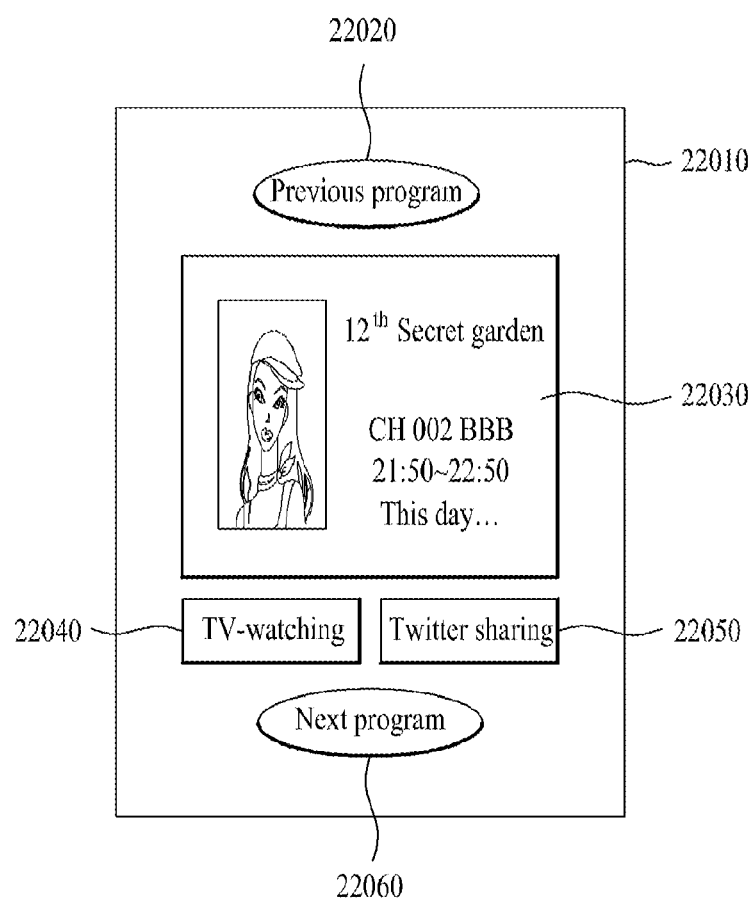
FIG. 22 is an explanatory diagram showing an example of a screen of a digital device that receives service data according to the present invention.

FIG. 22 is an explanatory diagram showing an example of a screen of a digital device that receives service data according to the present invention.

In FIG. 22, assuming that a digital device is a mobile terminal, for example, the mobile terminal may directly receive service data from a data server, or may indirectly receive service data from another digital device that has received the service data from the data server. Then, the mobile terminal may output detailed information in response to a user request by decoding the received service data, as shown in FIG. 22.

In this case, as shown in FIG. 22, for example, a screen 22010 of the mobile terminal may contain buttons used to select a previous program item 22020 and a next program item 22060. Also, program information containing a thumbnail image 22030 may be displayed on the center of the screen 22010.

The mobile terminal, for example, may control another digital device connected thereto. Thus, the screen 22010 of the mobile terminal may further contain a TV display item 22040 that allows a selected program to be displayed on a digital television receiver, and an SNS sharing item 22050 that allows a selected program to be shaped via an SNS.

For example, when using an EPG/thumbnail/channel browser service in the mobile terminal having a limited screen size, transmitting the corresponding service data to a digital device having a larger screen size may provide viewer convenience. Alternatively, when the service data, along with text data, is shared via Twitter, expanded service coverage may be accomplished.

Figure 23:
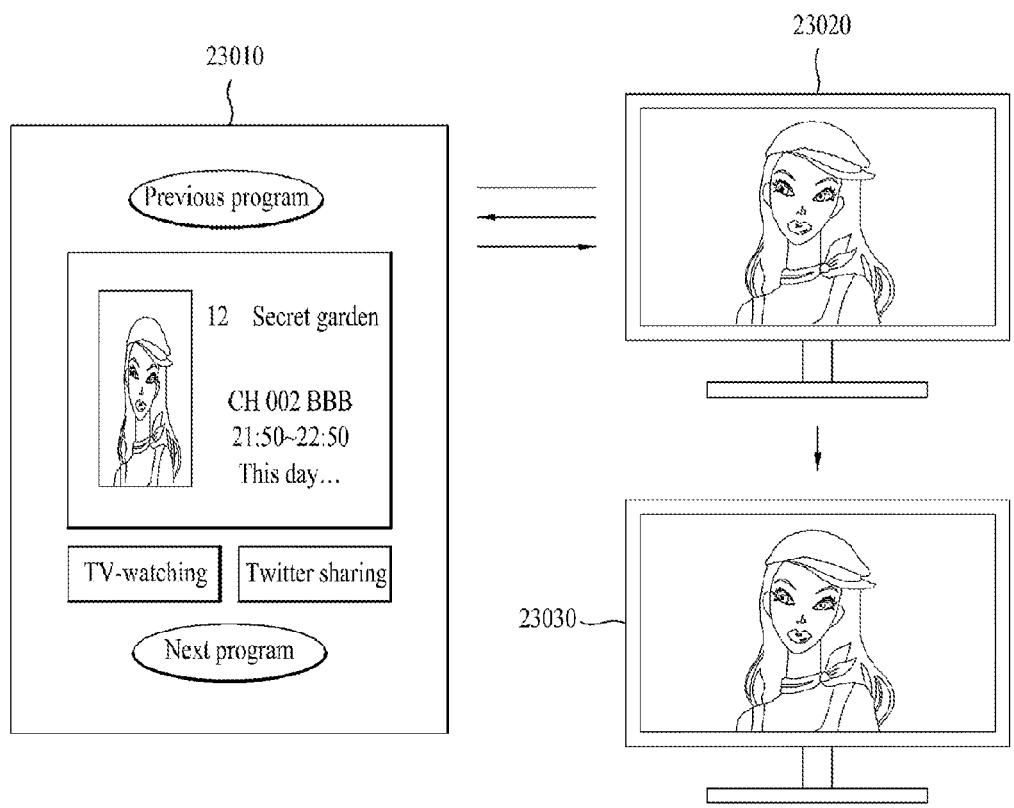
FIG. 23 is an explanatory diagram showing service control between digital devices according to the present invention.

FIG. 23 is an explanatory view showing service control between digital devices according to the present invention.

Referring to FIGS. 22 and 23, it can be appreciated that a single digital device 23010 can control at least one of other digital devices 23020 and 23030 using service data received from a data server or the other digital devices.

For example, if the user receives service data from the data server using a mobile terminal, the user can control the other digital devices 23020 and 23030 so long as the mobile terminal 23010 of the user has control authorities for the other digital devices 23020 and 23030. In this case, the mobile terminal of the user may function as a remote controller.

In addition, the mobile terminal may control only one digital device, and in turn the digital device may control the other digital device. Alternatively, the mobile terminal may directly control both the digital devices.

For example, the mobile terminal 23010 transmits a device identifier to a digital device A 23020 in a HyperText Transfer Protocol (HTTP) manner, and requests a key for data encryption.

The digital device A 23020 transmits a response code and an encryption key in response to the request from the mobile terminal 23010.

The mobile terminal 23010 encrypts a service displayed on a current screen, or at least one of three program identifiers including an original network identifier, a TS identifier, and a Service identifier, and a service name using the encryption key transmitted from the digital device A 23020, and thereafter transmits the encrypted data to the digital device A 23020.

The digital device 23020 initially determines whether or not a current channel is available by decoding received channel information. If it is determined that the channel is available, the digital device 23020 plays a corresponding broadcast. However, if it is determined that the channel is not available, the digital device 23020 may transmit a response containing a code to inform that the corresponding digital device 23020 cannot play the broadcast to the mobile terminal 23010. Thus, if the mobile terminal 23010 receives the response containing a playback not possible code from the corresponding digital device 23020, the mobile terminal 23010 may be connected to the other digital device 23030 instead of the corresponding digital device 23020, or may communicate with the other digital device 23030 to inquire and request broadcast playback in the above described manner after changing a service or program.

The digital device A 23020 may communicate with the other digital device 23030 connected thereto even when it cannot play a broadcast as well as when it can play a broadcast, so as to inquiry as to whether or not playback is possible, or so as to process playback.

As described above, the mobile terminal and the digital television receiver can exchange functions thereof. In addition to transmission/reception of service data and service control between the mobile terminal and the digital television receiver, transmission/reception of service data and service control between two mobile terminals or between two digital television receivers are possible.

Figure 24:
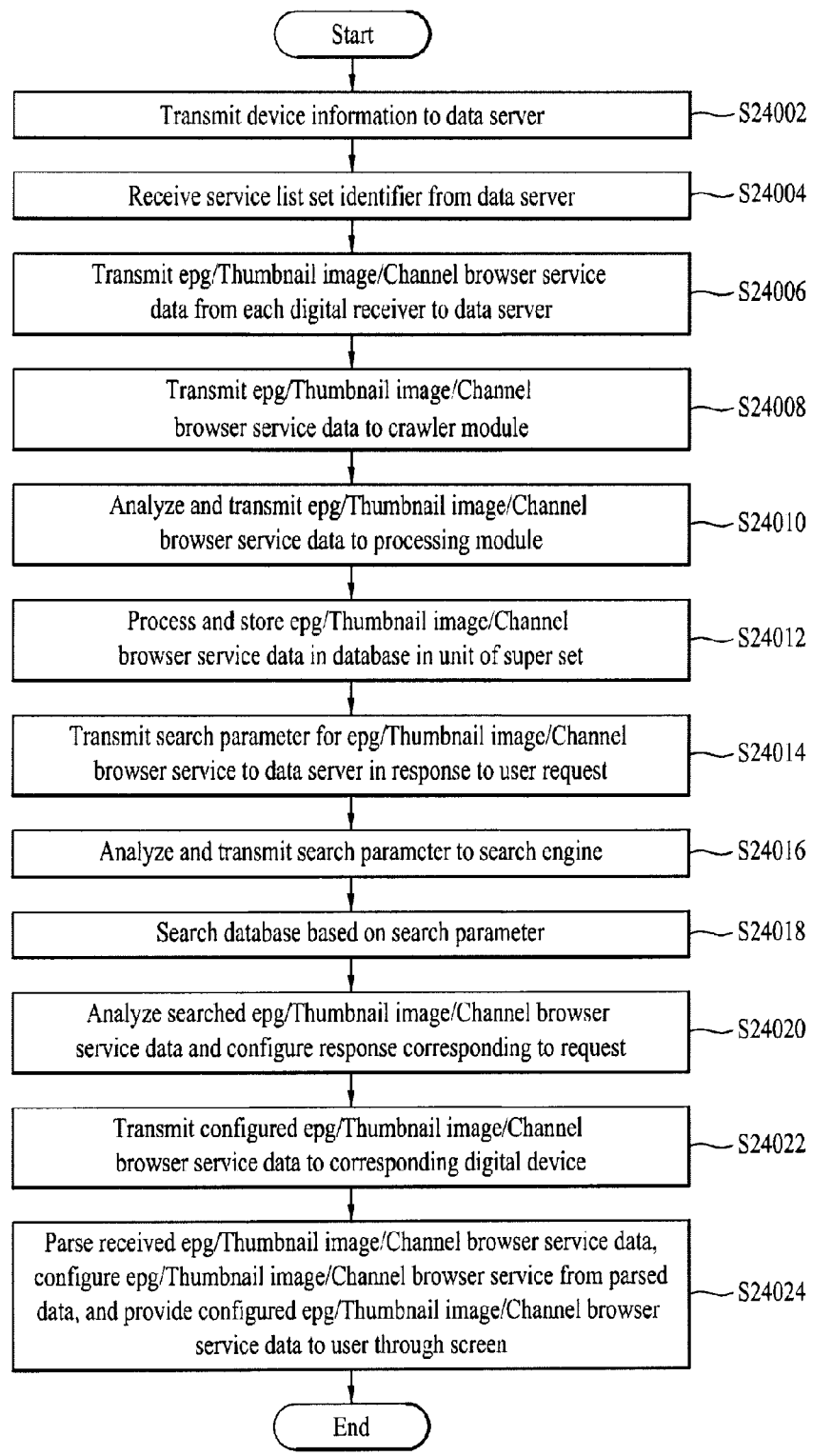
FIG. 24 is a flowchart showing a service data processing method in a digital system according to an exemplary embodiment of the present invention.

FIG. 24 is a flowchart explaining a service data processing method in a digital system according to an exemplary embodiment of the present invention.

A service data processing method shown in FIG. 24 will be described hereinafter with reference to FIGS. 10 to 23.

Each digital device transmits device information to a data server (S24002).

Each digital device receives a service list set identifier, to which the corresponding digital device belongs, from the data server based on the transmitted device information (S24004).

Each digital device transmits EPG/thumbnail image/channel browser service data to the data server (S24006).

The control module within the data server sorts the service data transmitted from each digital device, and transmits the sorted service data to the corresponding crawler module (S24008). Also, the control module analyzes service data transmitted from the analysis module and/or position information on each digital device, and transmits the analyzed results to the processing module (S24010).

The processing module processes the service data by coupling or combining the service data received from each digital device with service data received from an external server, and stores the processed service data in the database in a unit of service list set identifier or in a unit of super set. Here, if the corresponding service data is thumbnail image data, the service data may not pass through the processing module. In this case, the service data may be temporarily stored in a buffer or a volatile memory provided in a separate module (S24012).

The digital device transmits a search parameter to request the service data in response to a user request to the data server (S24014).

If the data server receives the service data request from the corresponding digital device, the data server determines whether or not the corresponding digital device has proper authority. If it is determined that the digital device has proper authority, the control module transmits the search parameter to a search engine (S24016).

The data server analyzes the search parameter, and accesses the database or the corresponding buffer or memory based on the service list set identifier to search the service data (S24018). Then, the data server analyzes the searched service data, and generates a message in response to the service data request (S24020).

The data server transmits the generated service data to the corresponding digital device (S24022), and the corresponding digital device parses the transmitted service data. Then, the digital device configures a service screen based on the parsed result, and provides the configured service screen to the user (S20424).

Here, in the case in which the digital device is connected to the other digital device via a network or utilizes a social network service, such as Twitter, as described above, the digital device may perform transmission/reception of the service data without an authentication procedure.

According to the present invention, the digital device may realize an improved EPG/thumbnail image/channel browser service in terms of quantity and/or quality than the related art, and may expand a service via inter-communication with other digital devices or via a social network service, thus satisfying needs for enhanced user convenience and the like.

In the above description, the search module configures a response containing an URL required to access a thumbnail image of each channel using collected channel browsers in response to a user request, and transmits the response to the corresponding digital device by way of the control module.

The digital device reads each channel and the URL of the corresponding channel by parsing the aforementioned response. Then, the digital device extracts the thumbnail image for the corresponding channel by accessing the read URL, thereby providing the extracted thumbnail image to the user.

Figure 25:
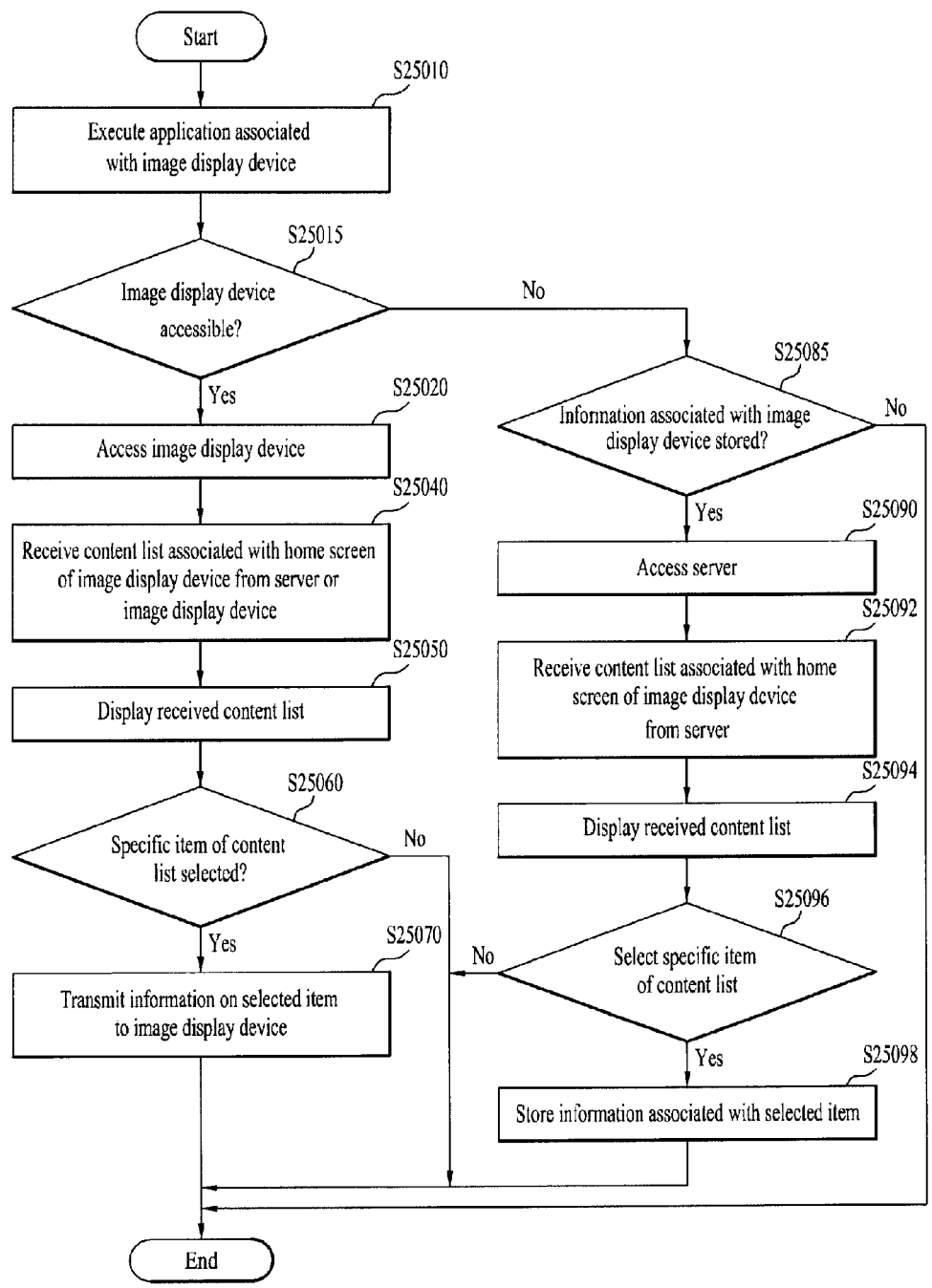
FIG. 25 is a flowchart showing an operating method of a mobile terminal according to an embodiment of the present invention.
Figure 26:
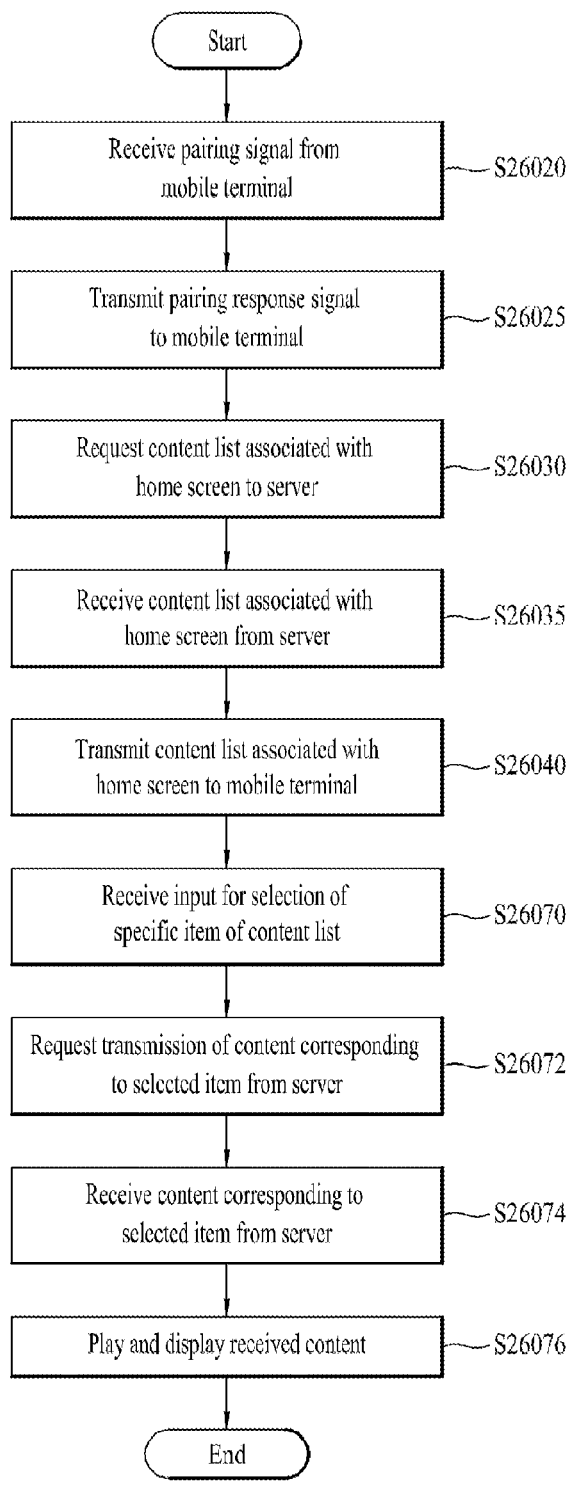
FIG. 26 is a flowchart showing an operating method of an image display device according to an embodiment of the present invention.
Figure 27:
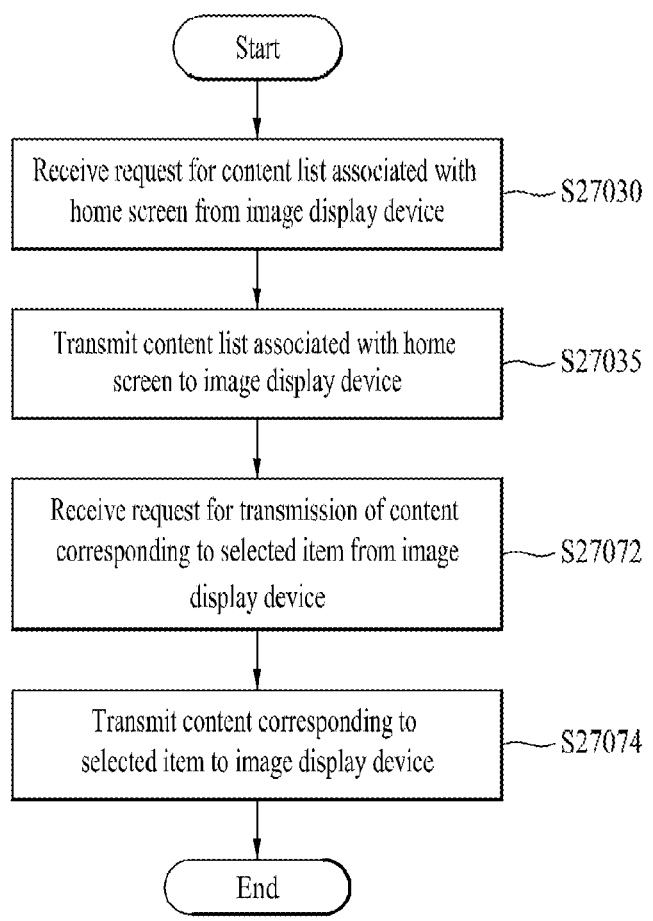
FIG. 27 is a flowchart showing an operating method of a server according to an embodiment of the present invention.
Figure 28:
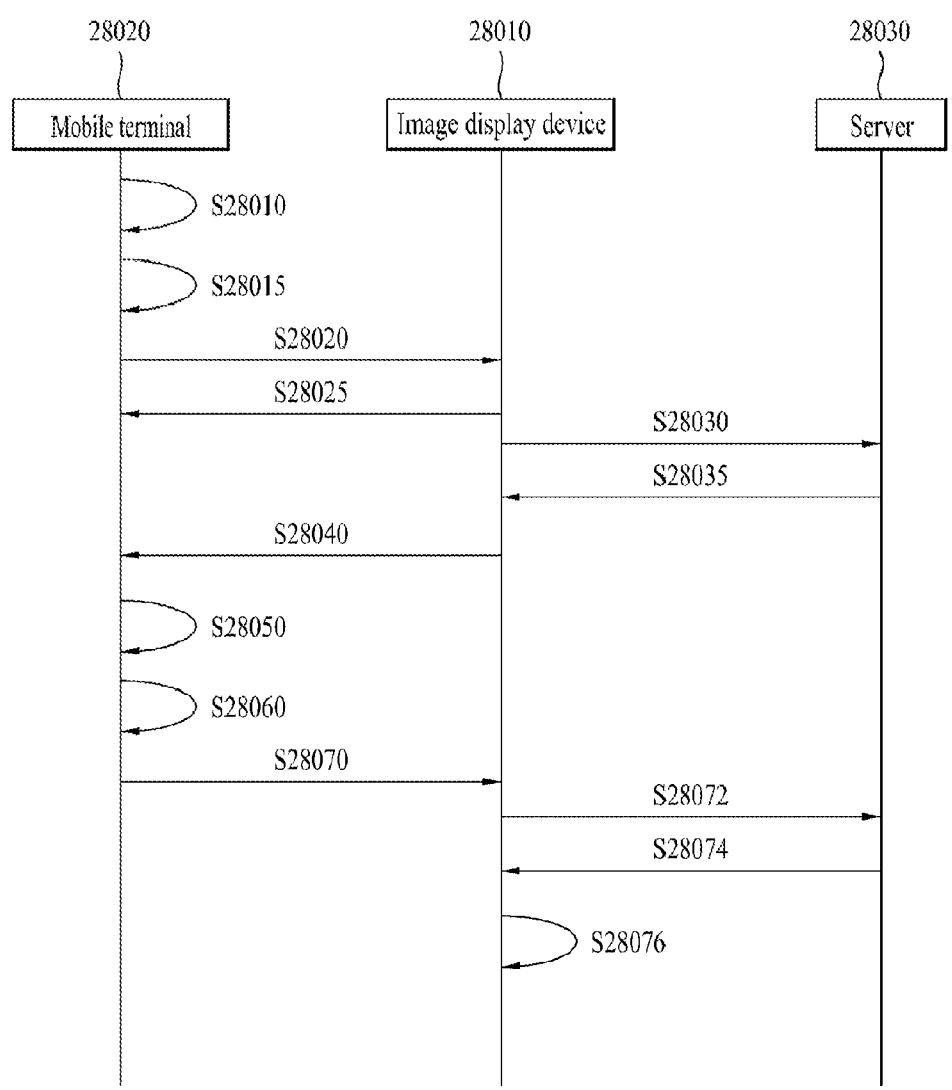
FIG. 28 is a reference diagram of the operating methods of FIGS. 25 to 27.

FIG. 25 is a flowchart showing an operating method of a mobile terminal according to an exemplary embodiment of the present invention, FIG. 26 is a flowchart showing an operating method of an image display device according to an exemplary embodiment of the present invention, FIG. 27 is a flowchart showing an operating method of a server according to an exemplary embodiment of the present invention, and FIG. 28 is a reference diagram of the operating methods of FIGS. 25 to 27.

Referring to the drawings, the mobile terminal executes an application associated with the image display device (S25010). For example, in a state in which an application for remote control of the image display device is installed in the mobile terminal, the corresponding application may be executed. The control unit of the mobile terminal executes the corresponding application.

Meanwhile, it is preferable to install the application for remote control of the image display device prior to Operation S25010.

Operation S25015 may correspond to Operation S28010 of FIG. 28.

Next, the mobile terminal determines whether or not the mobile terminal can access the image display device (S25015). If the mobile terminal can access the image display device, the mobile terminal is connected to the image display device (S25020).

In the case of executing the application for remote control of the image display device, the mobile terminal transmits a pairing signal to the image display device. As such, the image display device receives the pairing signal from the mobile terminal (S28020).

The image display device generates a pairing response signal in response to the received pairing signal, and transmits the pairing response signal to the mobile terminal (S28025). As such, the mobile terminal receives the pairing response signal from the image display device.

The mobile terminal can be connected to the image display device via transmission of the pairing signal and reception of the pairing response signal.

On the other hand, if the pairing response signal is not received within a predetermined time, or if a signal level of the received pairing response signal is less than a predetermined value, the mobile terminal may determine that the mobile terminal cannot access the image display device.

Alternatively, if the pairing response signal is received within the predetermined time, the mobile terminal may determine that the mobile terminal cannot access the image display device.

After pairing, the mobile terminal can exchange data with the image display device through an RF frequency band. This pairing end state may mean that the mobile terminal and the image display device are connected to each other.

Meanwhile, for connection to the mobile terminal, the image display device may transmit at least one of device information or user information on the image display device, authentication information for connection to the image display device, or authentication information with respect to a server connected to the image display device to the mobile terminal via a network interface.

Thereby, for connection to the image display device, the mobile terminal may receive at least one of the device information or user information on the image display device, authentication information for connection to the image display device, or authentication information with respect to the server connected to the image display device via a wireless communication unit.

Transmission and reception of the device information, for example, may be performed during pairing or after completion of pairing. If the authentication information for connection to the image display device is received during pairing, the mobile terminal may be connected to the image display device using the corresponding authentication information.

The device information, for example, may be stored in a memory of the mobile terminal.

In the above description, Operations S25015 and S25020 may correspond to Operations S28015 and S28020 of FIG. 28. Also, Operations S26020 and S26025 of FIG. 26 may correspond to Operations S28015 and S28020 of FIG. 28.

If the mobile terminal cannot access the image display device, Operation 25085 and the following operations may be performed.

Next, after pairing of the image display device and the mobile terminal is completed, the image display device requests a content list associated with a home screen to the server (S26030). The server receives the request for the content list associated with the home screen from the image display device (S27030). Then, the server transmits the content list associated with the home screen to the image display device (S27035). As such, the image display device receives the content list from the server (S26035).

If pairing of the mobile terminal and the image display device is completed in a state in which a display unit of the image display device displays a home screen, a control unit of the image display device may transmit the request for the content list associated with the home screen to the server via the network interface.

The server receives the content list request via the network interface. The content list request may be transmitted to a processor.

The processor may extract the content list stored in a storage unit, and may transmit the content list to the image display device via the network interface.

To transmit the content list, the server may receive, for example, the device information or user information on the image display device. The server may transmit a content list on a per image display device or user basis.

To enable transmission of the content list request and the content list in response to the content list request between the image display device and the server, the image display device may transmit authentication information to the server. The server may transmit an authentication completion message to the image display device.

Meanwhile, operations S26030 and S27030 may correspond to Operation S28030 of FIG. 28, and Operations S26035 and S27035 may correspond to Operation S28035 of FIG. 28.

Next, the image display device transmits the content list associated with the home screen of the image display device to the mobile terminal (S26040). The mobile terminal receives the content list associated with the home screen of the image display device from the image display device or the server while being connected to the image display device (S25040). The mobile terminal displays the received content list (S25050).

Since the mobile terminal is connected to the image display device, the mobile terminal may perform a remote control mode associated with an image displayed on the image display device.

In one example, if the image displayed on the image display device is a broadcast image of a predetermined channel, a display unit of the mobile terminal may display at least one of a channel change menu, a volume adjusting menu, a screen quality adjusting menu, and the like of the corresponding broadcast image.

In another example, if the image displayed on the image display device is the home screen of the image display device as shown in FIG. 37, the display unit of the mobile terminal may display, for example, a remote control screen containing a broadcast image item, a content list item and an application menu item associated with the home screen.

That is, the control unit of the mobile terminal may receive information on the image displayed on the image display device under the remote control mode, and may configure the remote control screen based on the corresponding image information.

Figure 39:
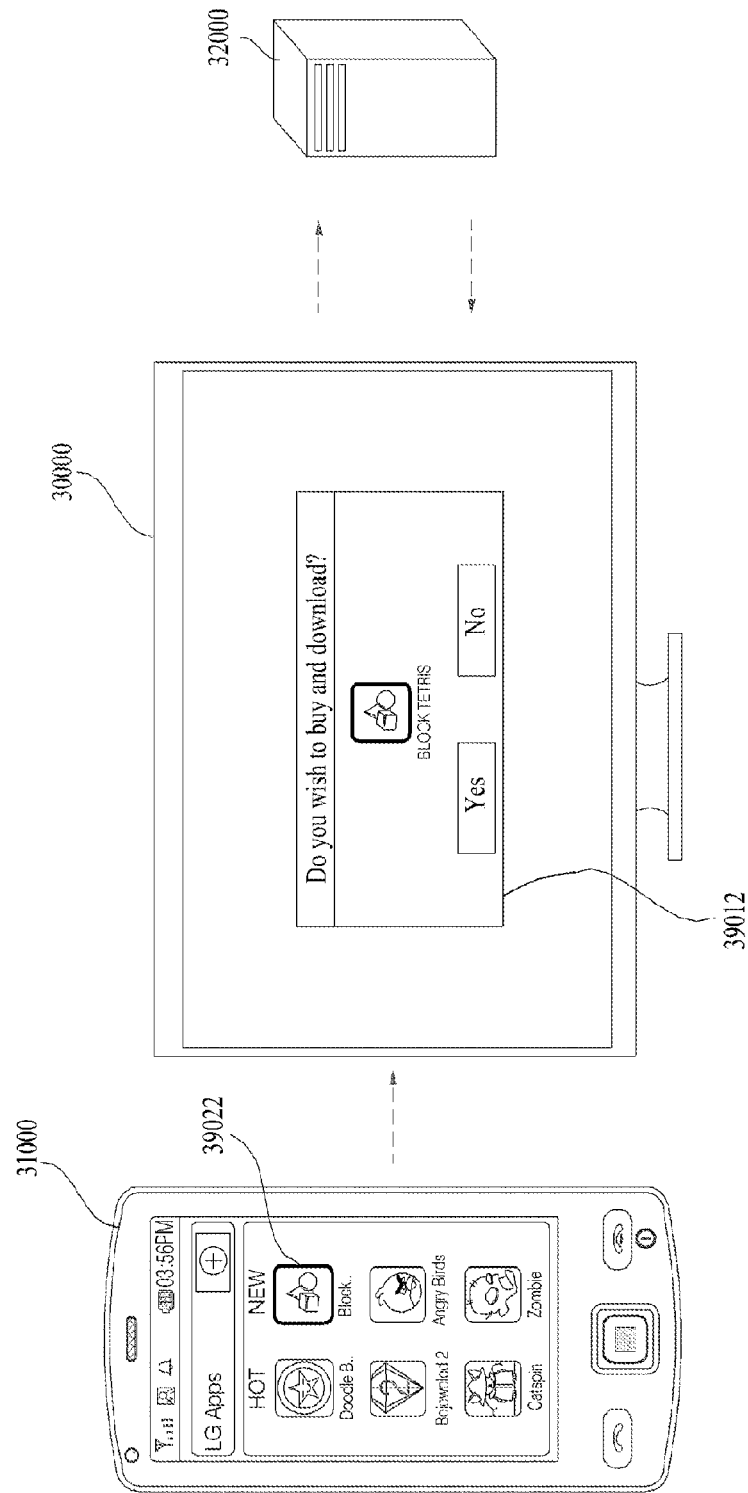

If the content list item among a plurality of items shown in FIG. 39 is selected, the mobile terminal may receive the content list associated with the home screen of the image display device from the image display device or the server via the wireless communication unit. The mobile terminal may display the received content list on the display unit.

Meanwhile, operations S25040 and S26040 may correspond to Operation S28040 of FIG. 28, and Operation S25050 may correspond to Operation S28050 of FIG. 28.

Next, the mobile terminal determines whether or not selection of a specific item included in the displayed content list is input (S25060). If the specific item is selected, the mobile terminal transmits information on the selected item to the image display device (S25070). The image display device receives the input of selection of the specific item (S26070).

If touch on a specific item included in the displayed content list is input, the mobile terminal selects the corresponding item. The selected item may be focused and displayed so as to differentiable from other items.

The control unit of the mobile terminal controls transmission of information on the selected item to the image display device via the wireless communication unit.

The network interface of the image display device receives the information on the selected item to the control unit.

Meanwhile, operations S25040 and S26040 may correspond to Operation S28040 of FIG. 28, and Operation S25050 may correspond to Operation S28050 of FIG. 28.

Next, the image display device transmits a content transmission request corresponding to the selected item to the server (S26072). The server receives the content transmission request (S27072). The server transmits content corresponding to the content transmission request to the image display device (S27074). The image display device receives content from the server (S26074). The image display device plays the corresponding content and displays the content on the display unit (S26076).

In response to the content transmission request, the server may extract corresponding content stored in the storage unit, or may receive content stored in another server via a network. The server may transmit the extracted or received content to the image display device via the network interface.

The image display device receives the corresponding content via the network interface, and transmits the content to the control unit. The control unit performs, for example, demultiplexing, decoding and scaling of the received content, and may play the content. The control unit may control display of the played content image on the display unit.

In this way, it is possible to easily play and display content corresponding to an item selected by the user on the image display device using the mobile terminal, which results in enhanced user convenience.

Meanwhile, operations S26072 and S27072 may correspond to Operation S28072 of FIG. 28, Operations S26074 and S27074 may correspond to S28074 of FIG. 28, and Operation S26076 may correspond to Operation S28076 of FIG. 28.

If the mobile terminal is not connected to the image display device, for example, if the user using the mobile terminal is out, as described above, Operation S26085 and the following operations may be performed.

First, the control unit of the mobile terminal determines whether or not information on the image display device is stored in the memory of the mobile terminal (S25085).

In particular, the control unit of the mobile terminal determines whether or not authentication information with respect to the server connected to the image display device is stored in the memory.

Prior to the aforementioned operation, if the mobile terminal and the image display device are connected to each other, the mobile terminal may receive at least one of device information on the image display device, authentication information to permit connection to the image display device, or authentication information with respect to the server connected to the image display device. In this case, the memory of the mobile terminal may store the received information.

If the authentication information with respect to the server connected to the image display device is stored in the memory, the mobile terminal is connected to the server using the authentication information (S25090). The mobile terminal receives the content list associated with the home screen of the image display device from the server (S25092). Then, the mobile terminal displays the received content list (S25094).

The mobile terminal can be connected to the server using the authentication information with respect to the server connected to the image display device.

On the other hand, the mobile terminal may transmit a request for the content list associated with the home screen. Thus, in response to the request, the server transmits the content list associated with the home screen to the mobile terminal.

The mobile terminal may transmit information that indicates the mobile terminal is not connected to the image display device to the server. In this case, the server may transmit a default content list among content lists associated with the home screen to the mobile terminal.

The mobile terminal may transmit device information or user information on the mobile terminal to the server. In response to the transmitted information, the server may transmit a preset content list on a per device or user basis to the mobile terminal.

The mobile terminal displays the received content list on the display unit thereof.

Next, if a specific item included in the content list is selected (S25096), the mobile terminal stores information on the selected item (S25098).

If a touch on the specific item in the displayed content list is input, the mobile terminal selects the corresponding item. The selected item may be focused and displayed so as to be differentiable from other items.

Since the mobile terminal is not connected to the image display device, the control unit of the mobile terminal controls storage of the information on the selected item in the memory of the mobile terminal.

The memory may store a bookmark list containing the user selected item of the content list. Also, the control unit of the mobile terminal extracts the bookmark list if display of the stored list is input, and controls display of the extracted bookmark list on the display unit.

In this way, in the case in which the mobile terminal is not connected to the image display device, the mobile terminal can select a desired item of the content list and store the selected item.

Figure 29:
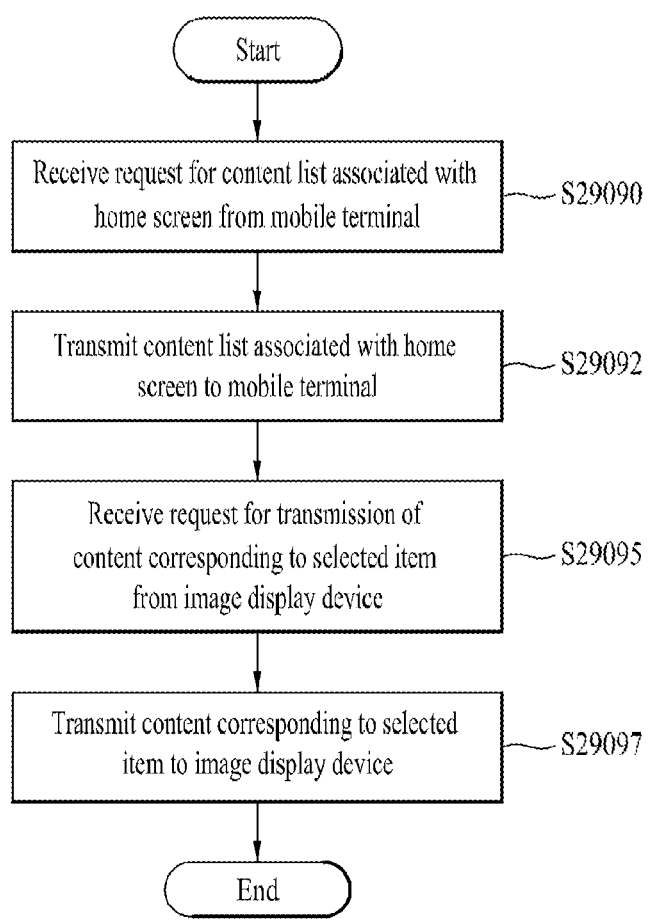
FIG. 29 is a flowchart showing an operating method of a server according to an embodiment of the present invention.

FIG. 29 is a flowchart showing an operating method of the server according to another exemplary embodiment of the present invention.

The operating method of the server shown in FIG. 29 is similar to the operating method of the server shown in FIG. 27 except that the content list request is received from the mobile terminal other than the image display device.

That is, the server receives a request for the content list associated with the home screen from the mobile terminal (S29090). The server transmits the content list associated with the home screen to the mobile terminal (S29092).

As described above, the mobile terminal may be directly connected to the server without the image display device interposed therebetween. In particular, if the mobile terminal and the image display device are not connected to each other, the mobile terminal may be directly connected to the server without the image display device interposed therebetween.

The mobile terminal may be directly connected to the server using the authentication information with respect to the server.

The mobile terminal may transmit the request for the content list associated with the home screen. In response to the request, the server transmits the content list associated with the home screen to the mobile terminal.

On the other hand, the mobile terminal may transmit device information or user information on the mobile terminal to the server. In response to the transmitted information, the server may transmit a preset content list on a per device or user basis to the mobile terminal.

Next, the server receives a content transmission request corresponding to the selected item from the image display device (S29095). The image display device transmits content corresponding to the selected item (S29097).

Operations S29095 and S29097 correspond to Operations S27072 and S27074 of FIG. 27, and a description thereof will be omitted hereinafter.

FIGS. 30 to 46 are reference diagrams of the operating methods of FIGS. 25 to 27.

Figure 30:
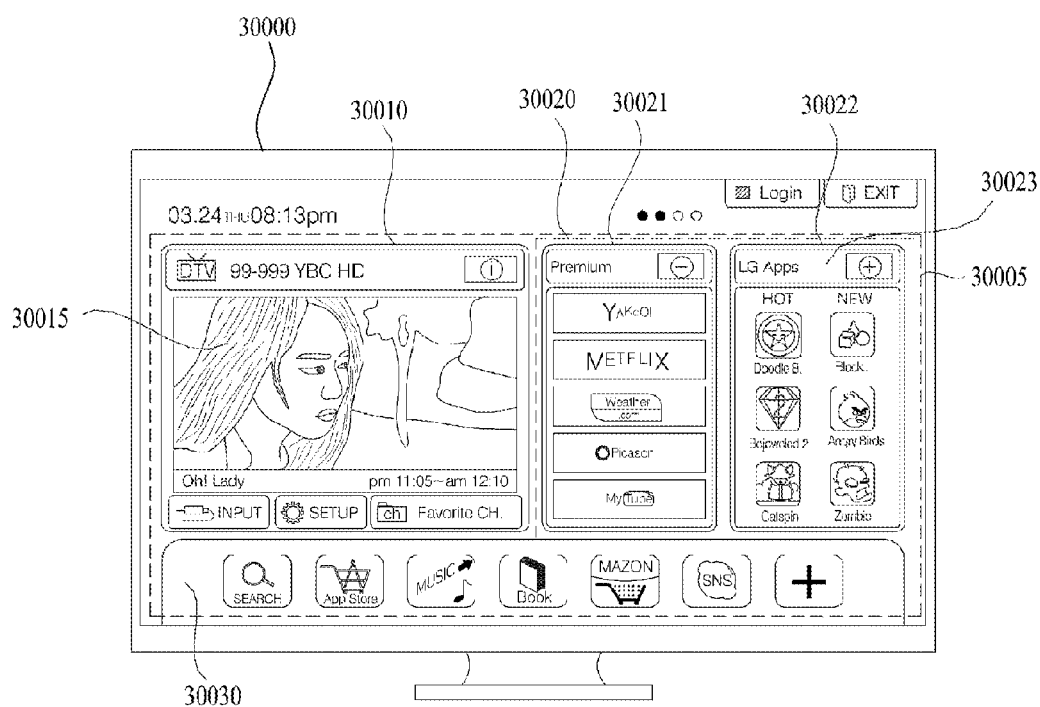

First, FIG. 30 exemplifies a home screen 30005 displayed on the display unit of the image display device 30000.

The home screen 30005 shown in FIG. 30 may be set to an initial screen when power is turned on or when switching from a standby mode to an on mode, or may be set to a basic screen by selection of a local key (not shown) or a home key of a remote controller.

In order to implement the home screen, a smart system platform may be installed in a processor of the control unit of the image display device 30000, or in a separate processor.

For example, the smart system platform may include an OS kernel, a library on an OAS kernel, a framework, and an application layer. Under the smart system platform, a download, an installation, an execution and a deletion of an application may be freely performed.

The home screen 30005 of FIG. 30 may be broadly divided into a live image area 30010 for displaying a live image 30015, a card object area 30020 including card objects 30021 and 30022 representing items from various sources (e.g., CPs or applications) on a per list basis, and an application menu area 30030 including a shortcut menu of an application item.

In FIG. 30, the application menu area 30030 is displayed on the lower side of the home screen 30005. Also, log-in and log-out items may further be displayed.

In this case, in the live image area 30010 and the application menu area 30030, internal items or objects thereof may be displayed at fixed positions.

On the other hand, the card object area 30020 includes the card objects 30021 and 30022 including a content list. In FIG. 30, the card object 30021 is a CP card object including a CP list, and the card object 30022 is an application card object including an application list.

Positions of the card objects 30021 and 30022 may be moved or replaced. Alternatively, a position of each item (e.g., an item "yakoo") in the card objects 30021 and 30022 may be moved or replaced.

Although not shown in the drawing, the card object area 30020 may include, for example, a broadcast card object (not shown) including a broadcast program list, a preferred channel card object (not shown) including a preferred channel list, a stored content card object (not shown) including a stored content list, and a channel browser card object (not shown) including a channel list.

FIG. 30 illustrates a scaled broadcast image 30015 displayed in the live image area 30010, which is obtained by scaling a broadcast image received by a broadcast receiver. When displaying the broadcast image 30015, broadcast image information may also be displayed in the live image area 30010.

Figure 31:
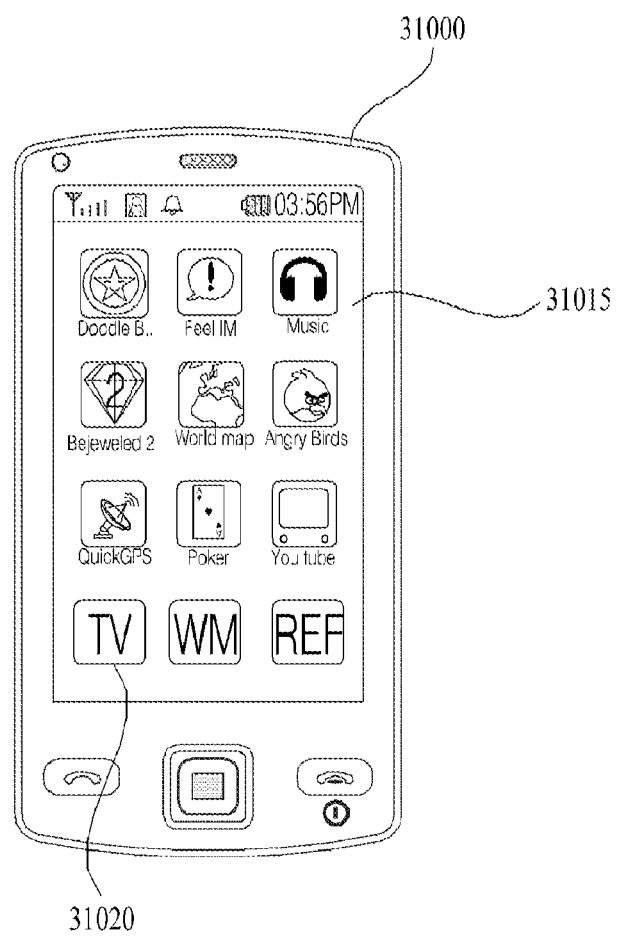

FIG. 31 illustrates an application screen 31010 including a plurality of applications, which is displayed on the display unit of the mobile terminal 31000.

In this case, the application screen 31010 may include an application 31015 for remote control of the image display device 30000 among a plurality of applications. The application screen 31010 may further include an application for remote control of a washing machine, and an application for remote control of a refrigerator, for example.

The application 31015 for remote control of the image display device 30000 may be downloaded from the server 32000 and be installed in the mobile terminal 31000 when the mobile terminal 31000 is connected to the server 32000.

If the application 31015 for remote control of the image display device 30000 is selected from the application screen 31010, the corresponding application item may be focused and displayed so as to be differentiable from other applications.

Figure 32:
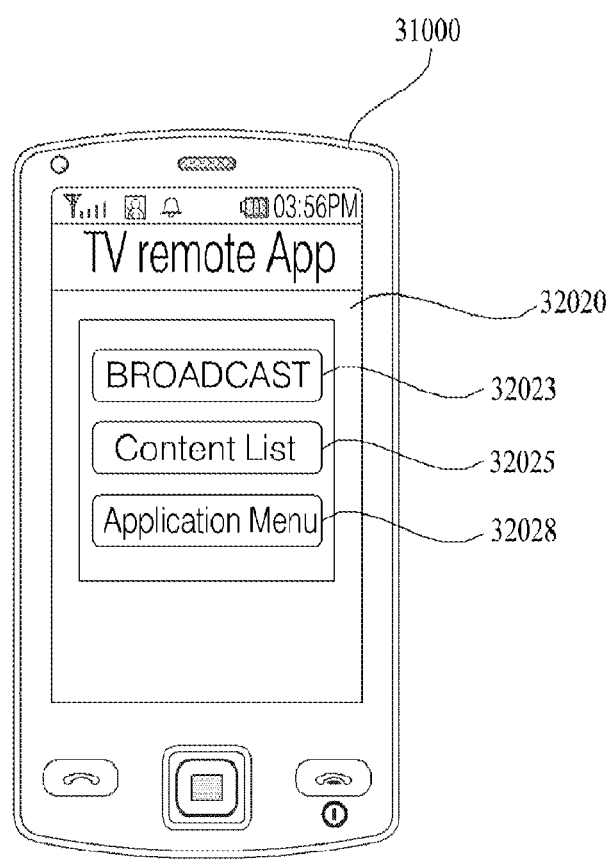

FIG. 32 illustrates a remote control screen 32020 for the image display device 30000 displayed on the display unit of the mobile terminal 31000.

If the application for remote control of the image display device 30000 is executed, the image display device 30000 may enter a remote control mode thereof. Thus, as described above, the image display device 30000 may perform transmission of a pairing signal, reception of a pairing response signal, reception of device information on the image display device 30000, and reception of personal information, for example.

The image display device remote control screen 32020 is variable according to the kind of images displayed on the image display device 30000.

For example, if the image display device 30000 displays the home screen as shown in FIG. 30, the image display device remote control screen 32020 may include items associated with the home screen.

In the drawing, a broadcast item 32023, a content list item 32025, and an application item 32028 are illustrated.

Figure 33:
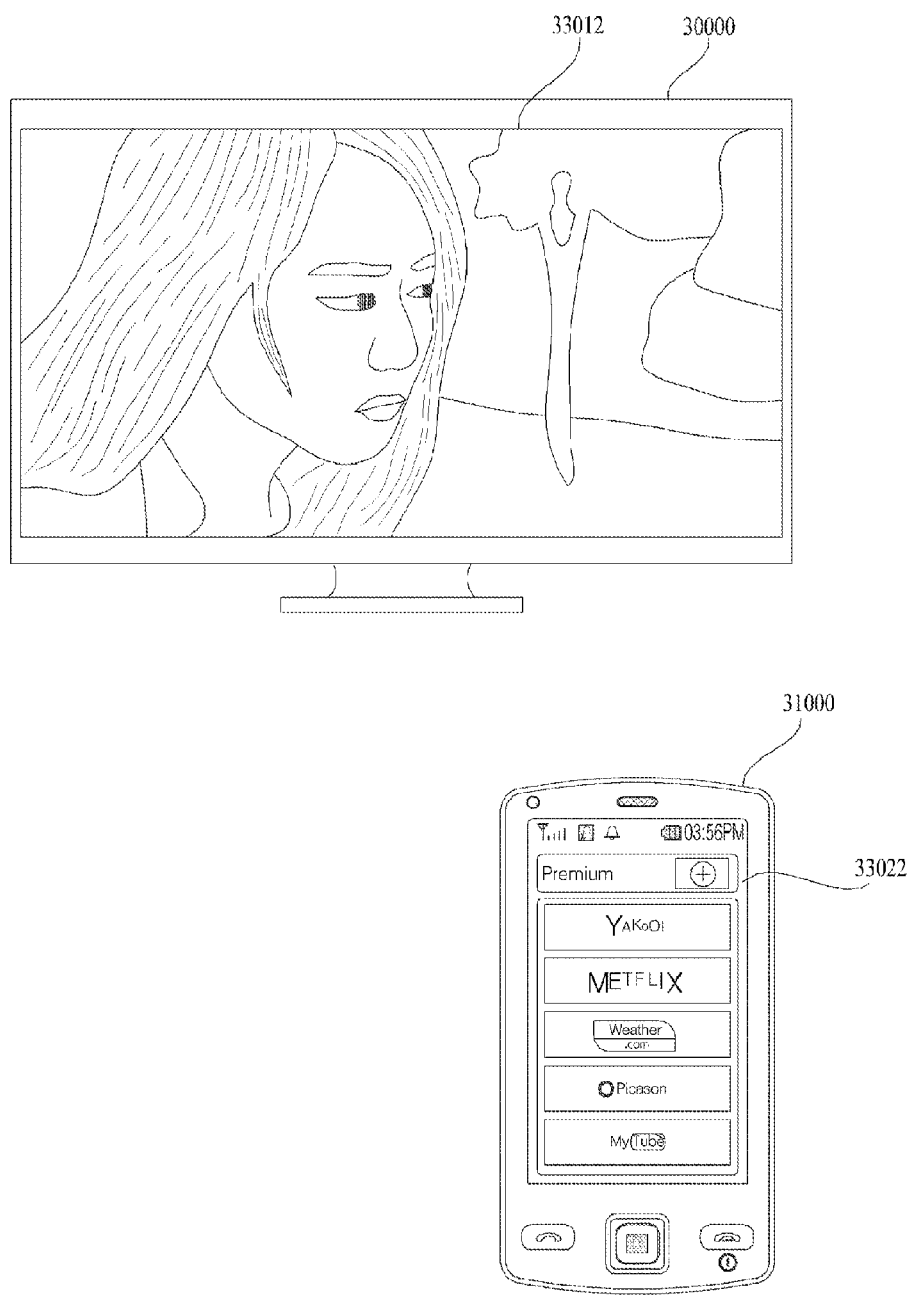

FIG. 33 illustrates a content provider list 33030 displayed on the display unit of the mobile terminal 31000 when the content list item 32025 among the items of FIG. 32 is selected. The content provider list 33030 may correspond to the card object 30021 including content provider items of FIG. 30.

If the content list item 32025 among the items of FIG. 32 is selected, the mobile terminal 31000 may transmit information on the selected item to the image display device 30000. As such, the image display device 30000 may transmit a content list request to the server 32000, the server 32000 may transmit a content list to the image display device 30000, and the image display device 30000 may transmit the received content list to the mobile terminal 31000. As such, the content provider list 33022 may be displayed on the display unit of the mobile terminal 31000.

In this case, the display unit of the image display device 30000 may display an enlarged broadcast image 33012 on the home screen, other than the home screen image of FIG. 30.

In this way, it is possible to allow the user to continuously watch the displayed image without interruption. In particular, in the case in which the mobile terminal 31000 displays content not associated with a broadcast image, such as the content list, and the image display device 30000 does not display content. This ensures that the user can perform desired operations using the mobile terminal 31000 while watching the broadcast image, which results in enhanced user convenience.

Figure 34:
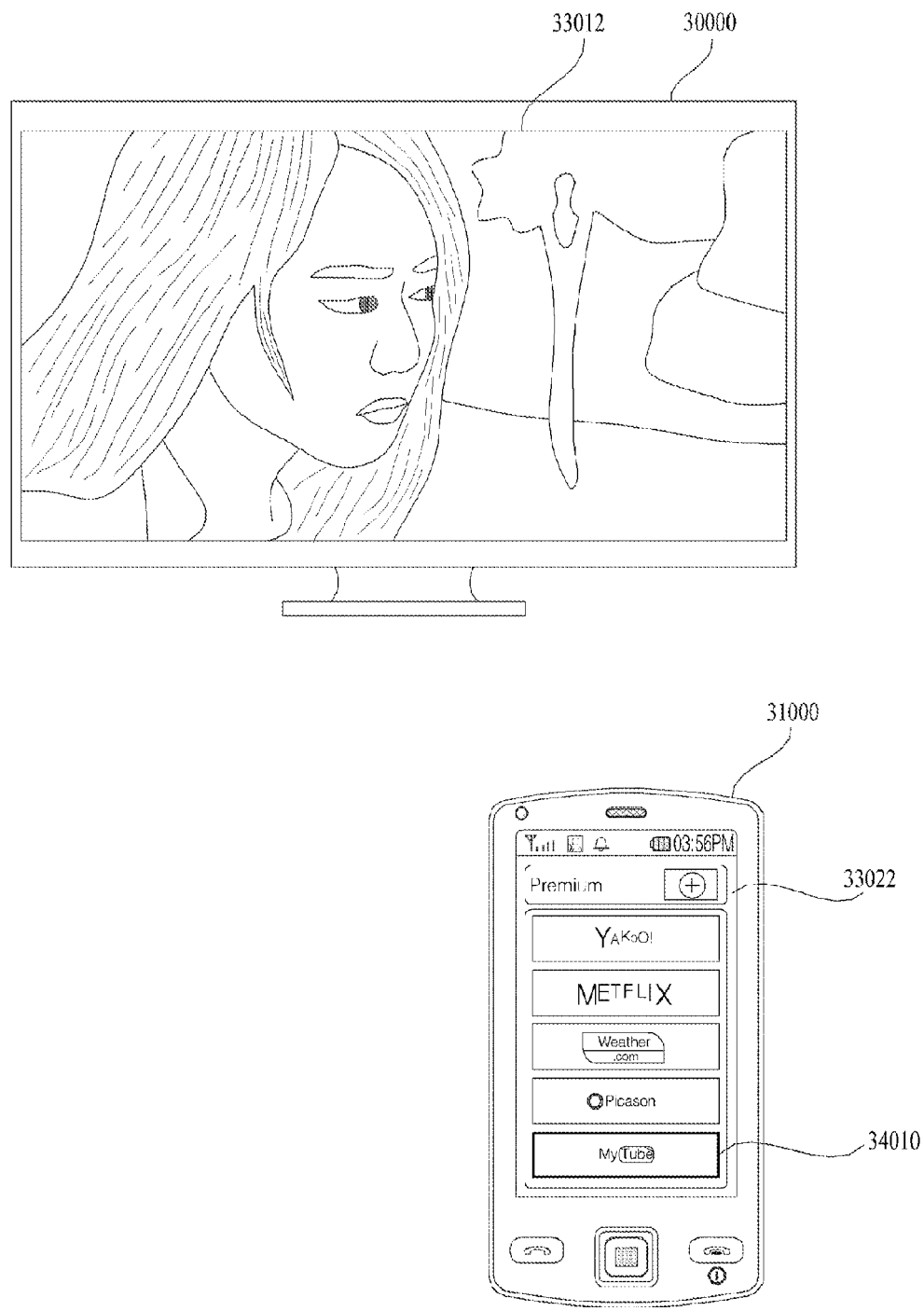

Referring to FIG. 34, if a specific item among the content provider items in the content provider list 33022 of FIG. 33 is selected, the corresponding item 34010 may be focused and displayed on the display unit of the mobile terminal 31000.

The content provider list 33022 corresponds to the card object 30021 including the content provider list of FIG. 30.

Referring to FIG. 35, if the specific item 34010 among the content provider items of the content provider list 33022 of FIG. 34 is selected, a content list 35010 provided by a content provider may be displayed on the display unit of the mobile terminal 31000.

If the specific item 35010 among the content provider items of the content provider list 33022 of FIG. 34 is selected, the mobile terminal 31000 may transmit information on the selected item 35012 to the image display device 30000. As such, the image display device 30000 may transmit a request for information on the selected item, i.e., information on the corresponding content provider to the server 32000, and the server 32000 may transmit the information on the corresponding content provider to the image display device 30000. In this case, the content provider information may include a content list provided by the content provider. The image display device 30000 may transmit the received content provider information to the mobile terminal 31000. As such, the content list 35010 provided by the content provider may be displayed on the display unit of the mobile terminal 31000.

Figure 36:
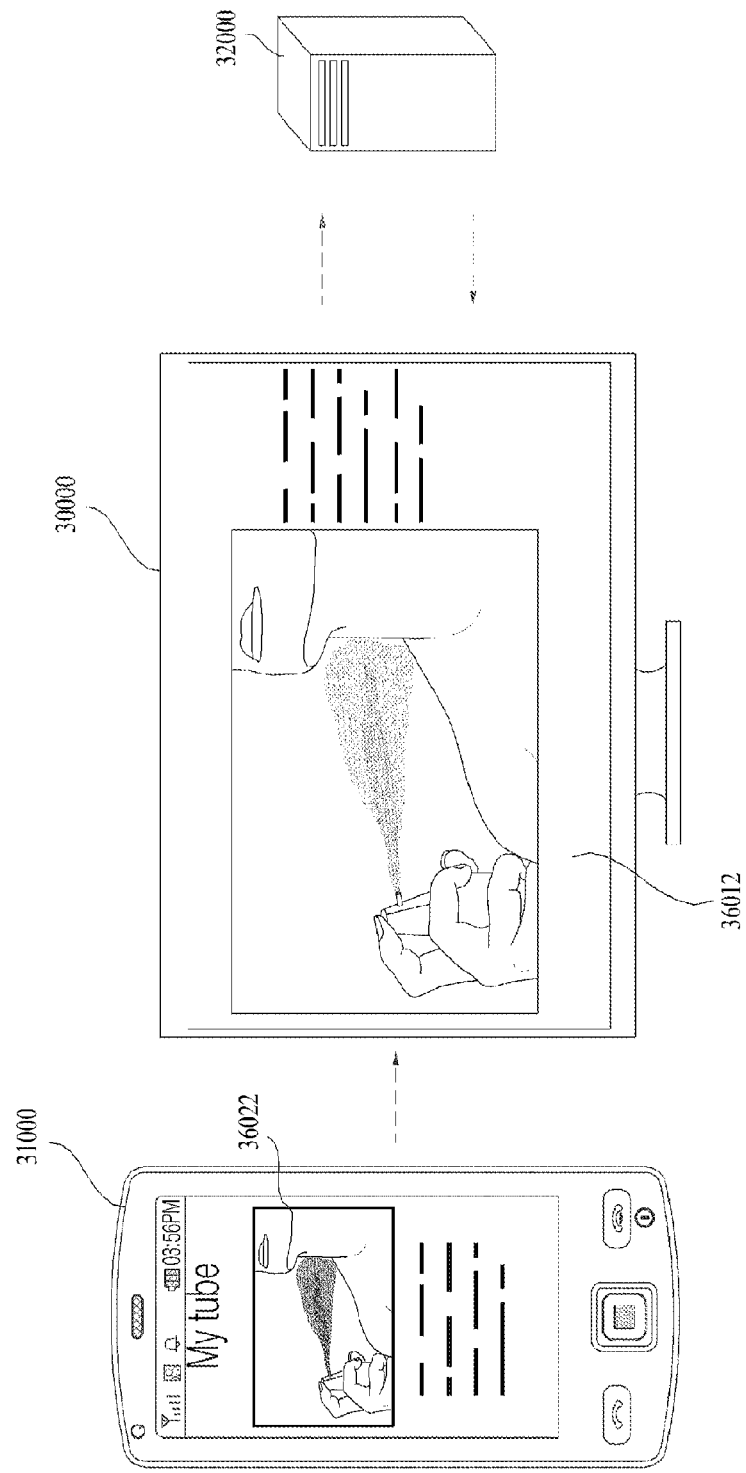

Referring to FIG. 36, if a specific item 35012 among content items of the content list shown in FIG. 35 is selected, a corresponding content image 35012 is played and is displayed on the display unit of the mobile terminal 31000. Also, FIG. 36 illustrates that a corresponding content image 36022 is played and is displayed on the display unit of the image display device 30000.

If the specific item 36022 among the content items of the content list 34040 shown in FIG. 35 is selected, the mobile terminal 31000 may transmit information on the selected item 36045 to the image display device 30000. As such, the image display device 30000 may transmit a request for information on the selected item, i.e., a request for corresponding content to the server 32000, and the server 32000 may transmit the corresponding content to the image display device 30000. The image display device 30000 may play the received content, and display the played content image 36060 on the display unit thereof.

Thus, the user may simply and rapidly watch the desired content image 36060 using the mobile terminal 31000 while watching a broadcast image 36065 via the image display device 30000.

On the other hand, the image display device 30000 may transmit the received content to the mobile terminal 31000. As such, the mobile terminal 31000 may play the received content, and display the played content image 36050 on the display unit thereof.

If the specific item 36045 among the content items of the content list 34040 is selected, the mobile terminal 31000 may be directly connected to the server 32000 without the image display device 30000, and may receive the corresponding content from the server 32000. Even in this case, information on the selected item may be transmitted to the image display device 30000.

Although the drawing illustrates that both the mobile terminal 31000 and the image display device 30000 play and display content images, differently, only the image display device 30000 may play and display content images. That is, the display unit of the mobile terminal 31000 may display only the focused selected item 36045 in a state in which the content list 34040 is displayed as shown in FIG. 35.

FIG. 37 illustrates a content provider list 37030 displayed on the display unit of the mobile terminal 31000, similar to FIG. 34. In this case, the image display device 30000 may display an enlarged broadcast image 33012 of the broadcast image on the home screen.

If a next screen view request 37010 is input in a state in which the content provider list is displayed, as shown in FIG. 38, an application list 38020 may be displayed on the display unit of the mobile terminal 31000.

The next screen view input may be a flicking input or a sliding input by touching.

Referring to FIG. 39, if a specific item 39022 among application items of the application list 38020 shown in FIG. 38 is selected, an application associated image 39012 is displayed on the display unit of the image display device 30000.

If the specific item 39022 among the application items of the application list 38020 shown in FIG. 38 is selected, the mobile terminal 31000 may transmit information on the selected item 39022 to the image display device 30000. As such, the image display device 30000 transmits a request for information on the selected item, i.e. information on a corresponding application item to the server 32000, and the server 32000 may transmit the information on the corresponding application item to the image display device 30000.

In particular, if the image display device 30000 is not equipped with the corresponding application item, the application item information may include download information, or purchase information, for example.

As such, the image display device 30000 may receive the information on the application item, and display the associated image 39012 on the display unit thereof.

The drawing illustrates display of the downloading associated image 39012 of the corresponding application item.

In this way, an application not equipped in the image display device 30000 can be searched and selected and be installed in the image display device 30000 using the mobile terminal 31000.

FIG. 40 illustrates an image display device remote control screen 40012 displayed on the display unit of the mobile terminal 31000, similar to FIG. 32.

The image display device remote control screen 40012 may include a broadcast item 40014, a content list item 40016, and an application item 40018.

Referring to FIG. 41, if the application item 40018 of the image display device remote control screen 40012 shown in FIG. 40 is selected, an application menu 41018 including an application list 41012 is displayed on the display unit of the mobile terminal 31000.

The application menu 41012 may correspond to an application menu displayed in the application menu area 30022 of FIG. 30.

Figure 42:
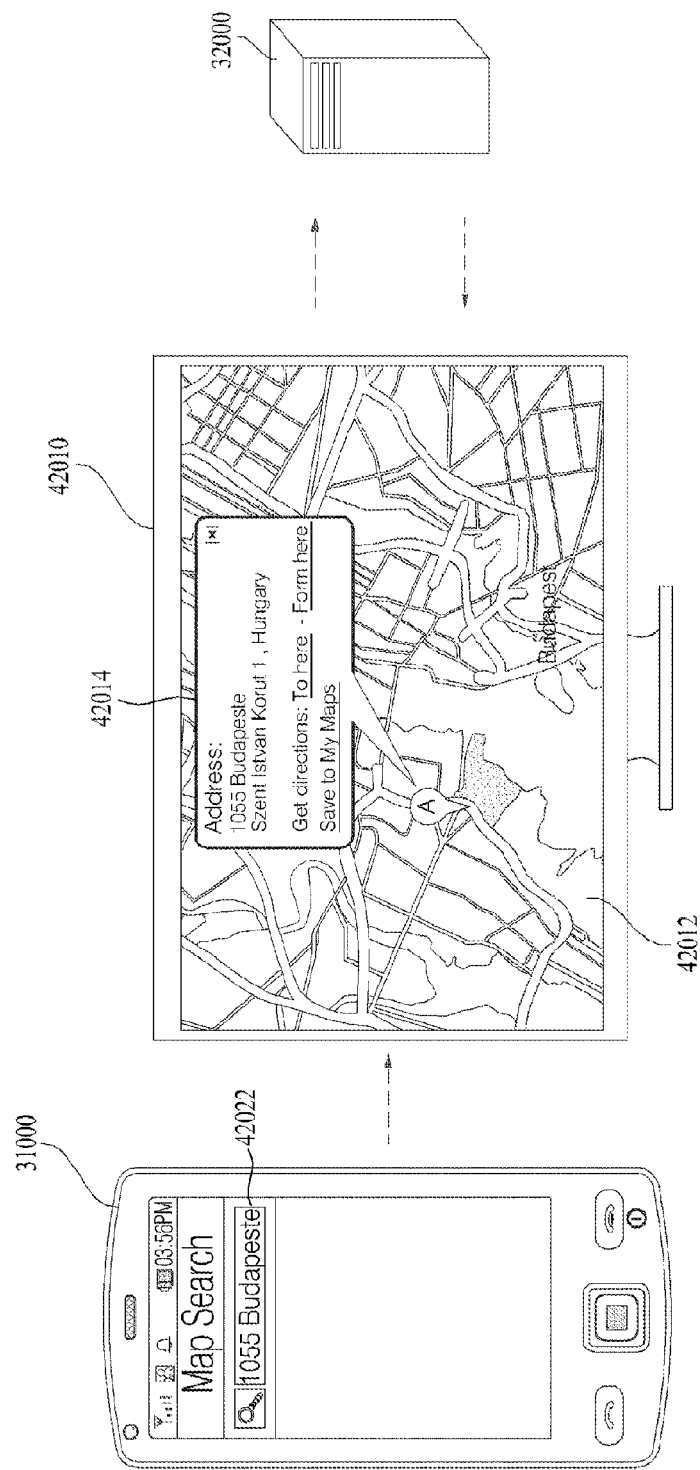

Referring to FIG. 42, if a search application item 41014 of the application menu 41012 shown in FIG. 41 is selected, a search screen is displayed on the display unit of the mobile terminal 31000.

In this case, if a search word is input to the search screen, the mobile terminal 31000 transmits search information to the image display device 30000, and in turn the image display device 30000 transmits the search information to the server 32000. The server 32000 collects searched result information based on the search information, and transmits the searched result information to the image display device 30000. The image display device 30000 may display a searched result screen on the display unit thereof.

In this way, when inputting a search word through the mobile terminal 31000, the searched result can be displayed on the image display device 30000, which results in enhanced user convenience.

Figure 43:
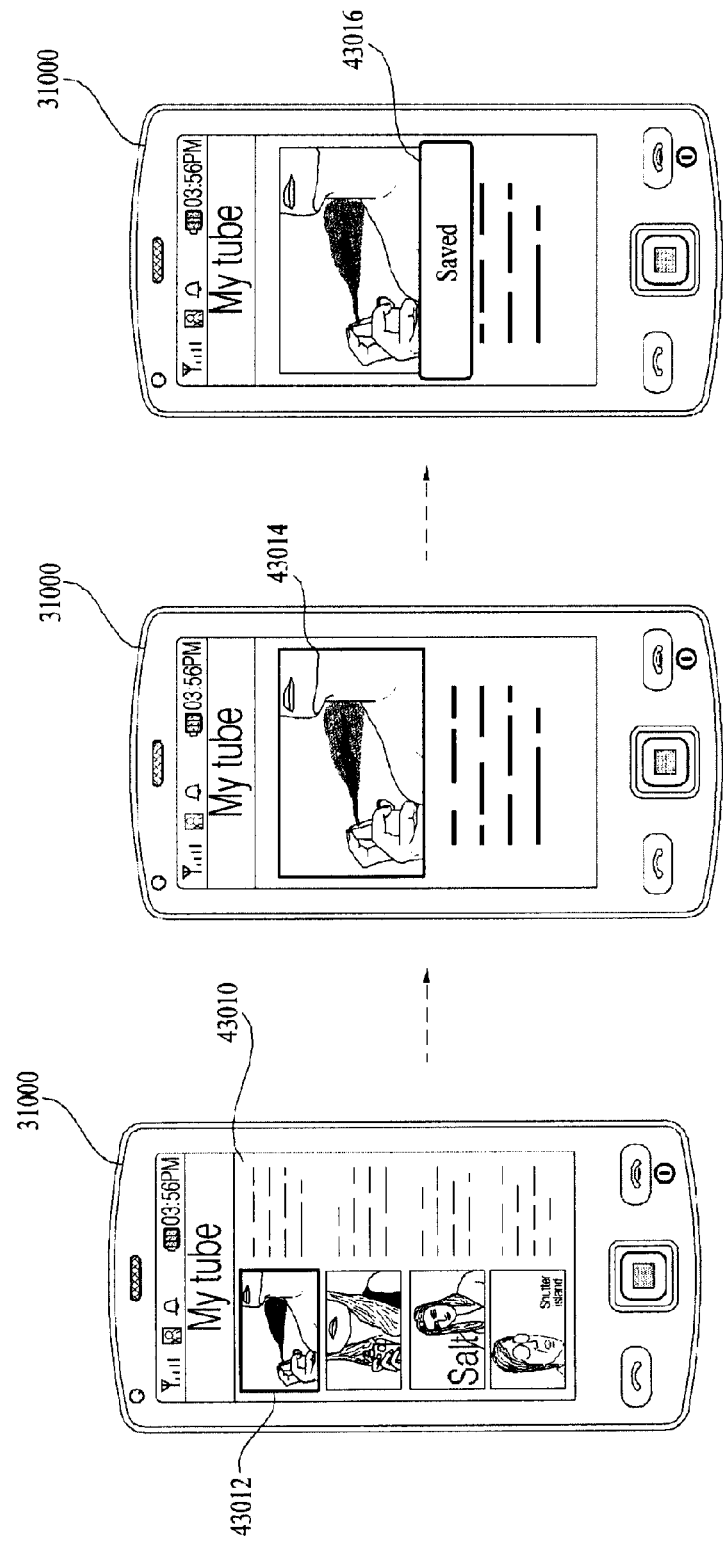

FIG. 43 illustrates that a content item selected by the mobile terminal 31000 is stored in the mobile terminal 31000 when the mobile terminal 31000 is not connected to the image display device 30000.

If a specific item 34010 is selected in a state in which the content provider list 33022 is displayed as shown in FIG. 34, a content list 43010 provided by a selected content provider may be displayed on the display unit of the mobile terminal 31000 as shown in FIG. 43(a).

If any one content item 43012 is selected, as shown in FIG. 43(b), an information image 43014 associated with corresponding content may be displayed on the display unit of the mobile terminal 31000.

In this case, if the mobile terminal 31000 is not connected to the image display device 30000, it is impossible to transmit the selected content information to the image display device 30000 as shown in FIG. 36, and thus the information is stored in the memory of the mobile terminal 31000.

FIG. 43(c) illustrates that an object 43030 indicating that selected content is saved 43016 is displayed on the display unit of the mobile terminal 31000. Content items selected by the user may be stored as a bookmark list in the memory of the mobile terminal 31000.

Figure 44:
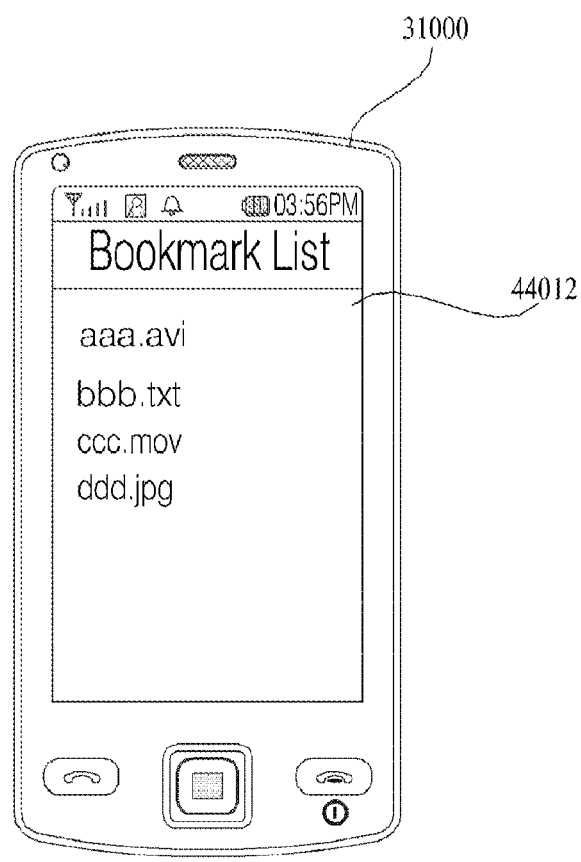

FIG. 44 illustrates that a bookmark list 44012 is extracted from the memory and displayed on the display unit of the mobile terminal 31000.

Figure 45:
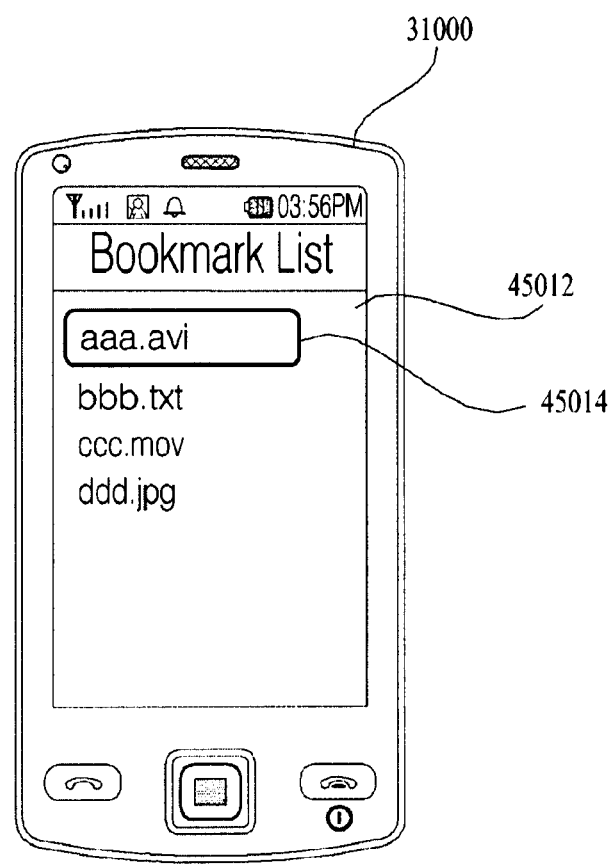

FIG. 45 illustrates that a selected specific content item 45014 of a bookmark list 45012 is focused and displayed on the display unit of the mobile terminal 31000.

Referring to FIG. 46, if a specific content item 45014 of a bookmark list 45012 is selected in a state in which the mobile terminal 31000 and the image display device 30000 are connected to each other, the mobile terminal 31000 transmits information on the corresponding content item to the image display device 30000. As such, the image display device 30000 transmits a request for transmission of corresponding content to the server 32000. The server 32000, which has received the request, transmits the corresponding content stored in the memory thereof to the image display device 30000.

The image display device 30000 receives and plays the corresponding content, and displays a played content image 46012 on the display unit thereof.

In this way, in the case in which the user is located at the outside rather than being located near the image display device 30000, in other words, the mobile terminal 31000 cannot be connected to the image display device 30000, the user can select a desired item included in a content list in advance using the mobile terminal 31000, and store the item in the image display device 30000.

Thereafter, if the mobile terminal 31000 can be connected to the image display device 30000, a bookmark list 45014 is displayed on the mobile terminal 31000 and the selected item is transmitted to the image display device 30000, whereby content of the desired item selected by the user can be rapidly played and displayed on the image display device 30000.

According to an embodiment of the present invention, an operating method of a mobile terminal 31000 may include entering a remote control mode for an image display device 30000, receiving a content list from the image display device 30000 or a server 32000 connected to the image display device 30000, displaying the received content list, and if a specific item of the content list is selected, transmitting information associated with the selected item to the image display device 30000. Here, the content list may be a content list associated with a home screen of the image display device 30000, and the operating method may further include accessing the image display device 30000. The operating method of the mobile terminal 31000 may further include transmitting a pairing signal to the image display device 30000, and receiving a pairing response signal from the image display device 30000.

The operating method of the mobile terminal 31000 may further include receiving at least one of device information on the image display device 30000, authentication information for connection to the image display device 30000, and authentication information with respect to the server 32000 connected to the image display device 30000.

The operating method of the mobile terminal 31000 may further include receiving the authentication information with respect to the server 32000 connected to the image display device 30000, and accessing the server 32000 using the authentication information. In this case, the operating method of the mobile terminal 31000 may further include storing the authentication information with respect to the server 32000 connected to the image display device 30000.

If the mobile terminal 31000 cannot be connected to the image display device 30000, the operating method of the mobile terminal 31000 may further include accessing the server 32000 that transmits data to the image display device 30000 using pre-stored information associated with the image display device 30000, receiving the content list from the server 32000, displaying the received content list, and if a specific item of the content list is selected, storing information associated with the selected item.

The operating method of the mobile terminal 31000 may further include displaying a bookmark list, and transmitting information associated with the item of the bookmark list to the image display device 30000.

According to another embodiment of the present invention, an operating method of an image display device 30000 may include requesting transmission of content corresponding to a specific item from a server 32000 if an input for selection of the specific item included in a content list is received from a mobile terminal 31000, receiving the content corresponding to the selected item from the server 32000, and playing and displaying the received content. The operating method of the image display device 30000 may further include receiving a pairing signal from the mobile terminal 31000, and transmitting a pairing response signal to the mobile terminal 31000. Additionally, the operating method of the image display device 30000 may include requesting the content list from the server 32000 that can exchange data with the image display device 30000, receiving the content list from the server 32000, and transmitting the content list to the mobile terminal 31000.

In this case, the content list may be a content list associated with a home screen of the image display device 30000. The operating method of the image display device 30000 may further include transmitting authentication information with respect to the server 32000 connected to the image display device 30000, and receiving an authentication completion message from the server 32000.

The operating method of the image display device 30000 may further include transmitting at least one of device information on the image display device 30000, authentication information for connection to the image display device 30000 and authentication information with respect to the server 32000 connected to the image display device 30000 to the mobile terminal 31000. The operating method of the image display device 30000 may further include displaying the home screen including a broadcast image and a content list, and displaying an enlarged broadcast image on the home screen if the mobile terminal 31000 is connected to the image display device 30000.

According to the present invention, to implement the remote control mode for the image display device 30000, the mobile terminal 31000 may include a wireless communication unit for receiving a content list, a display unit for displaying the received content list, and a control unit for controlling transmission of information associated with a specific item if the specific item included in the content list is selected. The wireless communication unit may receive at least one of device information on the image display device 30000, authentication information for connection to the image display device 30000 and authentication information with respect to the server 32000 connected to the image display device 30000. In this way, the wireless communication unit may receive the authentication information with respect to the server 32000 connected to the image display device 30000, and the control unit may control connection to the server 32000 using the authentication information.

Additionally, the mobile terminal 31000 may include a memory for storing a bookmark list including the selected item of the content list. The control unit may control display of the bookmark list, and transmission of information on the selected item of the bookmark list to the image display device 30000.

The image display device 30000 ac cording to the present invention may include a network interface for receiving an input for selection of a specific item included in a content list from the mobile terminal 31000, a control unit for controlling a request for transmission of content corresponding to the selected item from the server 32000 in response to the selection input, and a display unit for playing and displaying received content if the content corresponding to the selected item is received. If the mobile device is connected to the image display device 30000, the control unit of the image display device 30000 may transmit a request for transmission of a content list from the server 32000, receive the content list from the server 32000, and transmit the content list to the mobile terminal 31000. The network interface may transmit authentication information with respect to the server 32000 connected to the image display device 30000, and receive an authentication completion message from the server 32000. The control unit may control transmission of at least one of device information on the image display device 30000, authentication information for connection to the image display device 30000 and authentication information with respect to the server 32000 connected to the image display device 30000 to the mobile terminal 31000. Also, if the mobile terminal 31000 is connected to the image display device 30000 in a state in which the home screen including a broadcast image and the content list is displayed on the display unit, the control unit may display an enlarged image of the broadcast image on the home screen.

According to a further embodiment of the present invention, an operating method of a digital receiver may be implemented as code that can be written on a processor readable recording medium and thus read by a processor provided in the digital receiver. The processor readable recording medium may be any type of recording device in which data is stored in a processor readable manner. Examples of the processor readable recording medium include a ROM, a RAM, a CD-ROM, a magnetic tape, a floppy disc, an optical data storage device, and a carrier wave (e.g., data transmission over the Internet). The processor readable recording medium can be distributed over a plurality of computer systems connected to a network so that processor readable code is written thereto and executed therefrom in a decentralized manner.

As is apparent from the above description, according to the present invention, in a digital system including at least one server 32000 and a plurality of digital devices, it is possible to expand a channel or service coverage originally included in each digital device, to acquire more abundant service data from each digital device than in the related art, thereby providing an improved service guide in terms of quantity and/or quality, and to enable sharing of service data between the digital devices as well as between the server 32000 and each digital device included in the digital system via an SNS and the like.

Further, according to the present invention, the mobile terminal 31000 can enter a remote control mode for an image display device 30000 to select a specific item of a content list displayed on the mobile terminal 31000 and transmit the selected item to the image display device 30000 while watching an image displayed on the image display device 30000. Also, the mobile terminal 31000 can function to receive content corresponding to the selected item from a server 32000, play the content, and display the content on the image display device 30000, thereby assisting the user in performing various operations under the image display device 30000 remote control mode while continuously watching an image displayed on the image display device 30000. This may result in enhanced user convenience.

In particular, if the content list is a content list associated with a home screen of the image display device 30000, it is possible to allow the user to directly select a desired item of the corresponding content list displayed on the mobile terminal 31000 in a state in which the image display device 30000 displays the image.

In the case in which the mobile terminal 31000 enters the image display device 30000 remote control mode and is connected to the image display device 30000, the image display device 30000 is capable of displaying an enlarged image of the displayed image. This assists the user in watching the displayed image.

Additionally, the mobile terminal 31000 may receive authentication information with respect to the server 32000 connected to the image display device 30000, may be connected to the server 32000 using the authentication information, and may directly receiving the content list from the server 32000. Accordingly, if the user is located at the outside other than near the image display device 30000, the user can select a desired item of the content list in advance using the mobile terminal 31000, and store the selected item in the mobile terminal 31000.

As the mobile terminal 31000 can display a bookmark list on the mobile terminal 31000 and transmit the selected item to the image display device 30000 in a state in which the mobile terminal 31000 can be connected to the image display device 30000, content of the item selected by the user can be rapidly played and displayed on the image display device 30000.

In this way, the mobile terminal 31000, the image display device 30000 and the server 32000 can realize various UI operations.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A digital system of processing service data, comprising:
a first device configured to:
transmit at least one of device information and device location information of the first device to a second device which is connected to the first device,
receive service data from the second device, the service data being extracted based upon at least one of the device information and the device location information of the first device,
process and output the service data on a screen,
transmit a command signal which is selected from the outputted service data to the second device,
receive respond data corresponding to the command signal from the second device, and
output the respond data on the screen,
wherein the first device is further configured to:
transmit a request to both transfer a device identifier according to a HyperText Transfer Protocol (HTTP) and a key for data encryption to the second device,
receive a response code and the key from the second device,
encrypt a service list which is currently displayed on the screen using the key, and
transmit the encrypted service list to the second device.

2. The digital system of claim 1 further comprises:
the second device configured to determine a group of the first device based upon the device location information, transmit an identifier of the determined group of the first device, store Uniform Resource Locator (URL) information to be downloaded a thumbnail image in the service data and transmit the stored URL information corresponding to the determined group to the first device.

3. The digital system of claim 1, wherein the first device is further configured to reproduce a service if the transmitted service list is valid, transmit a security authentication code to be coupled to the second device, and couple to the second device according to a response of the second device.

4. The digital system of claim 2, wherein the device location information includes at least one an original network identifier, a Zone Improvement Plan (ZIP) code and a Global Positioning System (GPS) information, wherein the device information of the first device includes at least one of a nation, a language, a receiver type, a device model, a service list and a user identifier, wherein the service data includes at least one of program data, thumbnail image data, channel browse data and guide data, and wherein the service list includes an identification information which comprises at least one of an original network identifier, a transport stream identifier, a channel identifier and a channel name.

5. The digital system of claim 4, wherein, if the transmitted service list is not valid, the first device is further configured to at least one of return a response code indicating a service to be not reproduced to the first device, transmit the service list and request the service to be reproduced.

6. The digital system of claim 4, wherein the first device is further configured to extract the URL information received from the second device, download the thumbnail image based on the URL information, and output the downloaded thumbnail image.

7. A method of processing service data in a digital system, the method comprising:
receiving service data and device information from a first device;
transmitting an identifier of a group from a second device to the first device based upon the device information, the group including the first device;

processing the service data and storing the processed service data based upon the identifier of the group; and transmitting the stored service data to the first device based upon the identifier of the group, wherein the step of transmitting the stored service data further comprises:

receiving a request of both transferring a device identifier according to a HyperText Transfer Protocol (HTTP) and a key for data encryption to the second device; and transmitting a response code and the key from the second device.

8. The method of claim 7, wherein the service data includes at least one of program data, thumbnail image data, channel browse data and guide data, and wherein the device information of the first device includes at least one of a nation, a language, a receiver type, a device model, a service list and a user identifier.

9. The method of claim 8, wherein the service list includes an identification information which comprises at least one of an original network identifier, a transport stream identifier, a channel identifier and a channel name.

10. The method of claim 9, wherein the step of processing the service data comprises combining the service of the first device and service data received from a third device.

11. The method of claim 10, wherein the second device controls the stored service to be transmitted periodically to the first device, and wherein the second device controls a changed transmission period of the stored service to be changed if the service data of the first device is duplicated to the service data which is previously stored in the second device.

12. A method of processing service data in a digital system, the method comprising:

transmitting device location information of a first device to a second device which is connected to the first device;

receiving service data from the second device, the service data being extracted based upon the device location information of the first device;

processing and outputting the service data on a screen;

transmitting a command signal which is selected from the outputted service data to the second device; and receiving respond data corresponding to the command signal from the second device and outputting the respond data on the screen, wherein the step of transmitting a command signal comprises:

transmitting a request of both transferring a device identifier according to a HyperText Transfer Protocol (HTTP) and a key for data encryption to the second device;

receiving a response code and the key from the second device; and encrypting a service list which is currently displayed on the screen using the key and transmitting the encrypted service list to the second device.

13. The method of claim 12, wherein the device location information includes at least one of an original network identifier, a Zone Improvement Plan (ZIP) code and Global Positioning System (GPS) information, wherein the service data includes at least one of program data, thumbnail image data, channel browse data and guide data, and wherein the device information of the first device includes at least one of a nation, a language, a receiver type, a device model, a service list and a user identifier.

14. The method of claim 13, wherein the service list includes an identification information which comprises at least one of an original network identifier, a transport stream identifier, a channel service identifier and a channel name.

15. The method of claim 14, further comprises reproducing a service if the transmitted service list is valid.

16. The method of claim 14, further comprises at least one of:

returning a response code indicating a service to be not reproduced to the first device; and transmitting the service list and requesting the service to be reproduced.

17. The method of claim 14, wherein the step of transmitting a command signal further comprising:

transmitting a security authentication code to be coupled to the second device; and coupling to the second device according to a response of the second device.

18. The method of claim 14, wherein the second device stores Uniform Resource Locator (URL) information to be downloaded the thumbnail image in the service data, and wherein the first device extracts the URL information received from the second device, downloads the thumbnail image based on the URL information and outputs the downloaded thumbnail image.

* * * * *